US012137257B2

(12) United States Patent
Zhang et al.

(10) Patent No.: US 12,137,257 B2
(45) Date of Patent: Nov. 5, 2024

(54) SIGNALING FOR VIDEO BLOCK PARTITION MODE

(71) Applicants:Beijing Bytedance Network Technology Co., Ltd., Beijing (CN); Bytedance Inc., Los Angeles, CA (US)

(72) Inventors: Kai Zhang, San Diego, CA (US); Li Zhang, San Diego, CA (US); Hongbin Liu, Beijing (CN); Jizheng Xu, San Diego, CA (US); Yue Wang, Beijing (CN)

(73) Assignees: BEIJING BYTEDANCE NETWORK TECHNOLOGY CO., LTD, Beijing (CN); BYTEDANCE INC., Los Angeles, CA (US)

( * ) Notice: Subject to any disclaimer, the term of this patent is extended or adjusted under 35 U.S.C. 154(b) by 334 days.

(21) Appl. No.: 17/389,179

(22) Filed: Jul. 29, 2021

(65) Prior Publication Data

US 2021/0360244 A1 Nov. 18, 2021

Related U.S. Application Data

(63) Continuation of application No. PCT/CN2020/074217, filed on Feb. 3, 2020.

(30) Foreign Application Priority Data

Feb. 3, 2019 (WO) ................. PCT/CN2019/074701
Mar. 11, 2019 (WO) ................. PCT/CN2019/077620
(Continued)

(51) Int. Cl.
*H04N 19/96* (2014.01)
*H04N 19/119* (2014.01)
(Continued)

(52) U.S. Cl.
CPC .......... *H04N 19/96* (2014.11); *H04N 19/119* (2014.11); *H04N 19/12* (2014.11); *H04N 19/122* (2014.11);
(Continued)

(58) Field of Classification Search
CPC .... H04N 19/119; H04N 19/12; H04N 19/122; H04N 19/176; H04N 19/96
See application file for complete search history.

(56) References Cited

U.S. PATENT DOCUMENTS 8,204,109 B2   6/2012  Xiong et al.
8,804,816 B2   8/2014  Li et al.
(Continued)

FOREIGN PATENT DOCUMENTS

CN   104768014 A   7/2015
CN   107431815 A   12/2017
(Continued)

OTHER PUBLICATIONS

Bross, Benjamin. "Versatile Video Coding (Draft 1)" Joint Video Experts Team (JVET) of ITU-T SG 16 WP 3 and ISO/IEC JTC 1/SC 29/WG 11, 10th Meeting: San Diego, US, Apr. 10-20, 2018, Document JVET-J1001, 2018.
(Continued)

*Primary Examiner* — David N Werner
(74) *Attorney, Agent, or Firm* — Perkins Coie LLP

(57) ABSTRACT

A method for processing a video includes determining a valid splitting type for a current video block; determining whether or how to signal a splitting type to be used for the current video block based on the determination of the valid splitting type; and performing a conversion between the current video block and a bitstream representation of the current video block in accordance with the determining results.

19 Claims, 41 Drawing Sheets

(30) Foreign Application Priority Data

Jun. 5, 2019 (WO) ............... PCT/CN2019/090163
Aug. 20, 2019 (WO) ............... PCT/CN2019/101594

(51) Int. Cl.

| | |
|---|---|
| *H04N 19/12* | (2014.01) |
| *H04N 19/122* | (2014.01) |
| *H04N 19/13* | (2014.01) |
| *H04N 19/132* | (2014.01) |
| *H04N 19/136* | (2014.01) |
| *H04N 19/157* | (2014.01) |
| *H04N 19/172* | (2014.01) |
| *H04N 19/176* | (2014.01) |
| *H04N 19/184* | (2014.01) |
| *H04N 19/186* | (2014.01) |
| *H04N 19/46* | (2014.01) |
| *H04N 19/70* | (2014.01) |

(52) U.S. Cl.
CPC ........... *H04N 19/13* (2014.11); *H04N 19/132* (2014.11); *H04N 19/136* (2014.11); *H04N 19/157* (2014.11); *H04N 19/172* (2014.11); *H04N 19/176* (2014.11); *H04N 19/184* (2014.11); *H04N 19/186* (2014.11); *H04N 19/46* (2014.11); *H04N 19/70* (2014.11)

(56) References Cited

U.S. PATENT DOCUMENTS

| | | |
|---|---|---|
| 9,077,998 B2 | 7/2015 | Wang et al. |
| 9,124,895 B2 | 9/2015 | Wang |
| 9,288,506 B2 | 3/2016 | Chen et al. |
| 9,432,685 B2 | 8/2016 | Chon et al. |
| 9,503,702 B2 | 11/2016 | Chen et al. |
| 9,544,566 B2 | 1/2017 | Kang et al. |
| 9,544,601 B2 | 1/2017 | Zhao et al. |
| 9,544,612 B2 | 1/2017 | Deng et al. |
| 9,584,819 B2 | 2/2017 | Wang et al. |
| 9,584,822 B2 | 2/2017 | Deng et al. |
| 9,596,484 B2 | 3/2017 | Zhang et al. |
| 9,648,335 B2 | 5/2017 | Rapaka et al. |
| 9,667,942 B2 | 5/2017 | Chen et al. |
| 9,716,897 B2 | 7/2017 | Deng et al. |
| 9,756,359 B2 | 9/2017 | Zhao et al. |
| 9,769,492 B2 | 9/2017 | Hendry et al. |
| 9,794,579 B2 | 10/2017 | Ramasubramonian et al. |
| 9,794,626 B2 | 10/2017 | Ramasubramonian et al. |
| 9,813,719 B2 | 11/2017 | Wang |
| 9,838,712 B2 | 12/2017 | Lin et al. |
| 9,860,562 B2 | 1/2018 | Zhang et al. |
| 9,883,187 B2 | 1/2018 | Tu et al. |
| 9,906,813 B2 | 2/2018 | Zhang et al. |
| 9,979,975 B2 | 5/2018 | Rapaka et al. |
| 9,986,257 B2 | 5/2018 | Zhang et al. |
| 9,992,494 B2 | 6/2018 | Zhang et al. |
| 9,998,739 B2 | 6/2018 | Chon et al. |
| 10,063,867 B2 | 8/2018 | Wang |
| 10,116,964 B2 | 10/2018 | An et al. |
| 10,136,143 B2 | 11/2018 | Zhang et al. |
| 10,212,411 B2 | 2/2019 | Zhang et al. |
| 10,212,444 B2 | 2/2019 | Li et al. |
| 10,244,253 B2 | 3/2019 | Chen et al. |
| 10,264,286 B2 | 4/2019 | Ramasubramonian et al. |
| 10,271,064 B2 | 4/2019 | Chien et al. |
| 10,291,923 B2 | 5/2019 | Hendry et al. |
| 10,321,130 B2 | 6/2019 | Dong et al. |
| 10,334,281 B2 | 6/2019 | Zhang et al. |
| 10,375,411 B2 | 8/2019 | Zhao et al. |
| 10,390,050 B2 | 8/2019 | An et al. |
| 10,390,087 B2 | 8/2019 | Ramasubramonian et al. |
| 10,404,999 B2 | 9/2019 | Liu et al. |
| 10,419,768 B2 | 9/2019 | Hendry et al. |
| 10,506,246 B2 | 12/2019 | Li et al. |
| 10,567,799 B2 | 2/2020 | Liu et al. |
| 10,587,897 B2 | 3/2020 | Qu et al. |
| 10,609,423 B2 | 3/2020 | Chuang et al. |
| 10,708,591 B2 | 7/2020 | Zhang et al. |
| 10,812,835 B2 | 10/2020 | Wang et al. |
| 2009/0116558 A1 | 5/2009 | Chen et al. |
| 2014/0050266 A1* | 2/2014 | Zhang ............... H04N 19/122 375/240.18 |
| 2015/0229957 A1 | 8/2015 | Zhao et al. |
| 2015/0264356 A1 | 9/2015 | Zhang et al. |
| 2015/0304662 A1 | 10/2015 | Liu et al. |
| 2015/0326880 A1 | 11/2015 | He et al. |
| 2016/0234510 A1 | 8/2016 | Lin et al. |
| 2016/0330457 A1 | 11/2016 | Ye et al. |
| 2017/0150186 A1 | 5/2017 | Zhang et al. |
| 2017/0272750 A1 | 9/2017 | An |
| 2017/0347095 A1* | 11/2017 | Panusopone ........... H04N 19/96 |
| 2017/0347128 A1* | 11/2017 | Panusopone ......... H04N 19/172 |
| 2018/0014017 A1 | 1/2018 | Li et al. |
| 2018/0103268 A1 | 4/2018 | Huang et al. |
| 2018/0109812 A1 | 4/2018 | Tsai et al. |
| 2018/0109814 A1 | 4/2018 | Chuang et al. |
| 2018/0139444 A1* | 5/2018 | Huang ............... H04N 19/122 |
| 2018/0139453 A1 | 5/2018 | Park et al. |
| 2018/0199072 A1 | 7/2018 | Li et al. |
| 2018/0242024 A1 | 8/2018 | Chen |
| 2018/0288446 A1 | 10/2018 | An et al. |
| 2018/0324420 A1 | 11/2018 | Wang et al. |
| 2018/0352226 A1 | 12/2018 | An et al. |
| 2019/0116374 A1 | 4/2019 | Zhang et al. |
| 2019/0246122 A1 | 8/2019 | Zhang et al. |
| 2019/0246143 A1 | 8/2019 | Zhang et al. |
| 2019/0273922 A1 | 9/2019 | Lim et al. |
| 2019/0306506 A1 | 10/2019 | Chen et al. |
| 2019/0313129 A1 | 10/2019 | Lee |
| 2019/0379914 A1 | 12/2019 | Misra et al. |
| 2019/0387226 A1 | 12/2019 | Lee |
| 2020/0186805 A1 | 6/2020 | Lee |
| 2020/0267418 A1 | 8/2020 | Chuang et al. |
| 2020/0304788 A1 | 9/2020 | He et al. |
| 2020/0344475 A1 | 10/2020 | Zhu et al. |
| 2020/0359024 A1 | 11/2020 | Misra et al. |
| 2021/0006787 A1 | 1/2021 | Zhang et al. |
| 2021/0006788 A1 | 1/2021 | Zhang et al. |
| 2021/0006790 A1 | 1/2021 | Zhang et al. |
| 2021/0006803 A1 | 1/2021 | Zhang et al. |
| 2021/0014479 A1 | 1/2021 | Lee |
| 2021/0029356 A1 | 1/2021 | Zhang et al. |
| 2021/0029366 A1 | 1/2021 | Zhang et al. |
| 2021/0029368 A1 | 1/2021 | Zhang et al. |
| 2021/0029372 A1 | 1/2021 | Zhang et al. |
| 2021/0051324 A1 | 2/2021 | Zhang et al. |
| 2021/0051348 A1* | 2/2021 | Zhang ................ H04N 19/189 |
| 2021/0051349 A1* | 2/2021 | Zhang ................ H04N 19/189 |
| 2021/0058637 A1 | 2/2021 | Zhang et al. |
| 2021/0058647 A1* | 2/2021 | Zhang ................ H04N 19/184 |
| 2021/0092377 A1 | 3/2021 | Zhang et al. |
| 2021/0092378 A1* | 3/2021 | Zhang ................ H04N 19/1883 |
| 2021/0092379 A1 | 3/2021 | Zhang et al. |
| 2021/0092431 A1 | 3/2021 | Zhang et al. |
| 2021/0112248 A1 | 4/2021 | Zhang et al. |
| 2021/0112284 A1 | 4/2021 | Zhang et al. |
| 2021/0120243 A1* | 4/2021 | Zhang ................. H04N 19/96 |
| 2021/0195189 A1* | 6/2021 | Lee ...................... H04N 19/70 |
| 2021/0258618 A1 | 8/2021 | Gao et al. |
| 2021/0306643 A1 | 9/2021 | Zhao et al. |
| 2021/0329241 A1 | 10/2021 | Lim et al. |
| 2021/0337197 A1* | 10/2021 | Lee ..................... H04N 19/50 |
| 2021/0360242 A1 | 11/2021 | Zhang et al. |
| 2021/0360243 A1 | 11/2021 | Zhang et al. |
| 2021/0368185 A1 | 11/2021 | Zhang et al. |
| 2022/0046288 A1 | 2/2022 | Rosewarne |
| 2022/0086439 A1 | 3/2022 | Tsai et al. |
| 2022/0141493 A1 | 5/2022 | Leleannec et al. |
| 2022/0150479 A1 | 5/2022 | Rosewarne |
| 2023/0300351 A1 | 9/2023 | Francois et al. |
| 2023/0421788 A1 | 12/2023 | Leannec et al. |

(56) References Cited

U.S. PATENT DOCUMENTS

| | | | | |
|---|---|---|---|---|
| 2024/0040119 | A1* | 2/2024 | Zhang | H04N 19/119 |
| 2024/0048701 | A1* | 2/2024 | Zhang | H04N 19/70 |
| 2024/0137498 | A1* | 4/2024 | Zhang | H04N 19/70 |

FOREIGN PATENT DOCUMENTS

| | | |
|---|---|---|
| CN | 108702507 A | 10/2018 |
| CN | 109151477 A | 1/2019 |
| CN | 110839161 A | 2/2020 |
| KR | 20190104032 A | 9/2019 |
| WO | 2016091161 A1 | 6/2016 |
| WO | 2016148438 A2 | 9/2016 |
| WO | 2018056703 A1 | 3/2018 |
| WO | 2018088805 A1 | 5/2018 |
| WO | 2018092868 A1 | 5/2018 |
| WO | 2018092869 A1 | 5/2018 |
| WO | 2018093184 A1 | 5/2018 |
| WO | 2018142903 A1 | 8/2018 |
| WO | 2018155985 A1 | 8/2018 |
| WO | 2019016287 A1 | 1/2019 |
| WO | 2019059676 A1 | 3/2019 |
| WO | 2019185815 A1 | 10/2019 |

OTHER PUBLICATIONS

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.

Fu et al. "CE4-Related: Quadtree-based Merge Estimation Region for VVC," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M0350, 2019.

Gao et al. "CE1-2.0.11: Picture Boundary Handling," Joint Video Experts Team (JVET) of ITU-T SG 16 WP 3 and ISO/IEC JTC 1/SC 29/WG 11, 11th Meeting: Ljubljana, SI, Jul. 10-18, 2018, document JVET-K0287, 2018.

Li et al. "Multi-Type-Tree." Joint Video Exploration Team (JVET), of ITU-T SG 16 WP 3 and ISO/IEC JTC 1/SC 29/WG 11, 4th Meeting: Chengdu, CN, Oct. 15-21, 2016, document JVET-D0117rl, 2016.

Luthra et al. Overview of the H.264/AVC Video Coding Standard, Proc. SPIE, 5203, Applications of Digital Image Processing, Nov. 19, 2003, Optical Science and Technology, SPIE 48th annutal Meeting, San Diego, CA, US, 2003.

Piao et al. "CE1-Related: Split Unit Coding Order," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0063, 2018.

Sullivan et al. "Overview of the High Efficiency Video Coding (HEVC) Standard," IEEE Transactions on Circuits and Systems for Video Technology, Dec. 2012, 22(12):1649-1668.

Tsai et al. "CE1-Related: Picture Boundary CU Split Satisfying the VPDU Constraint," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M0888, 2019.

International Search Report and Written Opinion from PCT/CN2020/074215 dated Apr. 22, 2020 (12 pages).

International Search Report and Written Opinion from PCT/CN2020/074216 dated Apr. 24, 2020 (9 pages).

International Search Report and Written Opinion from PCT/CN2020/074217 dated Apr. 21, 2020 (14 pages).

Fu et al. "Unsymmetrical Quad-Tree Partitioning for Audio Video Coding Standard-3 (AVS-3)," 2019 Picture Coding Symposium (PCS), Nov. 12-15, 2019, Ningbo, China.

Le Leannec et al. "Assymetric Coding Units in QTBT," Joint Video Exploration Team (JVET) of ITU-T SG WP 3 and ISO/IEC JTC 1/SC 29/WG 11 4th Meeting, Chengdu, CN, Oct. 15-21, 2016, document JVET-D0064, 2016.

Wang et al. "Extended Quad-Tree Partitioning for Future Video Coding," 2019 Date Compression Conference (DCC), Snowbird, UT, USA, Mar. 1, 2019, pp. 300-309.

Non-Final Office Action from U.S. Appl. No. 17/389,104 dated Oct. 18, 2023.

Non-Final Office Action from U.S. Appl. No. 17/389,157 dated Jan. 10, 2024.

Ex Parte Quayle Action from U.S. Appl. No. 17/389,104 dated Jan. 31, 2024.

Chinese Office Action from Chinese Patent Application No. 202080008507.5 dated Aug. 20, 2024, 18 pages.

* cited by examiner

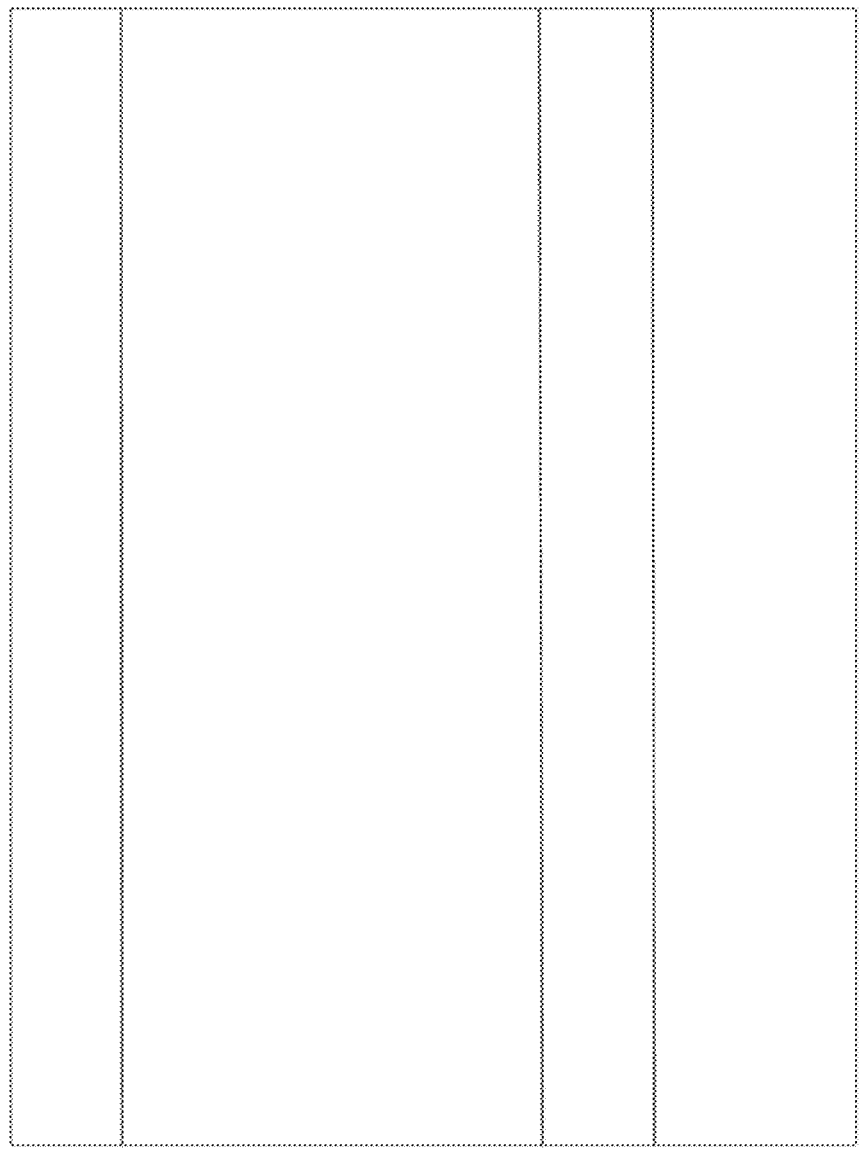

SIGNALING FOR VIDEO BLOCK PARTITION MODE

CROSS-REFERENCE TO RELATED APPLICATION

This application is a continuation of International Application No. PCT/CN2020/074217, filed on Feb. 3, 2020, which claims the benefit of PCT/CN2019/074701, filed on Feb. 3, 2019, PCT/CN2019/077620, filed on Mar. 11, 2019, PCT/CN2019/090163, filed on Jun. 5, 2019, and PCT/CN2019/101594, filed on Aug. 20, 2019. The entire disclosures of the aforementioned applications are incorporated by reference as part of the disclosure of this application.

TECHNICAL FIELD

This document is related to video and image coding technologies.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The disclosed techniques may be used by video or image decoder or encoder embodiments for in which enhanced coding tree structure is used.

In one example aspect, a method of processing video is disclosed. The method includes performing a conversion between a current video block and a bitstream representation of the current video block, wherein the current video block is unsymmetrically split into four partitions using an unsymmetrical quad-Tree (UQT) splitting, wherein the four partitions includes a first partition having a dimension of W1×H1, a second partition having a dimension of W2×H2, a third partition having a dimension of W3×H3, and a fourth partition having a dimension of W4×H4, wherein W1, W2, W3, W4, H1, H2, H3, and H4 are integers.

In another example aspect, a method of processing video includes determining characteristics regarding a current video block; determining an operational state regarding unsymmetrical quad-tree (UQT) splitting based on the determination of the characteristics, wherein the operational state indicates that whether the UQT splitting is enabled or disabled and/or indicates how to split the current video block into four partitions using the UQT splitting; and performing a conversion between the current video block and a bitstream representation of the current video block based on the operational state of UQT splitting.

In another example aspect, a method of processing video includes determining, for a conversion between a current video block and a bitstream representation of the current video block, a unsymmetrical quad-tree (UQT) splitting method used for splitting the current video block, wherein the splitting method is selected from UQTa-H splitting, UQTb-H splitting, UQTc-V splitting and UQTd-V splitting, where a, b, c and d are chosen from 1, 2, 3 or 4, wherein UQTa-H splitting and UQTb-H splitting is a horizontal UQT splitting and UQTc-V splitting and UQTd-V splitting is vertical UQTsplitting; and performing the conversion based on the determining.

In another example aspect, a method of processing video includes determining a valid splitting type for a current video block; determining whether or not to signal a splitting type to be used for the current video block based on the determination of the valid splitting type; and performing a conversion between the current video block and a bitstream representation of the current video block in accordance with the determining results.

In another example aspect, a method of video processing is disclosed. The method includes determining, for a conversion between a current video block and a coded representation of the current video block, a splitting type used for splitting the current video block, wherein the splitting type is signaled in the bitstream representation after signaling indications of splitting or non-splitting and/or indications of quad tree (QT) splitting; and performing the conversion based on the determining.

In another example aspect, a method of video processing is disclosed. The method includes determining, for a conversion between a current video block and a bitstream representation of the current video block, whether to apply unsymmetrical quad-trees (UQTs) splitting, and a specific UQT type to be used for splitting the current video block if UQT splitting is applied, based on a slice or a picture containing the current video block; and performing the conversion based on the determining.

In another example aspect, a method of video processing is disclosed. The method includes determining, for a conversion between a current video block and a bitstream representation of the current video block, interpretations of signaled representation of unsymmetrical quad-tree (UQT) splitting to be used for splitting the current video block, based on a slice or a picture containing the current video block; and performing the conversion based on the determining.

In another example aspect, the above-described method may be implemented by a video encoder apparatus that comprises a processor.

In yet another example aspect, these methods may be embodied in the form of processor-executable instructions and stored on a computer-readable program medium.

These, and other, aspects are further described in the present document.

BRIEF DESCRIPTION OF THE DRAWINGS

FIG. 10A to 10H show examples of UQT.

DETAILED DESCRIPTION

The present document provides various techniques that can be used by a decoder of image or video bitstreams to improve the quality of decompressed or decoded digital video or images. For brevity, the term "video" is used herein to include both a sequence of pictures (traditionally called video) and individual images. Furthermore, a video encoder may also implement these techniques during the process of encoding in order to reconstruct decoded frames used for further encoding.

Section headings are used in the present document for ease of understanding and do not limit the embodiments and techniques to the corresponding sections. As such, embodiments from one section can be combined with embodiments from other sections.

1. Summary

This document is related to image/video coding, especially on the partition structure, i.e., how to split one large block to smaller blocks. It may be applied to the existing video coding standard like HEVC, or the standard (Versatile Video Coding) to be finalized. It may be also applicable to future video coding standards or video codec.

2. Background

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized.

Figure 12:
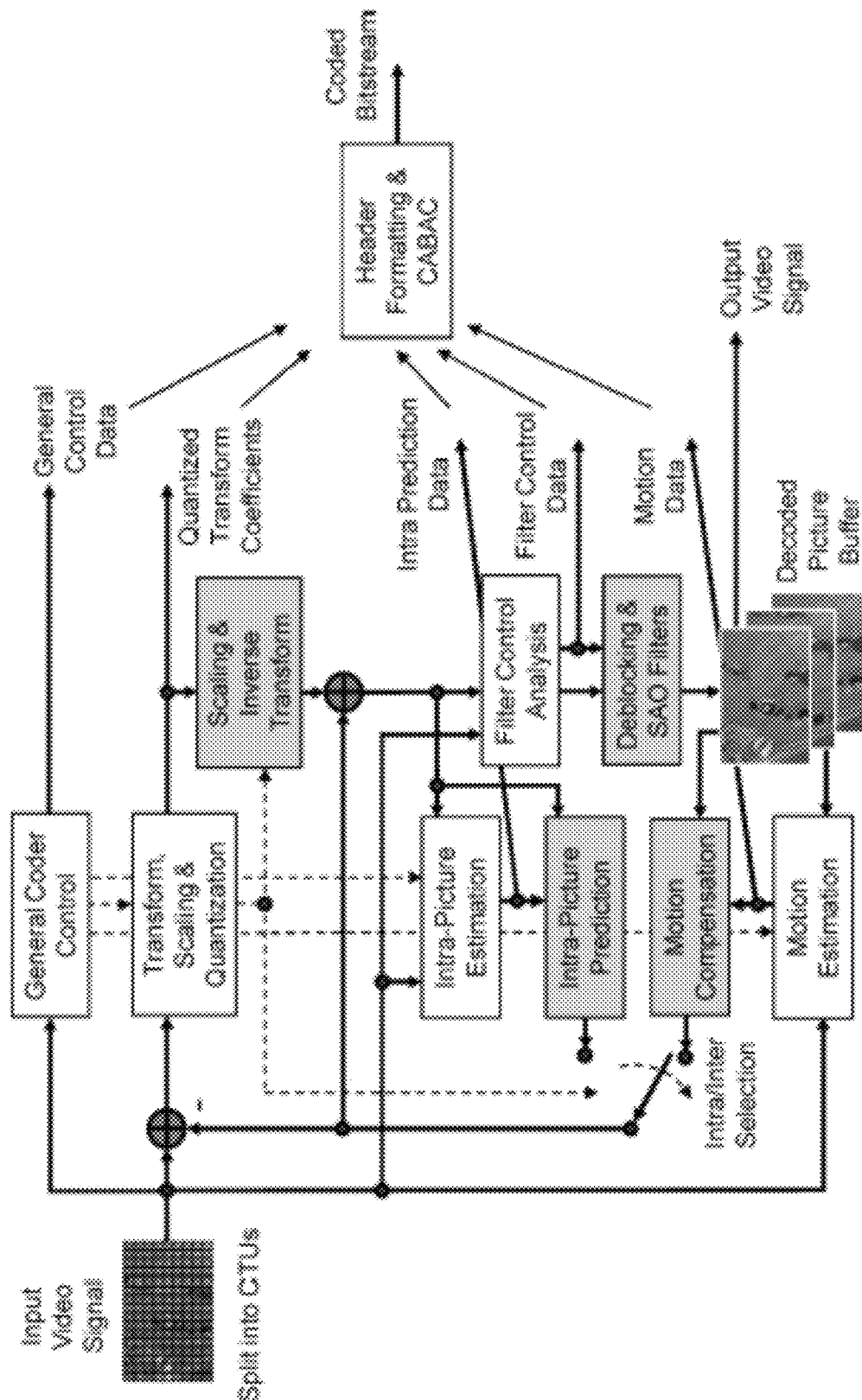
FIG. 12 shows a block diagram of an example implementation of a video encoder.

FIG. 12 is a block diagram of an example implementation of a video encoder. FIG. 12 shows that the encoder implementation has a feedback path built in in which the video encoder also performs video decoding functionality (reconstructing compressed representation of video data for use in encoding of next video data).

2.1 Partition Tree Structure in H.264/AVC

The core of the coding layer in previous standards was the macroblock, containing a 16×16 block of luma samples and, in the usual case of 4:2:0 color sampling, two corresponding 8×8 blocks of chroma samples.

An intra-coded block uses spatial prediction to exploit spatial correlation among pixels. Two partitions are defined: 16×16 and 4×4.

Figure 1:
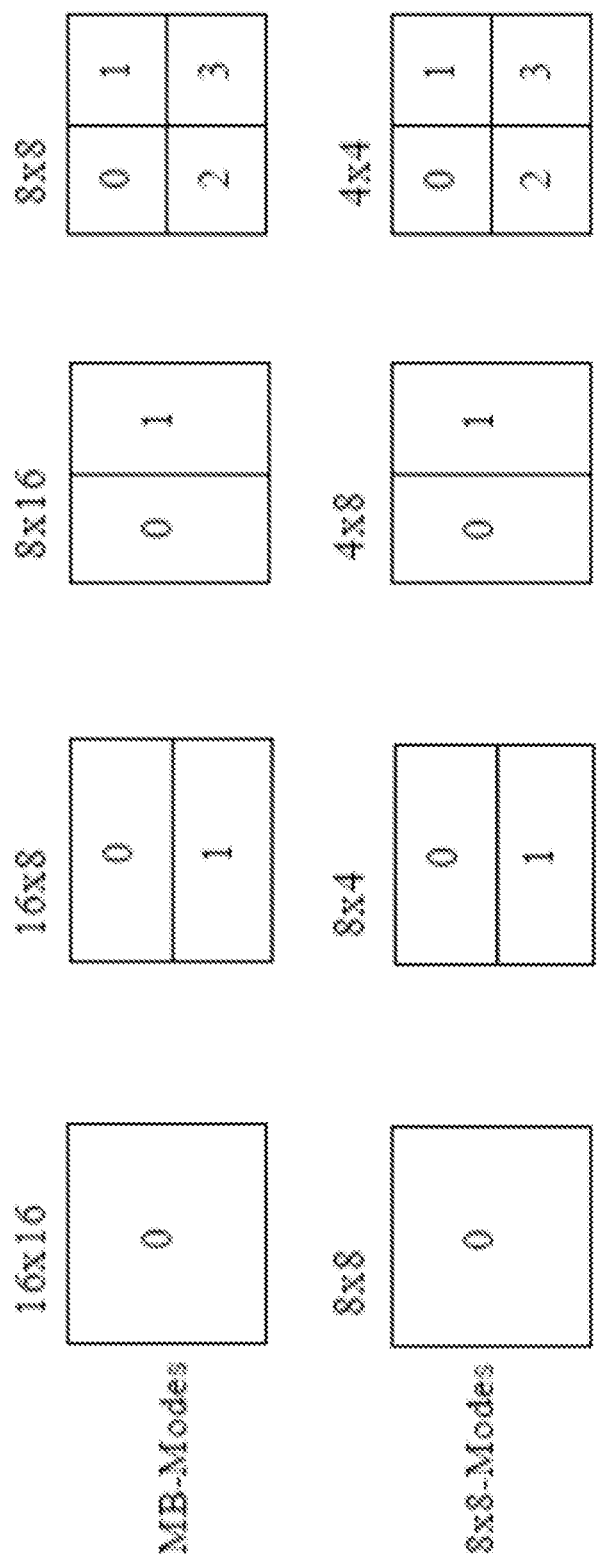
FIG. 1 shows an example of MB partitions in H.264/AVC.
Figure 2:
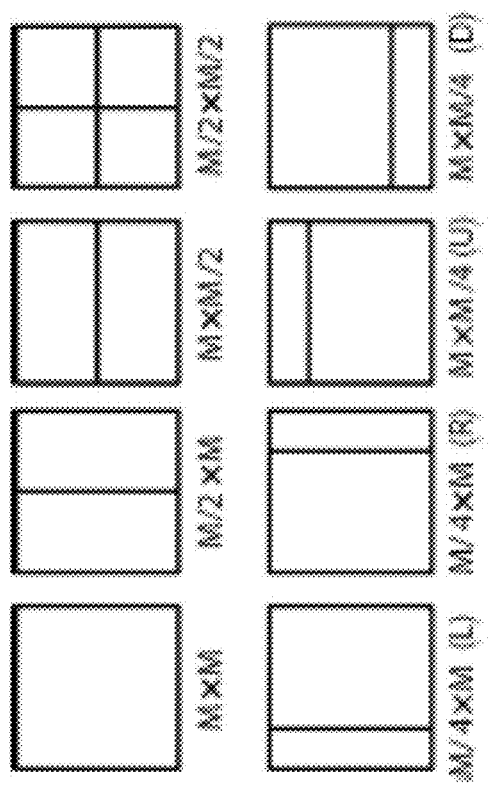
FIG. 2 shows an example of modes for splitting a CB into PBs.

An inter-coded block uses temporal prediction, instead of spatial prediction, by estimating motion among pictures. Motion can be estimated independently for either 16×16 macroblock or any of its sub-macroblock partitions: 16×8, 8×16, 8×8, 8×4, 4×8, 4×4 (see FIG. 1). Only one motion vector (MV) per sub-macroblock partition is allowed.

2.2 Partition Tree Structure in HEVC

In HEVC, a CTU is split into CUs by using a quadtree structure denoted as coding tree to adapt to various local characteristics. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU. One of key feature of the HEVC structure is that it has the multiple partition conceptions including CU, PU, and TU.

In the following, the various features involved in hybrid video coding using HEVC are highlighted as follows.

1) Coding tree units and coding tree block (CTB) structure: The analogous structure in HEVC is the coding tree unit (CTU), which has a size selected by the encoder and can be larger than a traditional macroblock. The CTU consists of a luma CTB and the corresponding chroma CTBs and syntax elements. The size L×L of a luma CTB can be chosen as L=16, 32, or 64 samples, with the larger sizes typically enabling better compression. HEVC then supports a partitioning of the CTBs into smaller blocks using a tree structure and quadtree-like signaling.

2) Coding units (CUs) and coding blocks (CBs): The quadtree syntax of the CTU specifies the size and positions of its luma and chroma CBs. The root of the quadtree is associated with the CTU. Hence, the size of the luma CTB is the largest supported size for a luma CB. The splitting of a CTU into luma and chroma CBs is signaled jointly. One luma CB and ordinarily two chroma CBs, together with associated syntax, form a coding unit (CU). A CTB may contain only one CU or may be split to form multiple CUs, and each CU has an associated partitioning into prediction units (PUs) and a tree of transform units (TUs).

3) Prediction units and prediction blocks (PBs): The decision whether to code a picture area using inter picture or intra picture prediction is made at the CU level. A PU partitioning structure has its root at the CU level. Depending on the basic prediction-type decision, the luma and chroma CBs can then be further split in size and predicted from luma and chroma prediction blocks (PBs). HEVC supports variable PB sizes from 64×64 down to 4×4 samples.

Figure 3:
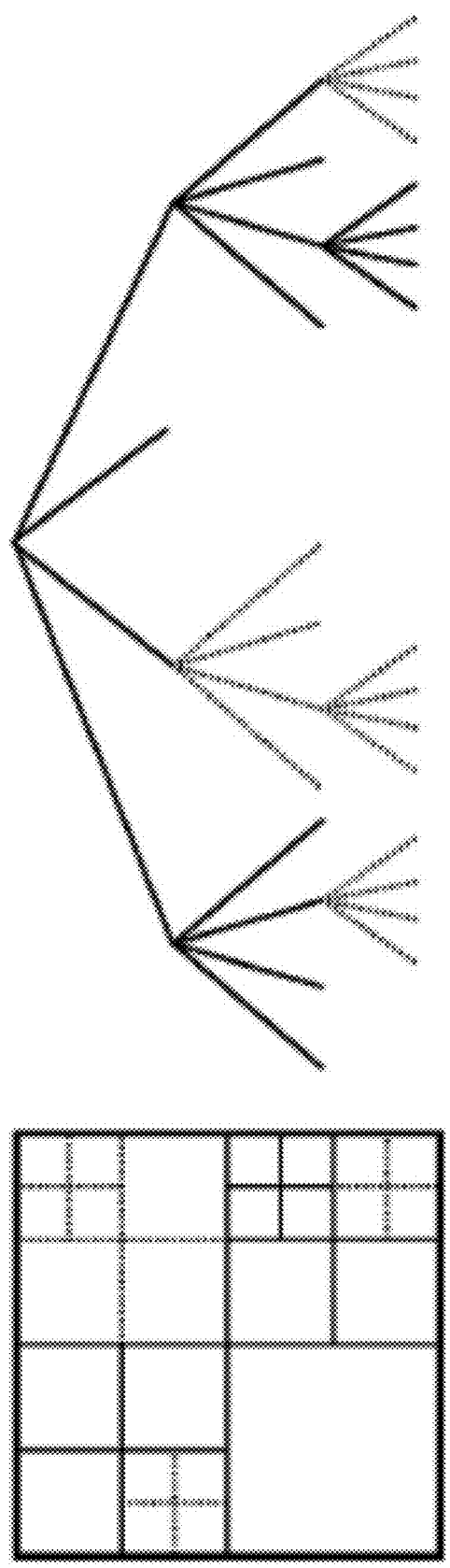
FIG. 3 shows an example of subdivision of a CTB into CBs.

FIG. 3 shows modes for splitting a CB into PBs.

4) TUs and transform blocks: The prediction residual is coded using block transforms. A TU tree structure has its root at the CU level. The luma CB residual may be identical to the luma transform block (TB) or may be further split into smaller luma TBs. The same applies to the chroma TBs. Integer basis functions similar to those of a discrete cosine transform (DCT) are defined for the square TB sizes 4×4, 8×8, 16×16, and 32×32. For the 4×4 transform of luma intra picture prediction residuals, an integer transform derived from a form of discrete sine transform (DST) is alternatively specified.

Figure 4:
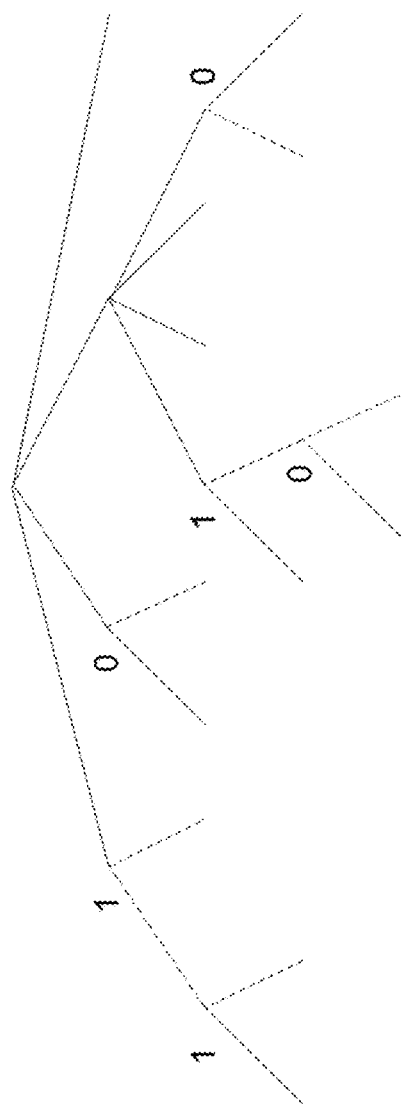
FIG. 4 shows an example of an illustration of a QTBT structure.
Figure 4:
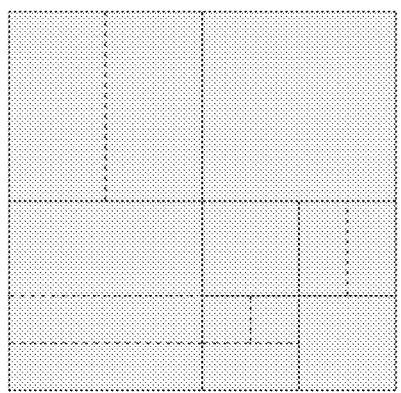

FIG. 4 shows subdivision of a CTB into CBs.

2.3 Quadtree Plus Binary Tree Block Structure with Larger CTUs in JEM

To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM).

2.3.1 QTBT Block Partitioning Structure

Different from HEVC, the QTBT structure removes the concepts of multiple partition types, i.e. it removes the separation of the CU, PU and TU concepts, and supports more flexibility for CU partition shapes. In the QTBT block structure, a CU can have either a square or rectangular shape. As shown in FIG. 4, a coding tree unit (CTU) is first partitioned by a quadtree structure. The quadtree leaf nodes are further partitioned by a binary tree structure. There are two splitting types, symmetric horizontal splitting and symmetric vertical splitting, in the binary tree splitting. The binary tree leaf nodes are called coding units (CUs), and that segmentation is used for prediction and transform processing without any further partitioning. This means that the CU, PU and TU have the same block size in the QTBT coding block structure. In the JEM, a CU sometimes consists of coding blocks (CBs) of different colour components, e.g. one CU contains one luma CB and two chroma CBs in the case of P and B slices of the 4:2:0 chroma format and sometimes consists of a CB of a single component, e.g., one CU contains only one luma CB or just two chroma CBs in the case of I slices.

The following parameters are defined for the QTBT partitioning scheme.
- CTU size: the root node size of a quadtree, the same concept as in HEVC
- MinQTSize: the minimum allowed quadtree leaf node size
- MaxBTSize: the maximum allowed binary tree root node size
- MaxBTDepth: the maximum allowed binary tree depth
- MinBTSize: the minimum allowed binary tree leaf node size In one example of the QTBT partitioning structure, the CTU size is set as 128×128 luma samples with two corresponding 64×64 blocks of chroma samples, the MinQTSize is set as 16×16, the MaxBTSize is set as 64×64, the MinBTSize (for both width and height) is set as 4×4, and the MaxBTDepth is set as 4. The quadtree partitioning is applied to the CTU first to generate quadtree leaf nodes. The quadtree leaf nodes may have a size from 16×16 (i.e., the MinQTSize) to 128×128 (i.e., the CTU size). If the leaf quadtree node is 128×128, it will not be further split by the binary tree since the size exceeds the MaxBTSize (i.e., 64×64). Otherwise, the leaf quadtree node could be further partitioned by the binary tree. Therefore, the quadtree leaf node is also the root node for the binary tree and it has the binary tree depth as 0. When the binary tree depth reaches MaxBTDepth (i.e., 4), no further splitting is considered. When the binary tree node has width equal to MinBTSize (i.e., 4), no further horizontal splitting is considered. Similarly, when the binary tree node has height equal to MinBTSize, no further vertical splitting is considered. The leaf nodes of the binary tree are further processed by prediction and transform processing without any further partitioning. In the JEM, the maximum CTU size is 256×256 luma samples.

FIG. 4 (left) illustrates an example of block partitioning by using QTBT, and FIG. 4 (right) illustrates the corresponding tree representation. The solid lines indicate quadtree splitting and dotted lines indicate binary tree splitting. In each splitting (i.e., non-leaf) node of the binary tree, one flag is signalled to indicate which splitting type (i.e., horizontal or vertical) is used, where 0 indicates horizontal splitting and 1 indicates vertical splitting. For the quadtree splitting, there is no need to indicate the splitting type since quadtree splitting always splits a block both horizontally and vertically to produce 4 sub-blocks with an equal size.

In addition, the QTBT scheme supports the ability for the luma and chroma to have a separate QTBT structure. Currently, for P and B slices, the luma and chroma CTBs in one CTU share the same QTBT structure. However, for I slices, the luma CTB is partitioned into CUs by a QTBT structure, and the chroma CTBs are partitioned into chroma CUs by another QTBT structure. This means that a CU in an I slice consists of a coding block of the luma component or coding blocks of two chroma components, and a CU in a P or B slice consists of coding blocks of all three colour components.

In HEVC, inter prediction for small blocks is restricted to reduce the memory access of motion compensation, such that bi-prediction is not supported for 4×8 and 8×4 blocks, and inter prediction is not supported for 4×4 blocks. In the QTBT of the JEM, these restrictions are removed.

2.4 Triple-Tree for VVC

Tree types other than quad-tree and binary-tree are supported. In the implementation, two more triple tree (TT) partitions, i.e., horizontal and vertical center-side triple-trees are introduced, as shown in FIGS. 5 (d) and (e).

Figure 5:
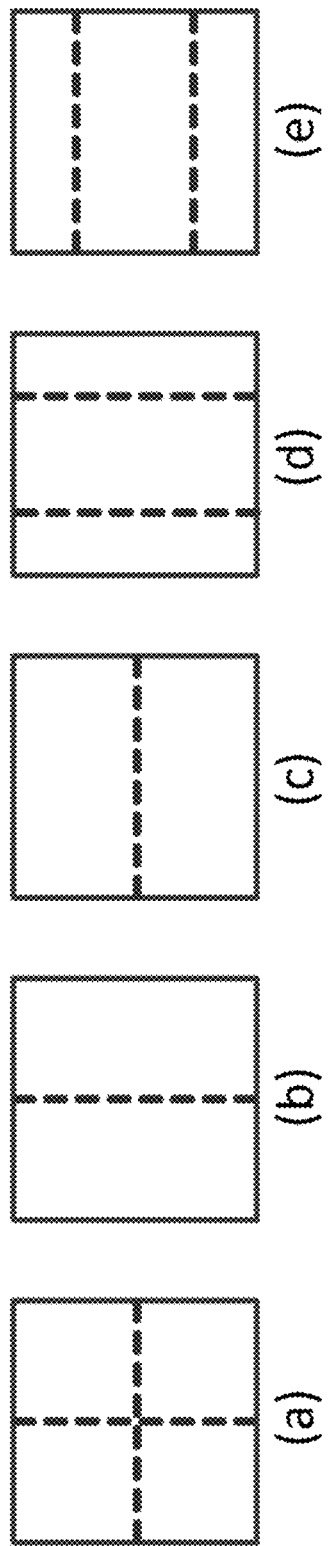
FIG. 5 shows examples of partitioning.
Figure 6B:
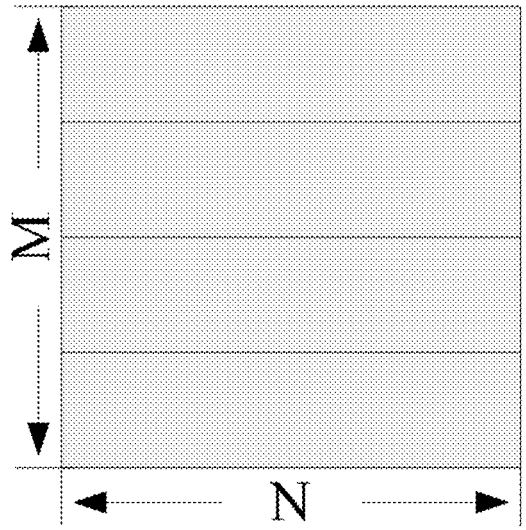
FIG. 6A to 6K show examples of EQT.
Figure 6A:
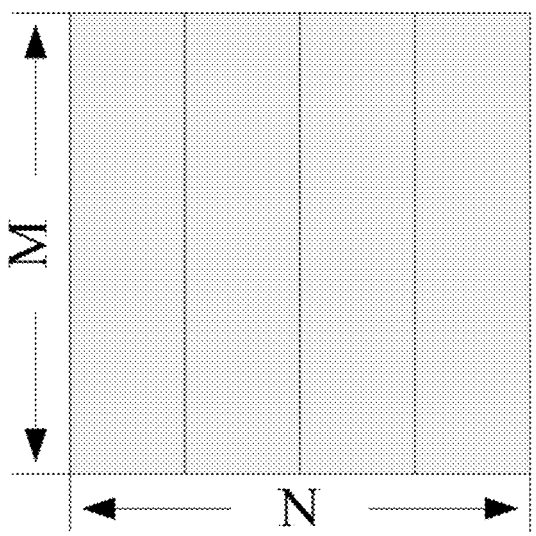
Figure 6D:
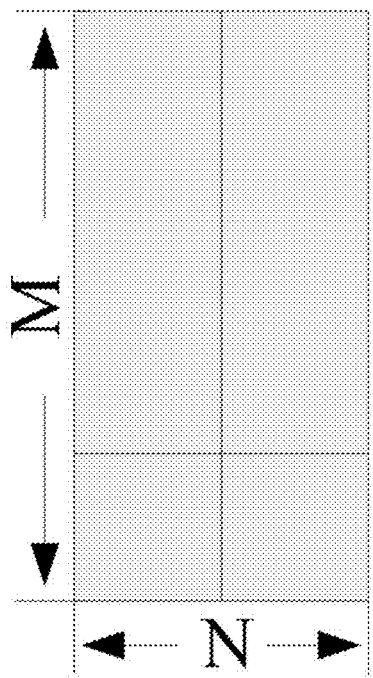
Figure 6C:
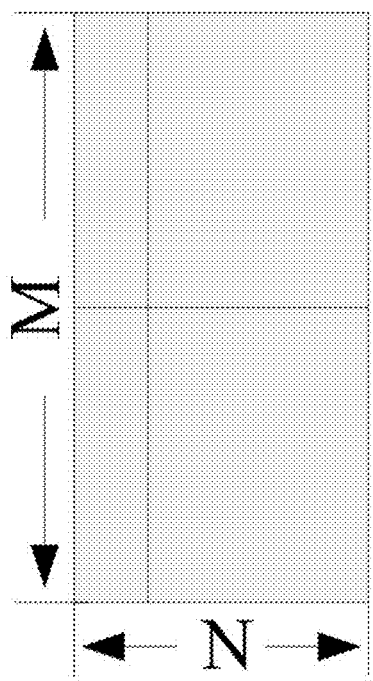
Figure 6F:
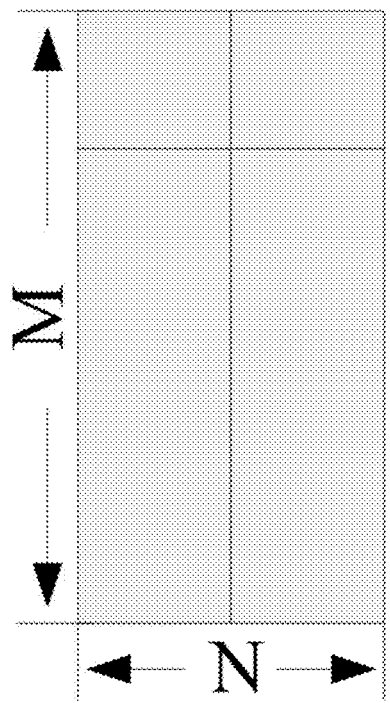
Figure 6E:
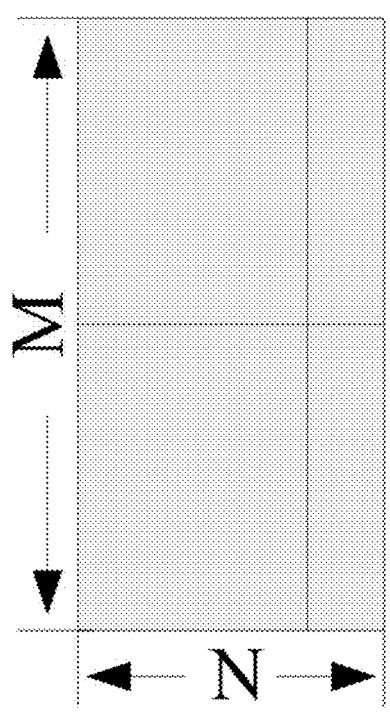
Figure 6G:
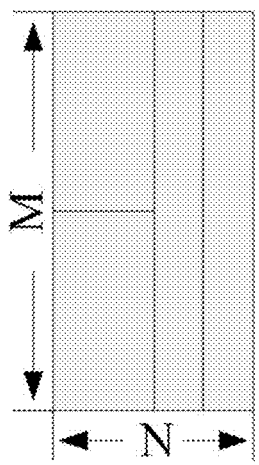
Figure 6G:
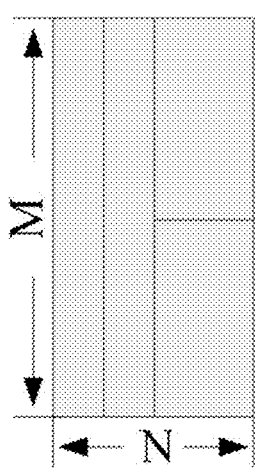
Figure 6G:
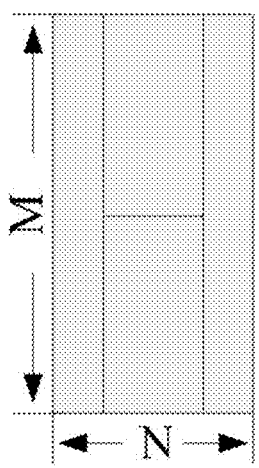
Figure 6H:
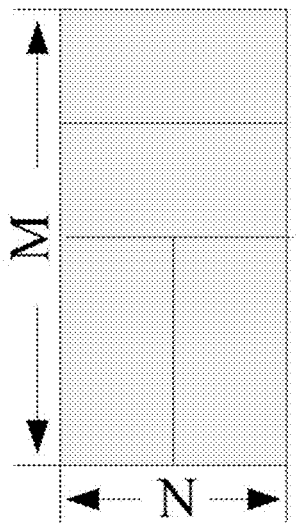
Figure 6H:
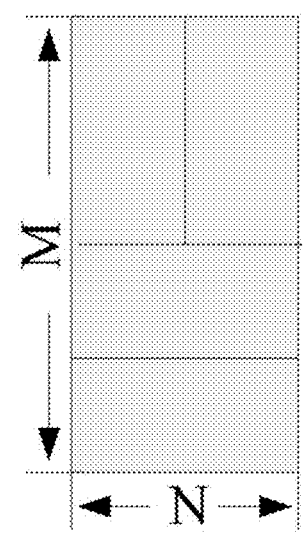
Figure 6H:
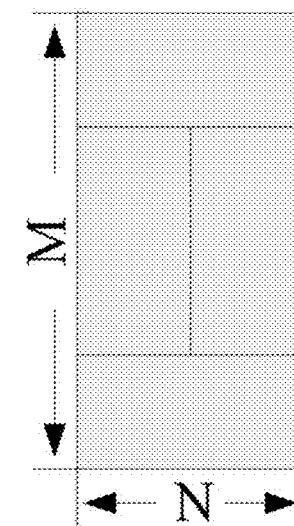
Figure 6I:
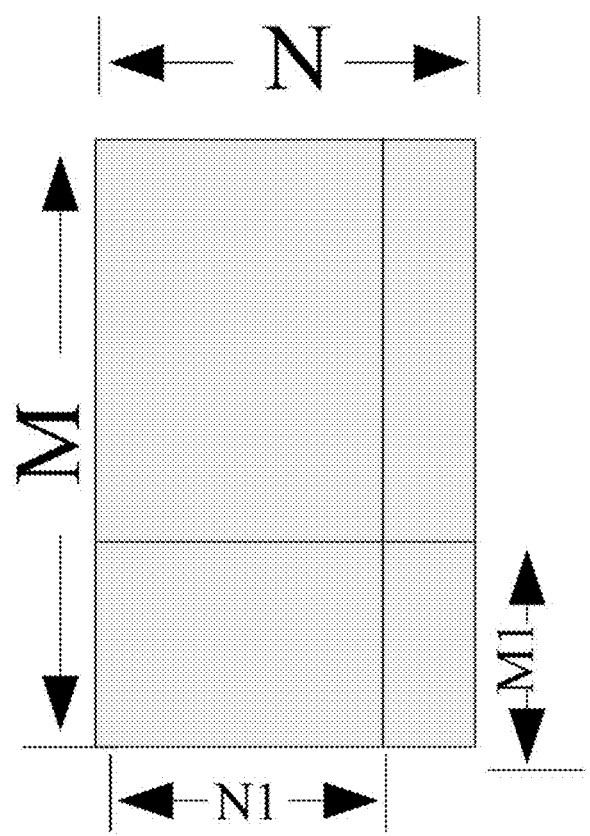
Figures 6J, 6K:
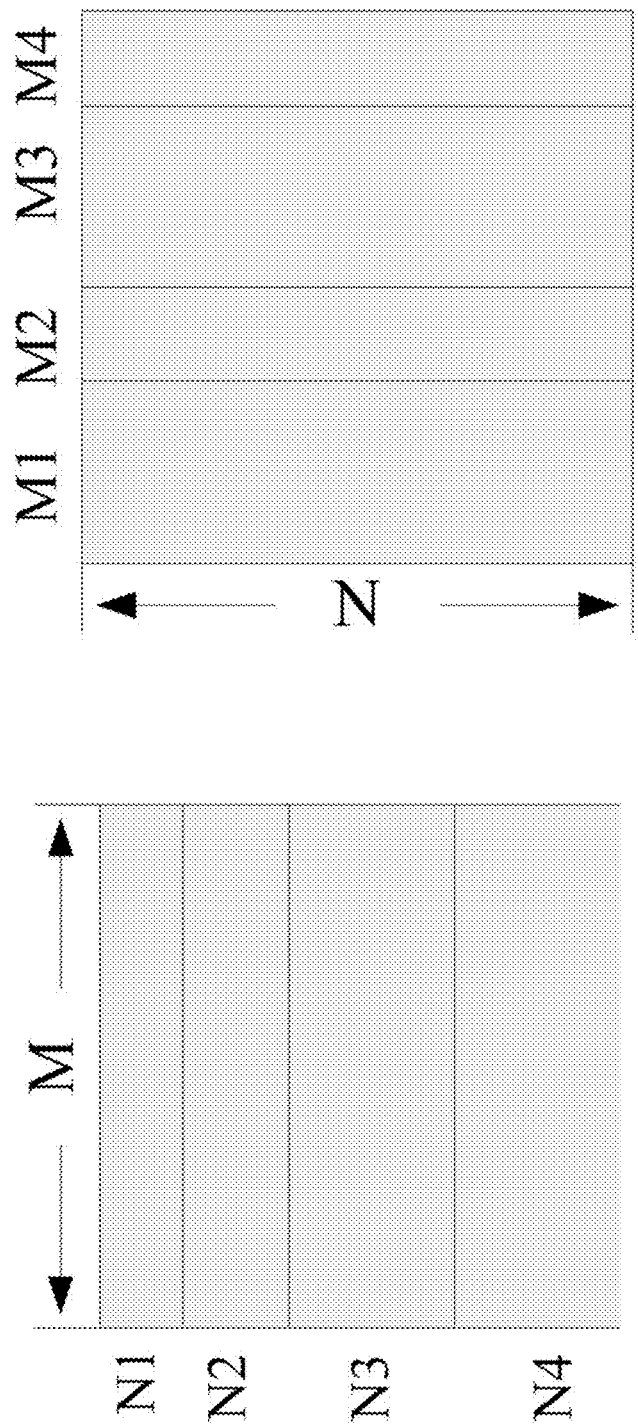
Figure 7B:
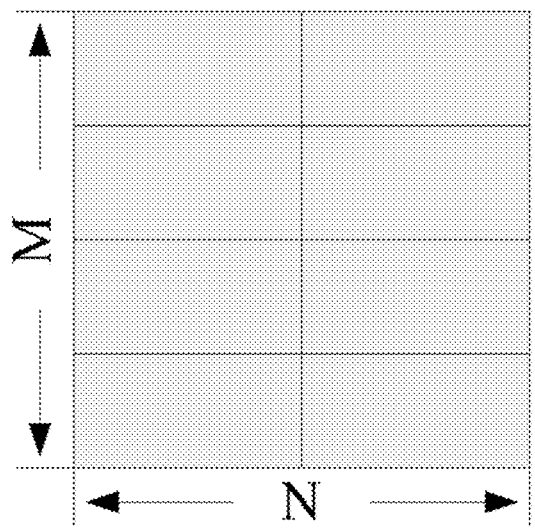
FIG. 7A to 7D show examples of FT partitions.
Figure 7A:
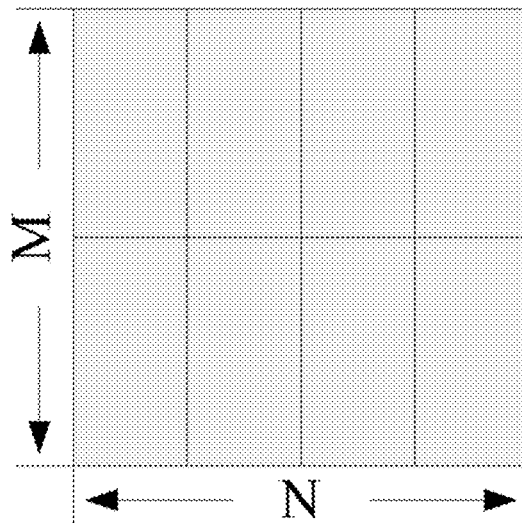
Figure 7D:
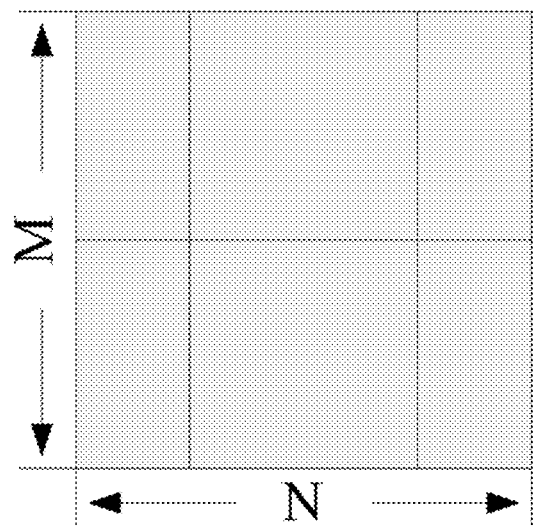
Figure 7C:
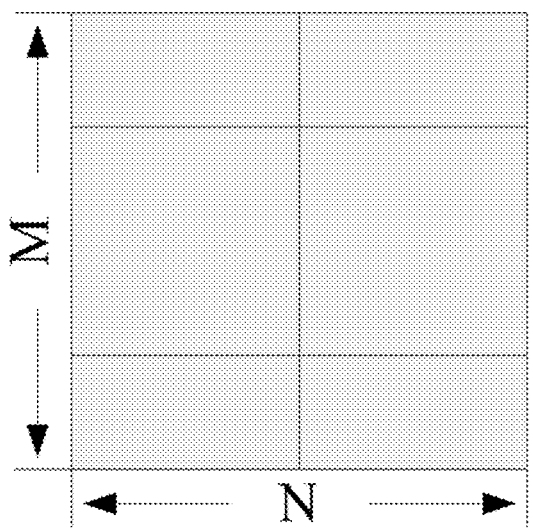

In FIG. 5: (a) quad-tree partitioning (b) vertical binary-tree partitioning (c) horizontal binary-tree partitioning (d) vertical center-side triple-tree partitioning (e) horizontal center-side triple-tree partitioning.

In the above example, there are two levels of trees, region tree (quad-tree) and prediction tree (binary-tree or triple-tree). A CTU is firstly partitioned by region tree (RT). A RT leaf may be further split with prediction tree (PT). A PT leaf may also be further split with PT until max PT depth is reached. A PT leaf is the basic coding unit. It is still called CU for convenience. A CU cannot be further split. Prediction and transform are both applied on CU in the same way as JEM. The whole partition structure is named 'multiple-type-tree'.

Extended Quad Tree

A extended quad tree (EQT) partitioning structure corresponding to a block partitioning process including an extended quad tree partitioning process for the block of video data, wherein the extended quad partitioning structure represents partitioning the block of video data into final sub-blocks, and when the extended quad tree partitioning process decides to apply extended quad tree partition to one given block, said one given block is always split into four sub-blocks; decoding the final sub-blocks based on the video bitstream; and decoding the block of video data based on the final sub-blocks decoded according to the EQT structure derived.

The EQT partitioning process can be applied to a given block recursively to generate EQT leaf nodes. Alternatively, when EQT is applied to a certain block, for each of the sub-block due to EQT, it may further be split into BT and/or QT and/or TT and/or EQT and/or other kinds of partition trees.

In one example, EQT and QT may share the same depth increment process and same restrictions of leaf node sizes. In this case, the partitioning of one node could be implicitly terminated when the size of the node reaches a minimum allowed quad tree leaf node size or EQT depth with the node reaches a maximum allowed quad tree depth.

Alternatively, EQT and QT may share different depth increment process and/or restrictions of leaf node sizes. The partitioning of one node by EQT is implicitly terminated when the size of the node reaches a minimum allowed EQT leaf node size or EQT depth associated with the node reaches a maximum allowed EQT depth. In one example, furthermore, the EQT depth and/or the minimum allowed EQT leaf node sizes may be signaled in sequences parameter set (SPS), and/or picture parameter set (PPS), and/or slice header, and/or CTU, and/or regions, and/or tiles, and/or CUs.

Instead of using the current quad tree partition applied to a square block, for a block with M×N (M and N are non-zero positive integer values, either equal or unequal) size, in EQT, one block may be split equally into four partitions, such as M/4×N or M×N/4 (examples are depicted in FIGS. 6 (a) and (b)) or split equally into four partitions and the partition size is dependent on the maximum and minimum values of M and N. In one example, one 4×32 block may be split into four 4×8 sub-blocks while a 32×4 block may be split into four 8×4 sub-blocks.

Instead of using the current quad tree partition applied to a square block, for a block with M×N (M and N are non-zero positive integer values, either equal or unequal) size, in EQT, one block may be split unequally into four partitions, such as two partitions are with size equal to (M*w0/w)×(N*h0/h) and the other two are with (M*(w−w0)/w)×(N*(h−h0)/h).

For example, w0 and w may be equal to 1 and 2, respectively that is the width is reduced by half while the height could use other ratios instead of 2:1 to get the sub-blocks. Examples for this case are depicted in FIGS. 6 (c) and (e). Alternatively, h0 and h may be equal to 1 and 2, respectively, that is the height is reduced by half while the width could use other ratios instead of 2:1. Examples for this case are depicted in FIGS. 6 (d) and (f).

FIGS. 6 (g) and (h) show two alternative examples of quad tree partitioning.

FIG. 6 (i) shows a more general case of quad tree partitioning with different shapes of partitions.

FIGS. 6 (j) and (k) show general examples of FIGS. 6 (a) and (b).

A flexible tree (FT) partitioning structure corresponding to a block partitioning process including an FT partitioning process for the block of video data, wherein the FT partitioning structure represents partitioning the block of video data into final sub-blocks, and when FT partitioning process decides to apply FT partition to one given block, said one given block is split into K sub-blocks wherein K could be larger than 4; decoding the final sub-blocks based on the video bitstream; and decoding the block of video data based on the final sub-blocks decoded according to the FT structure derived.

The FT partitioning process can be applied to a given block recursively to generate FT tree leaf nodes. The partitioning of one node is implicitly terminated when the node reaches a minimum allowed FT leaf node size or FT depth associated with the node reaches a maximum allowed FT depth.

Alternatively, when FT is applied to a certain block, for each of the sub-block due to FT, it may further be split into BT, and/or QT, and/or EQT, and/or TT, and/or other kinds of partition trees.

Alternatively, furthermore, the FT depth or the minimum allowed FT leaf node sizes or the minimum allowed partition size for FT may be signaled in sequences parameter set (SPS), and/or picture parameter set (PPS), and/or slice header, and/or CTU, and/or regions, and/or tiles, and/or CUs.

Similarly to the proposed EQT, all of the sub-blocks due to FT partitions may be with the same size; alternatively, the sizes of different sub-blocks may be different.

In one example, K is equal to 6 or 8. Some examples are depicted in FIG. 7.

For the TT, the restriction of splitting along either horizontal or vertical may be removed.

Figure 8:
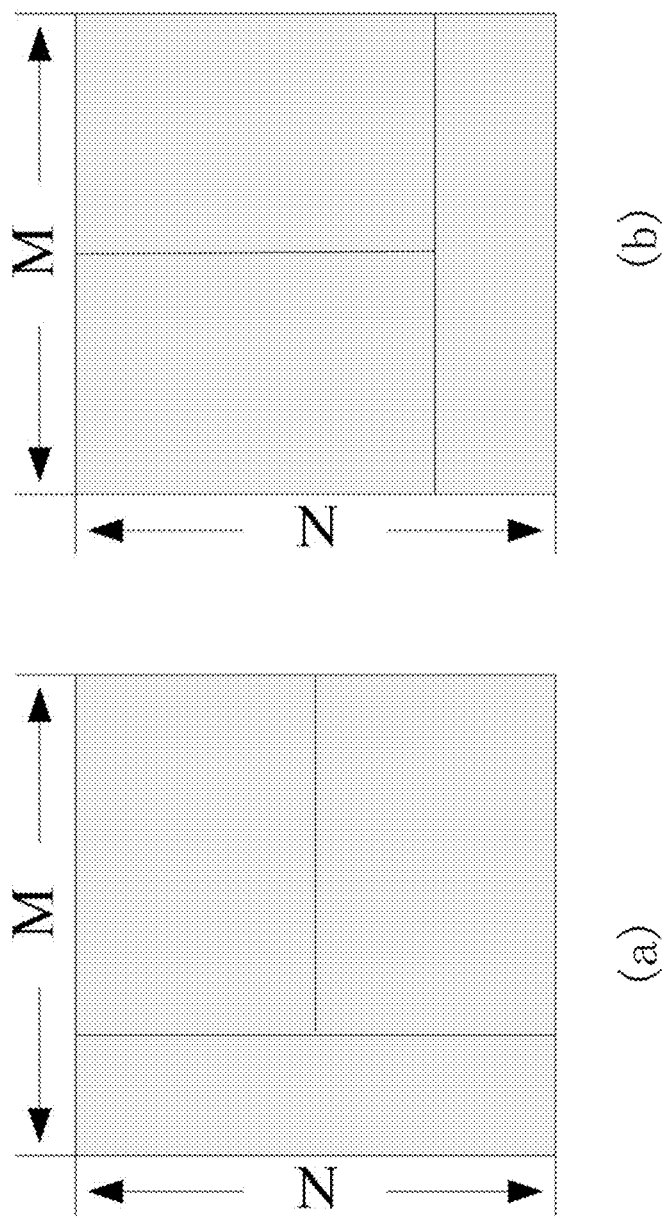
FIG. 8 show examples of GTT partitions.

In one example, a generalized TT (GTT) partition pattern may be defined as splitting for both horizontal and vertical. An example is shown in FIG. 8.

The proposed methods may be applied under certain conditions. In other words, when the condition(s) are not satisfied, there is no need to signal the partition types.

Alternatively, the proposed methods may be used to replace the existing partition tree types. Alternatively, furthermore, the proposed methods may be only used as a replacement under certain conditions.

In one example, the condition may include the picture and/or slice types; and/or block sizes; and/or the coded modes; and/or whether one block is located at picture/slice/tile boundary.

In one example, the proposed EQT may be treated in the same way as QT. In this case, when it is indicated that the partition tree type is QT, more flags/indications of the detailed quad-tree partition patterns may be further signaled. Alternatively, EQT may be treated as additional partition patterns.

In one example, the signaling of partitioning methods of EQT or FT or GTT may be conditional, i.e. one or some EQP/FT/GTT partitioning methods may not be used in some cases, and the bits corresponding to signal these partitioning methods are not signaled.

2.6 Border Handling

A boundary handling method is proposed to Versatile Video Coding (VVC).

Since the forced quadtree boundary partition solution in VVC is not optimized. JVET-K0287 proposed the boundary partition method using regular block partition syntax to keep the continuity CABAC engine as well as matching the picture boundary.

Figure 9:
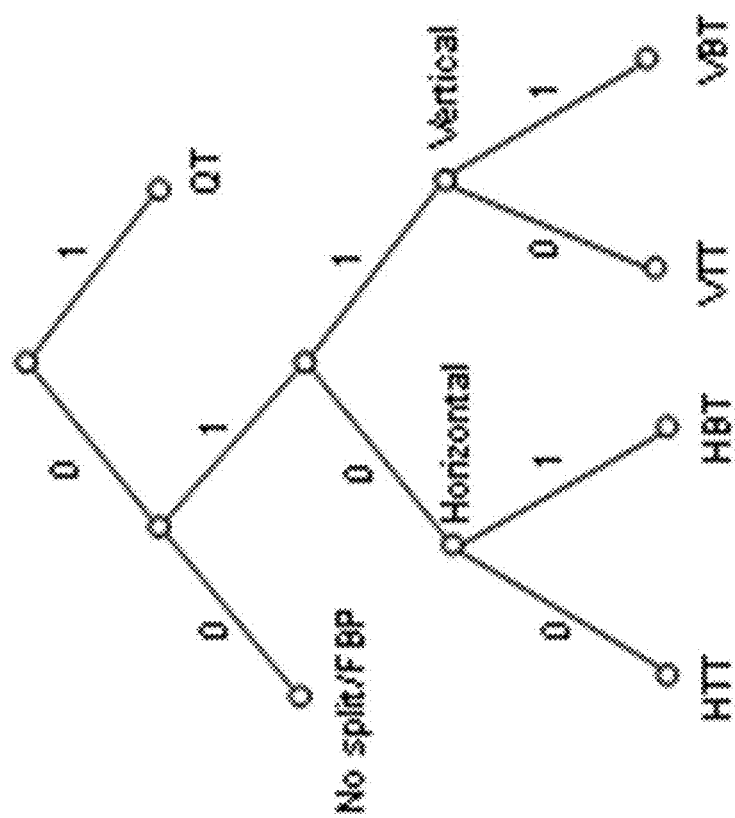
FIG. 9 shows an example of unchanged syntax and changed semantic for versatile boundary partition.

The versatile boundary partition obtains the following rules (both encoder and decoder):

Using exactly same partition syntax of the normal block (non-boundary) (for instance, like FIG. 9) for boundary located block, the syntax need to be unchanged.

If the no split mode is parsed for the boundary CU, used forced boundary partition (FBP) to match the picture boundary.

After forced boundary partition (non-singling boundary partition), no further partition.

The forced boundary partition is descripted as follow:

If the size of block is larger than the maximal allowed BT size, forced QT is used to perform the FBP in the current forced partition level;

Otherwise, if the bottom-right sample of current CU is located below the bottom picture boundary, and not extended the right boundary, forced horizontal BT is used to perform the FBP in the current forced partition level;

Otherwise, if the bottom-right sample of current CU is located at the right side of the right picture boundary, and not below the bottom boundary, forced vertical BT is used to perform the FBP in the current forced partition level;

Otherwise, if the bottom-right sample of current CU is located at the right side of the right picture boundary and below the bottom boundary, forced QT is used to perform the FBP in the current forced partition level.

2.7 Partitioning

AVS Workgroup, short for Audio and Video Coding Standard Workgroup of China was authorized to be established by the Science and Technology Department under the former Ministry of Industry and Information Technology of People's Republic of China in June, 2002. With the mandate of satisfying the demands from the rapidly growing information industry, AVS is committed to producing technical standards of high quality for compression, decompression, processing, and representation of digital audio and video, and thus providing the digital audio-video equipments and systems with high-efficient and economical coding/decoding technologies. AVS can be applied in wide variety of significant information sectors including high-resolution digital broadcast, high-density laser-digital storage media, wireless broad-band multimedia communication and internet broadband stream media.

AVS is one of the second generation of source coding/decoding standards and own independent Chinese intellectual property rights. Source coding technology primarily addresses the problem of coding and compressing audio& video mass data viz. initial data and original sources, hence known as digital video and audio coding technology, and it is the premise of the subsequent digital transmission, storage and broadcast and serves as the common standard for digital video& audio industry.

Figure 16:
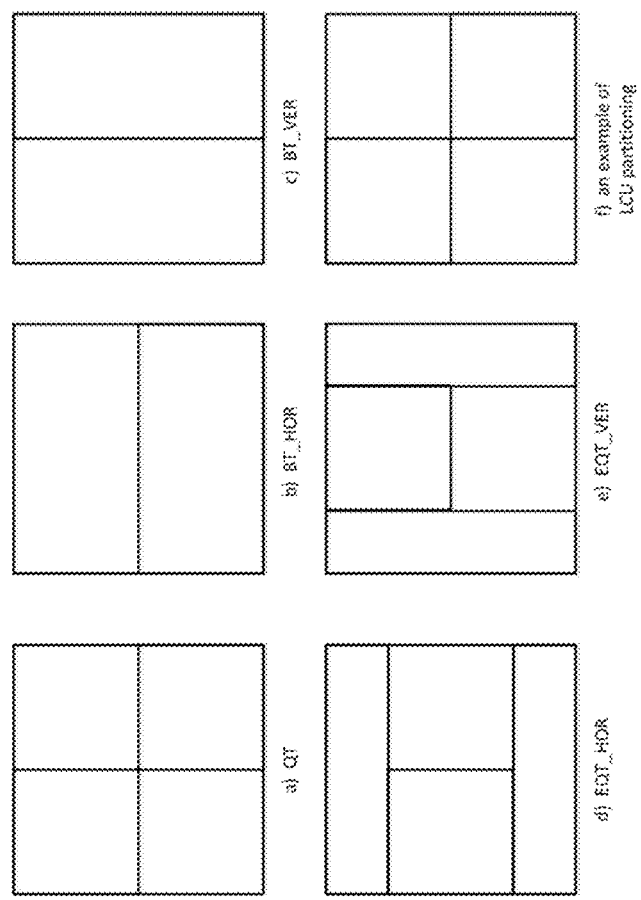
FIG. 16 shows examples of partition types.

Quad-tree (QT) partitioning, binary tree (BT) partitioning and extended quad-tree (EQT) are used to split a LCU into multiple CUs as shown in FIG. 16. Both QT partitioning, BT partitioning and EQT partitioning can be used for the root, internal or leaf nodes of the partitioning tree. However, QT partitioning is forbidden after any BT or EQT partitioning.

3. Examples of Problems Solved by Embodiments

Although the QT/BT/TT coding tree structure in VVC is quite flexible, there is still some partitioning patterns that cannot be attained by QT/BT/TT.

4. Examples of Embodiments

To address the problem, several methods are proposed to handle the cases for EQT.

The detailed techniques below should be considered as examples to explain general concepts. These embodiments should not be interpreted in a narrow way. Furthermore, these embodiments can be combined in any manner.

In the following discussion, QT, BT, TT or UQT may refer to "QT split", "BT split", "TT split" and "UQT split", respectively.

In the following discussion, "split" and "partitioning" have the same meaning.

1. Unsymmetrical Quad-Tree (UQT) partitioning is proposed. With UQT, a block with dimensions W×H is split into four partitions with dimensions W1×H1, W2×H2, W3×H3 and W4×H4, where W1, W2, W3, W4, H1, H2, H3, H4 are all integers.
    a. In one example, and at least one of the partitions has different block size compared to others.
    b. In one example, only two of the four partitions may have equal size, the other two are different with each other and different from the two partitions with equal size.
    c. In one example, all the parameters are in the form of power of 2. For example, $W1=2^{N1}$, $W2=2^{N2}$, $W3=2^{N3}$, $W4=2^{N4}$, $H1=2^{M1}$, $H2=2^{M2}$, $H3=2^{M3}$, $H4=2^{M4}$.
    d. In one example, UQT only splits one partition in vertical direction, for example, H1=H2=H3=H4=H.
        (a) In one example as shown in FIG. 10(*a*), W1=W/8, W2=W/2, W3=W/8, W4=W/4, H1=H2=H3=H4=H. This kind of UQT is vertical split and named as UQT1-V.
        (b) In one example as shown in FIG. 10(*b*), W1=W/8, W2=W/2, W3=W/4, W4=W/8, H1=H2=H3=H4=H. This kind of UQT is vertical split and named as UQT2-V.
        (c) In one example as shown in FIG. 10(*c*), W1=W/4, W2=W/8, W3=W/2, W4=W/8, H1=H2=H3=H4=H. This kind of UQT is vertical split and named as UQT3-V.
        (d) In one example as shown in FIG. 10(*d*), W1=W/8, W2=W/4, W3=W/2, W4=W/8, H1=H2=H3=H4=H. This kind of UQT is vertical split and named as UQT4-V.
    e. In one example, UQT only splits one partition in horizontal direction, for example, W1=W2=W3=W4=W.
        (a) In one example as shown in FIG. 10(*e*), H1=H/8, H2=H/2, H3=H/8, H4=H/4, W1=W2=W3=W4=W. This kind of UQT is horizontal split and named as UQT1-H.
        (b) In one example as shown in FIG. 10(*f*), H1=H/8, H2=H/2, H3=H/4, H4=H/8, W1=W2=W3=W4=W. This kind of UQT is horizontal split and named as UQT2-H.
        (c) In one example as shown in FIG. 10(*g*), H1=H/4, H2=H/8, H3=H/2, H4=H/4, W1=W2=W3=W4=W. This kind of UQT is horizontal split and named as UQT3-H.
        (d) In one example as shown in FIG. 10(*h*), H1=H/8, H2=H/4, H3=H/2, H4=H/8, W1=W2=W3=W4=W. This kind of UQT is horizontal split and named as UQT4-H.
2. A block which is split into child blocks by UQT, may be split from a parent block by QT or BT or TT or UQT.
    a. A block which may allow UQT partitions, may be a block generated by QT or BT or TT or UQT partitions.
    b. A block which may allow UQT partitions, may be a block generated by QT or EQT or BT partitions.
        (a) Alternatively, A block which may allow UQT partitions, may be a block generated by UQT, QT, EQT or BT partitions.

c. For example, the maximum block that allows UQT partitions, may be the largest coding block (coding tree block or coding tree unit).
d. For example, the maximum block that allows UQT partitions, may be the virtual pipeline data unit (VPDU).
e. For example, a block which allows UQT partitions may be split from a parent block by one or some specific kinds of split methods. For example, a block which is split into child blocks by UQT, can only be split from a parent block by QT.
f. In one example, the maximum/minimum block size that could allow UQT partitions and/or the maximum depth that could allow UQT partitions may be signalled in SPS/PPS/VPS/APS/sequence header/picture header/slice header/tile group header/CTU row/regions, etc. al.
g. In one example, the maximum/minimum block size that could allow UQT partitions and/or the maximum depth that could allow UQT partitions may be dependent of profile/level/tier of a standard.
h. In one example, the maximum/minimum block size that could allow UQT partitions and/or the maximum depth that could allow UQT partitions may be derived, such as to be the same as that allow QT partitions.

3. A block which is split from a parent block by UQT, may be further split into child blocks by QT and/or BT and/or TT and/or UQT.
a. For example, a block which is split from a parent block by UQT, may be further split into child blocks by BT.
b. For example, a block which is split from a parent block by UQT, may be further split into child blocks by TT.
c. For example, a block which is split from a parent block by UQT, may be further split into child blocks by UQT and/or QT.
d. For example, a block which is split from a parent block by UQT, cannot be further split into child blocks by QT.
e. For example, a block which is split from a parent block by UQT, may be further split into child blocks by EQT.
   (a) Alternatively, for a block split from a parent block by UQT, it may be further split into child blocks by UQT, EQT and BT.
f. For example, a block which is split from a parent block by UQT, is disallowed to be further split into child blocks by UQT.
   (a) Alternatively, for a block split from a parent block by UQT, it may be further split into child blocks by EQT and BT.

Figure 10A:
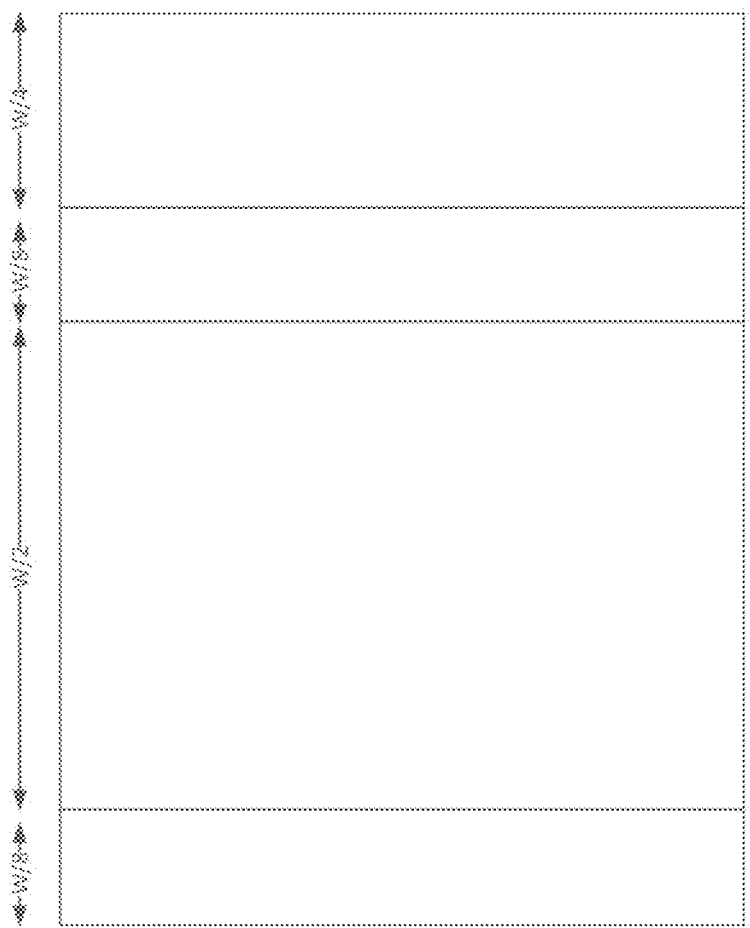
Figure 10B:
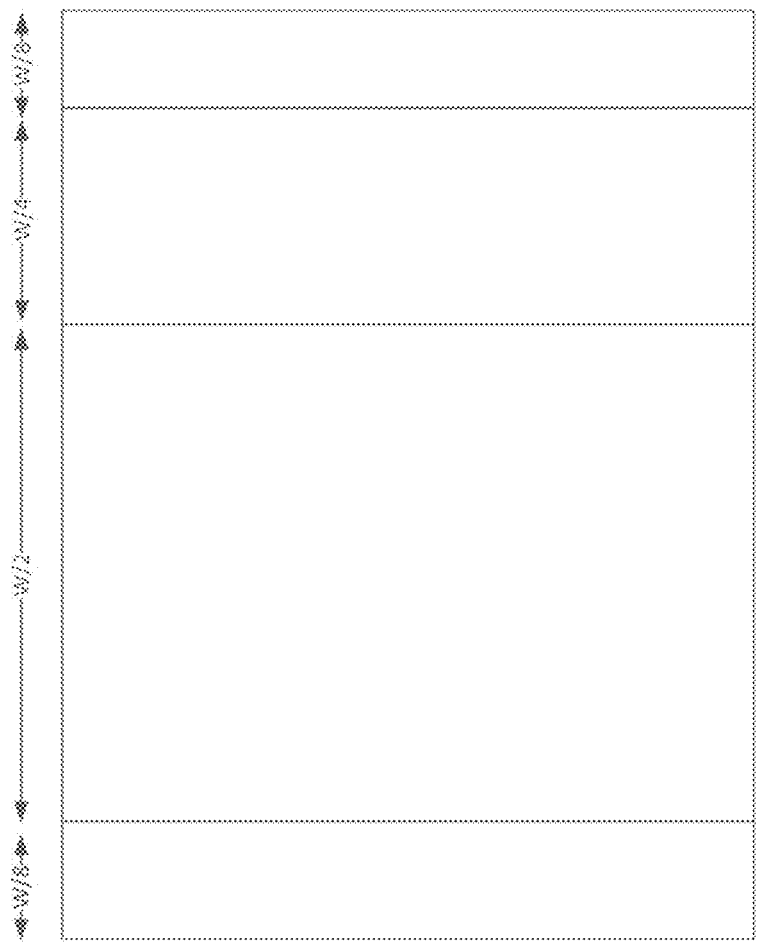
Figure 10C:
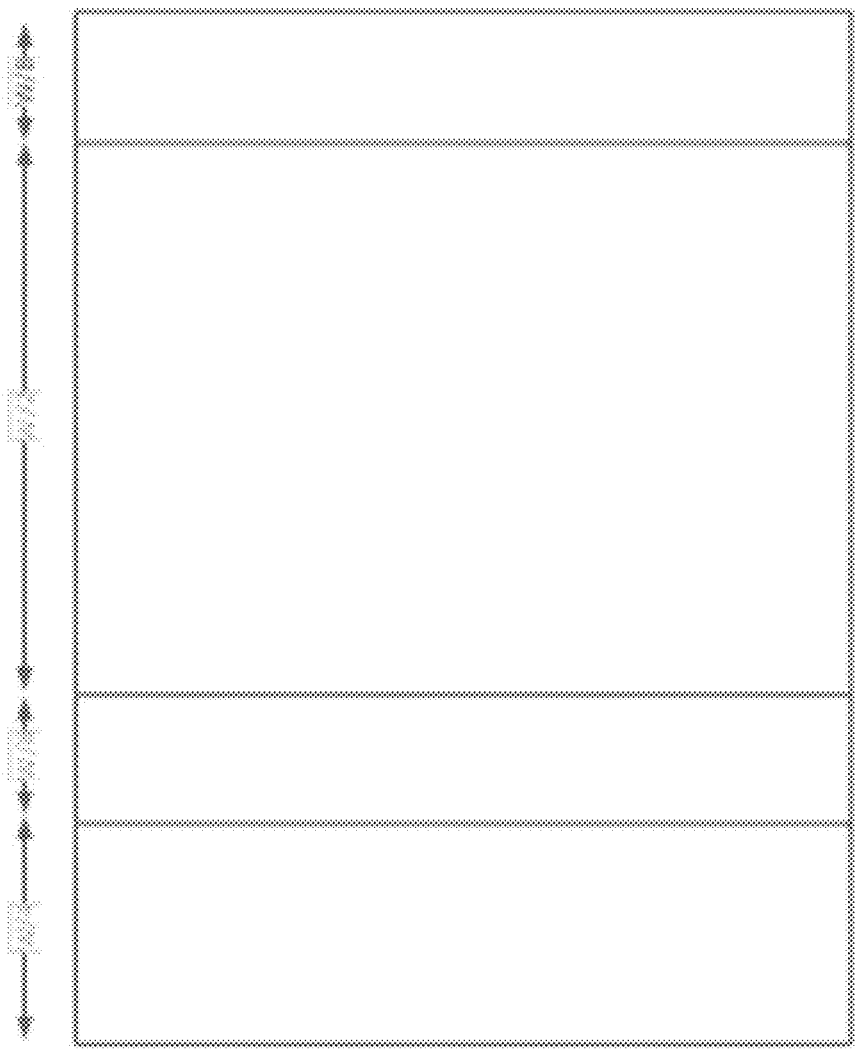
Figure 10D:
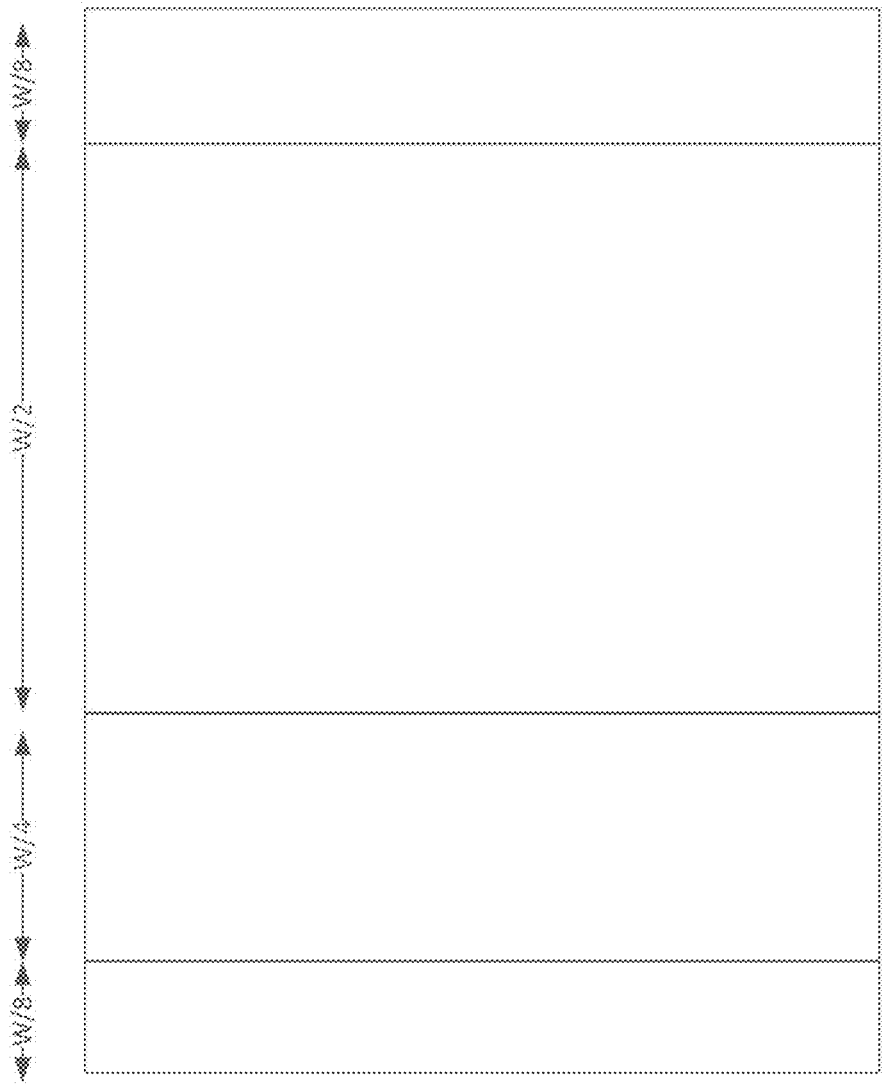
Figure 10F:
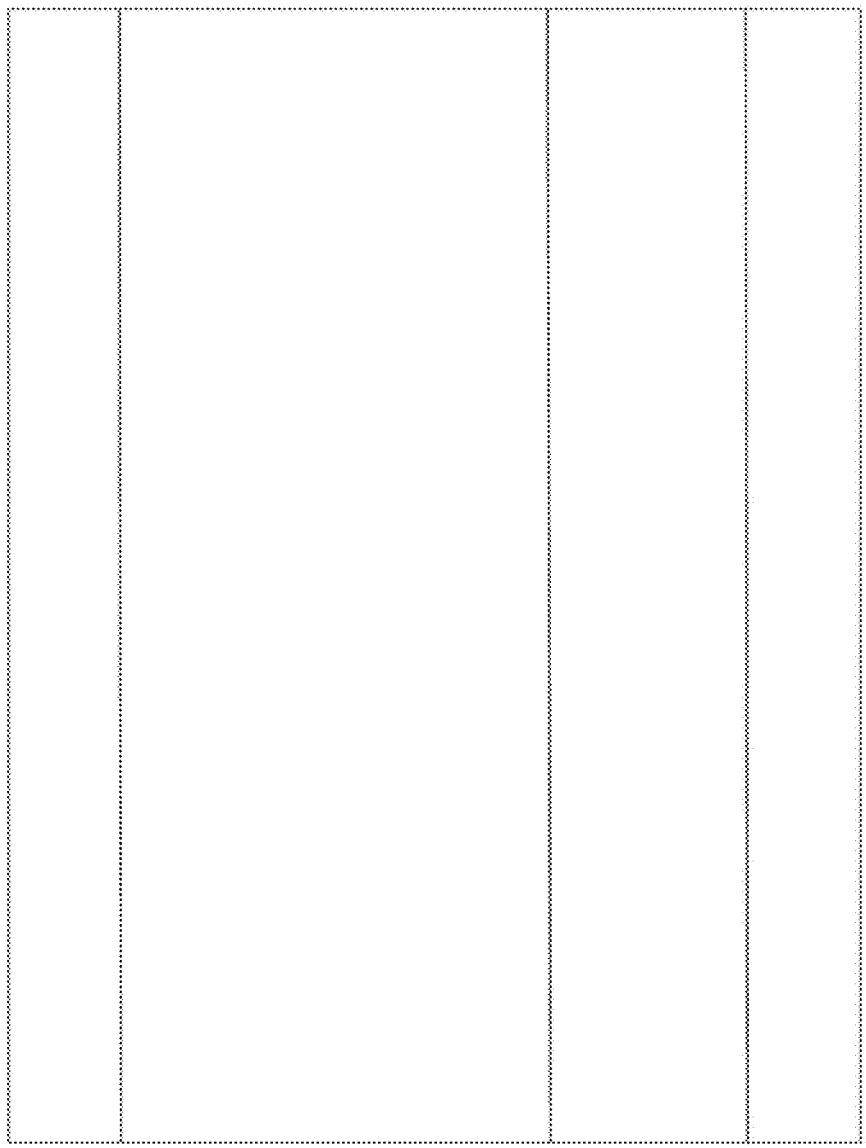
Figure 10G:
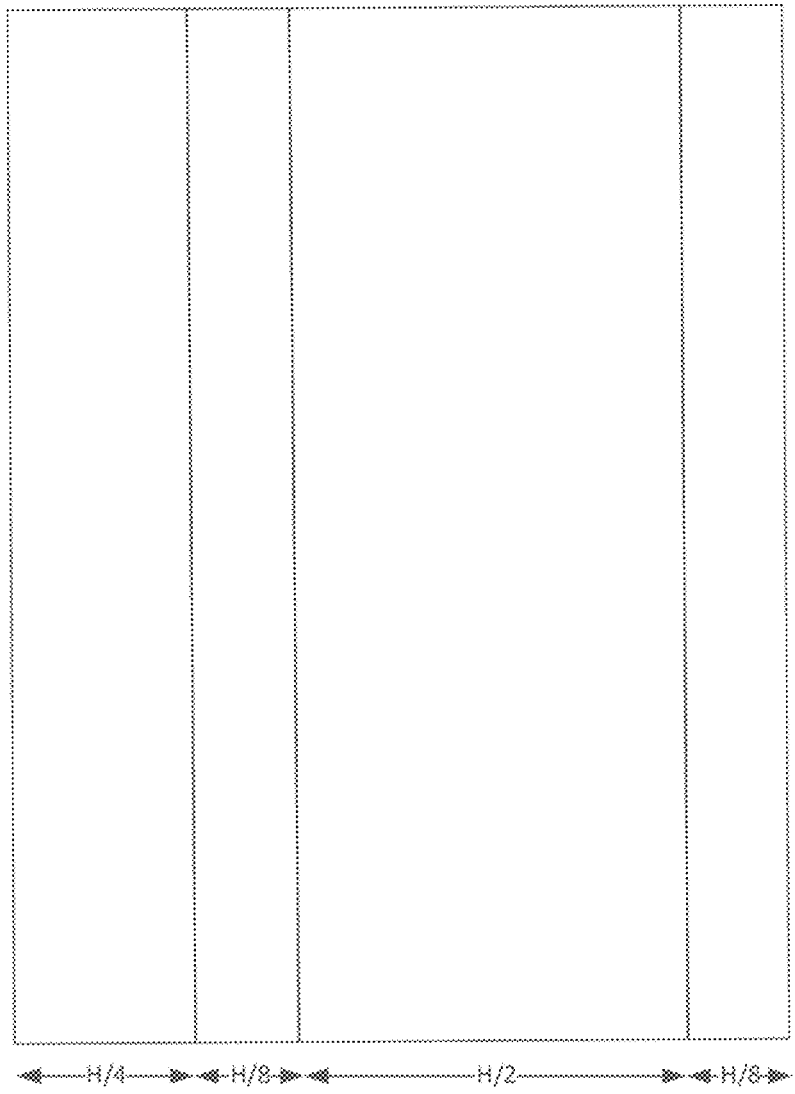
Figure 10H:
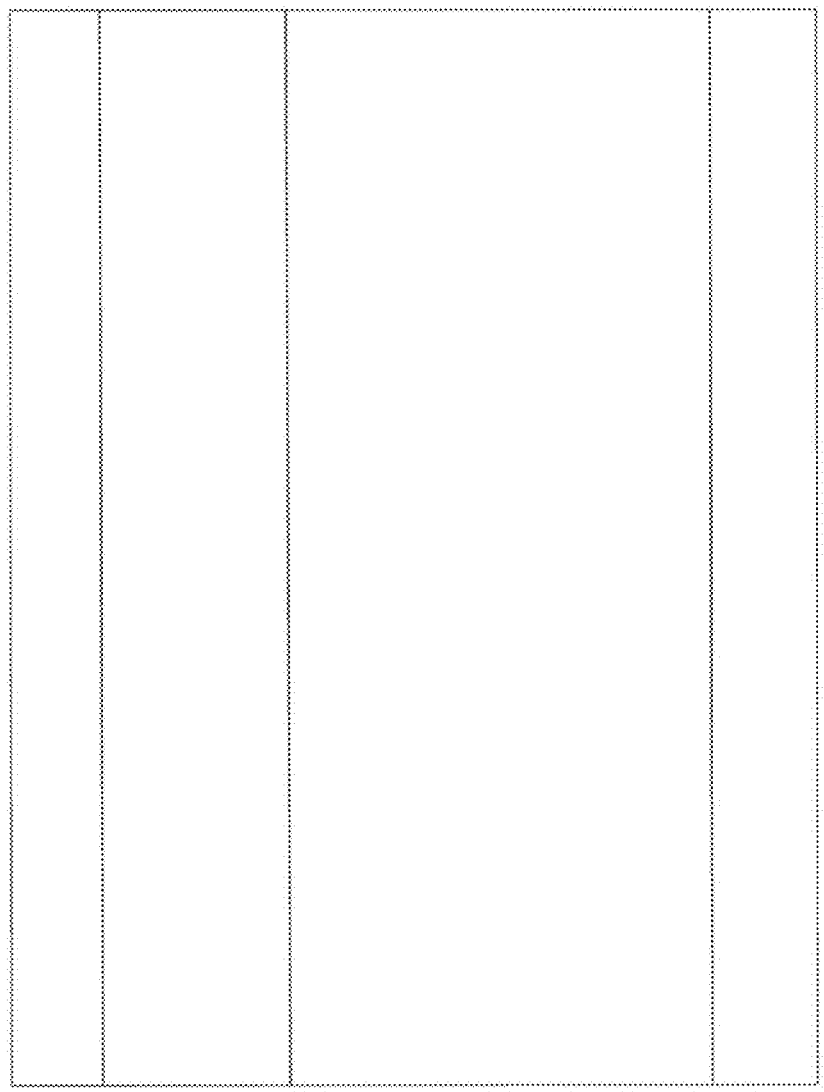

4. When a parent block is split into child blocks by UQT, the split depth of the child block may be derived from the split depth of the parent block.
a. In one example, the splitting due to UQT may be used to update the QT/BT/TT/UQT/MTT depth.
   (a) In one example, the QT depth of one or all of the child blocks is equal to the QT depth of the parent block added by 1.
   (b) In one example, the BT depth of one or all of the child blocks is equal to the BT depth of the parent block added by 1.
   (c) In one example, the TT depth of one or all of the child blocks is equal to the TT depth of the parent block added by 1.
   (d) In one example, the UQT depth of one or all of the child blocks is equal to the UQT depth of the parent block added by 1.
   (e) In one example, the MTT depth of one or all of the child block is equal to the MTT depth of the parent block added by 1.
      1. For example, the MTT depth of the child block is equal to the MTT depth of the parent block added by 1 if the parent block is split into child blocks by BT.
      2. For example, the MTT depth of the child block is equal to the MTT depth of the parent block added by 1 if the parent block is split into child blocks by TT.
      3. Alternatively, the MTT depth of one or all of the child block is equal to the MTT depth of the parent block added by K, K>1. For example, K=2.
         a. In one example, K may be different for different child blocks.
            i. In one example, K=log 2 (the size of the parent block/the size of the child block). For example as shown in FIG. 10B, Ks for the four child blocks with W1=W/8, W2=W/2, W3=W/4 and W4=W/8 are 3, 1, 2, 3, respectively.
   b. In one example, the UQT/BT/TT/QT/MTT depth increasement for different child block may be different.
      (a) The depth increasement is dependent on the ratio of a child block compared to the parent block.

5. Whether and how to use UQT may depend on color format (such as 4:4:4 or 4:2:0) and/or color components.
a. Whether and how to use UQT may depend on whether luma and chroma coding trees are separated.
b. In one example, UQT can only be applied on luma component when luma and chroma coding trees are separated.

6. Whether to apply UQT and/or which kind UQT is applied may be signaled from encoder to decoder.
a. In one example, it may be signaled in VPS/SPS/PPS/picture header/slice header/tile group header/tile header to indicate whether UQT can be applied.
b. In one example, it may be signaled in VPS/SPS/PPS/picture header/slice header/tile group header/tile header to indicate which kinds of UQT can be applied.
c. In one example, it may be signaled in a block to indicate whether UQT is used to split that block.
d. In one example, it may be signaled in a block to indicate which kind of UQT is used to split that block.
e. In one example, an index of partition type may be signaled in a block to indicate whether a block is split by QT, or UQT or non-split.
   (a) Alternatively, furthermore, the splitting direction (horizontal/vertical) and/or splitting patterns may be further signalled.
f. In one example, an index of partition type may be signaled in a block to indicate whether a block is split by BT, or TT, or UQT.
   (a) For example, this index may be conditionally signaled, such as only when at least one of BT, TT and UQT is valid for this block.

(b) Alternatively, furthermore, the splitting direction (horizontal/vertical) and/or splitting patterns may be further signalled.
g. In one example, indication of splitting direction may be firstly signalled, followed by splitting pattern (such as QT, TT, UQT).
   (a) In one example, a flag is signaled in a block to indicate whether a block is vertical split or horizontal split. The vertical split may be BT vertical split, TT vertical split or UQT vertical split. The horizontal split may be BT horizontal split, TT horizontal split or UQT horizontal split.
   (b) For example, this flag is signaled only when the block is split by BT, or TT, or UQT.
   (c) For example, this flag is signaled only when both vertical split and horizontal split are valid for this block.
      1. If only vertical split is valid, the flag is not signaled, and horizontal split is inferred to be used.
      2. If only horizontal split is valid, the flag is not signaled, and vertical split is inferred to be used.
h. In one example, a binarized code is signaled in a block to indicate which kind of split (BT, TT, or a kind of UQT) is used. In following examples, X represents 0 or 1 and Y=~X (Y=1 if X=0 and Y=0 if X=1).
   (a) In one example, the candidate BT, TT or UQTs to be signaled are all vertical splits or horizontal splits depending on previously signaled or derived information.
   (b) In one example, a first flag is signaled to indicate whether UQT is used. For example, the binarized codewords orderly to represent BT, TT, UQT1, UQT2, UQT3 and UQT4 are XX, XY, YXX, YXY, YYX, YYY.
   (c) In one example, truncated unary code is applied. For example, the binarized codewords orderly to represent BT, TT, UQT1, UQT2, UQT3 and UQT4 are X, YX, YYX, YYYX, YYYYX, YYYYY.
   (d) In one example, a first flag is signaled to indicate whether BT is used. If BT is not used, then a second flag is signaled to indicate whether UQT is used. If UQT is used, which kind of UQT is used is further signaled. For example, the binarized codewords orderly to represent BT, TT, UQT1, UQT2, UQT3 and UQT4 are X, YX, YYXX, YYXY, YYYX, YYYY.
7. In one example, how to signal which kind of split is used in a block may depend on which kinds of split are valid for the block. In following examples, X represents 0 or 1 and Y=~X (Y=1 if X=0 and Y=0 if X=1).
   a. In one example, the candidate BT, TT or UQTs to be signaled are all vertical splits or horizontal splits depending on previously signaled or derived information.
   b. For example, the non-allowed or invalid split cannot be signaled from the encoder to the decoder, i.e. there is no codeword to represent the non-allowed or invalid split.
   c. In one example, if there is only one kind of split from BT, TT and UQTs is valid, then the binarized code to indicate which kind of split (BT, TT, or a kind of UQT) is used is not signaled.
   d. In one example, if there are only two kinds of split from BT, TT and UQTs are valid, then a flag is signaled to indicate which one of the two valid splits is used.
   e. In one example, the code to indicate which kind of split (BT, TT, or a kind of UQT) is binarized as a truncated unary code.
      (a) For example, the maximum value of the truncated unary code is N−1, where N is the number of valid splits (BT, TT and UQTs).
      (b) For example, no codeword represents an invalid split. In other words, the invalid split is skipped when building the codeword table.
   f. In one example, if no UQT is valid, the flag indicating whether UQT is used is not signaled and inferred to be false. For example, the binarized codewords orderly to represent BT and TT are X and Y.
   g. In one example, if only one kind of UQT is valid and UQT is signaled to be used, then no further information is signaled to indicate which UQT is used. The valid UQT is used implicitly.
   h. In one example, if only two kinds of UQT are valid and UQT is signaled to be used, then a flag is signaled to indicate which UQT is used.
   i. In one example, if only three kinds of UQT are valid and UQT is signaled to be used, then a message is signaled to indicate which UQT is used. For example, the binarized codewords orderly to represent the three UQTs are X, YX, YY.
   j. In one example, the binarization and/or signaling method is not changed according to which kinds of split is valid in the block. An invalid split cannot be chosen in a conformance bit-stream.
8. A bin (bit) of a bin string for indications of split types can be coded by arithmetic coding with one or multiple contexts.
   a. In one example, only partial bins of a bin string may be coded with contexts and remaining bins may be coded with bypass mode (i.e., no context is utilized).
   b. Alternatively, all bins of a bin string may be coded with contexts.
   c. Alternatively, all bins of a bin string may be coded with bypass mode.
   d. For a bin coded with context, one or multiple contexts may be used.
   e. The context may depend on:
      (a) The position or index of the bin.
      (b) The partitioning of spatial/temporal neighbouring blocks.
      (c) The current partition depth (e.g., QT depth/BT depth/TT depth/UQT depth/MTT depth) of current block.
      (d) The partition depth (e.g., QT depth/BT depth/TT depth/UQT depth/MTT depth) of spatial/temporal neighbouring blocks and/or spatial/temporal non-adjacent blocks.
      (e) The coding modes of spatial/temporal neighbouring blocks.
      (f) The width/height of spatial/temporal neighbouring blocks.
      (g) The width/height of the current block
      (h) Slice types/picture types/tile group type
      (i) Color component
      (j) Statistical results of partition types from previously coded blocks
9. UQT is not allowed if a split child block cross more than one Virtual pipeline data units (VPDUs).

10. UQT is not allowed if the width/height of the current block satisfy some conditions. (Suppose the width and height of the current block are W and H, T1, T2 and T are some integers)
    a. UQT is not allowed if W>=T1 and H>=T2;
    b. UQT is not allowed if W>=T1 or H>=T2;
    c. UQT is not allowed if W<=T1 and H<=T2;
    d. UQT is not allowed if W<=T1 or H<=T2;
    e. UQT is not allowed if W×H<=T;
    f. UQT is not allowed if W×H>=T;
    g. Horizontal UQT is not allowed if H<=T; For example, T=16.
    h. Horizontal UQT is not allowed if H>=T; For example, T=128.
    i. Vertical UQT is not allowed if W<=T; For example, T=16.
    j. Vertical UQT is not allowed if W>=T; For example, T=128.
    k. T1, T2 and T may be signaled from the encoder to the decoder in VPS/SPS/PPS/picture header/slice header/tile group header/tile header.
    l. T1, T2 and T may depend on color components. For example, T1, T2 and T may be different for luma and chroma components.
    m. T1, T2 and T may depend on whether luma coding tree and chroma coding tree are separated. For example, T1, T2 and T may be different for luma and chroma components if luma coding tree and chroma coding tree are separated.
    n. Alternatively, when the transform is not supported for at least one child block due to UQT, UQT split is invalid.
    o. Alternatively, when the depth of one block exceeding the allowed depth for UQT splitting, UQT split is invalid.
    p. Alternatively, when any of a child block size exceeding the allowed block size due to UQT splitting, UQT split is invalid.

11. UQT is allowed if the width/height of the current block satisfy some conditions. (Suppose the width and height of the current block are W and H, T1, T2 and T are some integers)
    a. UQT is allowed if W>=T1 and H>=T2;
    b. UQT is allowed if W>=T1 or H>=T2;
    c. UQT is allowed if W<=T1 and H<=T2;
    d. UQT is allowed if W<=T1 or H<=T2;
    e. UQT is allowed if W×H<=T;
    f. UQT is allowed if W×H>=T;
    g. Horizontal UQT is allowed if H<=T; For example, T=64.
    h. Horizontal UQT is allowed if H>=T; For example, T=32.
    i. Vertical UQT is allowed if W<=T; For example, T=64.
    j. Vertical UQT is allowed if W>=T; For example, T=32.
    k. T1, T2 and T may be signaled from the encoder to the decoder in VPS/SPS/PPS/picture header/slice header/tile group header/tile header.
    l. T1, T2 and T may depend on color components. For example, T1, T2 and T may be different for luma and chroma components.
    m. T1, T2 and T may depend on whether luma coding tree and chroma coding tree are separated. For example, T1, T2 and T may be different for luma and chroma components if luma coding tree and chroma coding tree are separated.
    n. In one example, T1, T2 and T may depend on picture/slice types.
        (a) In one example, Horizontal UQT is allowed if TP1<=H<=TP2 and/or Vertical UQT is allowed if TP1<=W<=TP2 on a P-slice/P-picture or a B-slice/B-picture, and Horizontal UQT is allowed if TI1<=H<=TI2 and/or Vertical UQT is allowed if TI1<=W<=TI2 on an I-slice/I-picture, then
            1. In one example, TP1 is larger than TI1. For example, TI1=32, TP1=64, TI2=TP2=64.
            2. In one example, TP2 is smaller than TI2. For example, TI2=64, TP2=32, TI1=TP1=32.

12. UQT is not allowed if the depth of the current block satisfy some conditions. The depth of the current block may refer to QT depth, BT depth, TT depth, UQT depth or MTT depth.
    a. UQT is not allowed if the split depth <=T;
    b. UQT is not allowed if the split depth >=T;
    c. UQT is not allowed if the QT split depth <=T;
    d. UQT is not allowed if the QT split depth >=T;
    e. UQT is not allowed if the BT split depth >=T;
    f. UQT is not allowed if the BT split depth <=T;
    g. UQT is not allowed if the TT split depth >=T;
    h. UQT is not allowed if the TT split depth >=T;
    i. UQT is not allowed if the UQT split depth <=T;
    j. UQT is not allowed if the UQT split depth >=T;
    k. UQT is not allowed if the MTT split depth <=T;
    l. UQT is not allowed if the MTT split depth >=T;
    m. T may be signaled from the encoder to the decoder in VPS/SPS/PPS/picture header/slice header/tile group header/tile header.
    n. T may depend on color components. For example, T1, T2 and T may be different for luma and chroma components.
    o. T may depend on whether luma coding tree and chroma coding tree are separated. For example, T1, T2 and T may be different for luma and chroma components if luma coding tree and chroma coding tree are separated.

13. UQT is allowed if the depth of the current block satisfy some conditions. The depth of the current block may refer to QT depth, BT depth, TT depth, UQT depth or MTT depth.
    a. UQT is allowed if the split depth <=T;
    b. UQT is allowed if the split depth >=T;
    c. UQT is allowed if the QT split depth <=T;
    d. UQT is allowed if the QT split depth >=T;
    e. UQT is allowed if the BT split depth >=T;
    f. UQT is allowed if the BT split depth <=T;
    g. UQT is allowed if the TT split depth >=T;
    h. UQT is allowed if the TT split depth >=T;
    i. UQT is allowed if the UQT split depth <=T;
    j. UQT is allowed if the UQT split depth >=T;
    k. UQT is allowed if the MTT split depth <=T;
    l. UQT is allowed if the MTT split depth >=T;
    m. T may be signaled from the encoder to the decoder in VPS/SPS/PPS/picture header/slice header/tile group header/tile header.
    n. T may depend on color components. For example, T1, T2 and T may be different for luma and chroma components.
    o. T may depend on whether luma coding tree and chroma coding tree are separated. For example, T1, T2 and T may be different for luma and chroma components if luma coding tree and chroma coding tree are separated.

Figure 11:
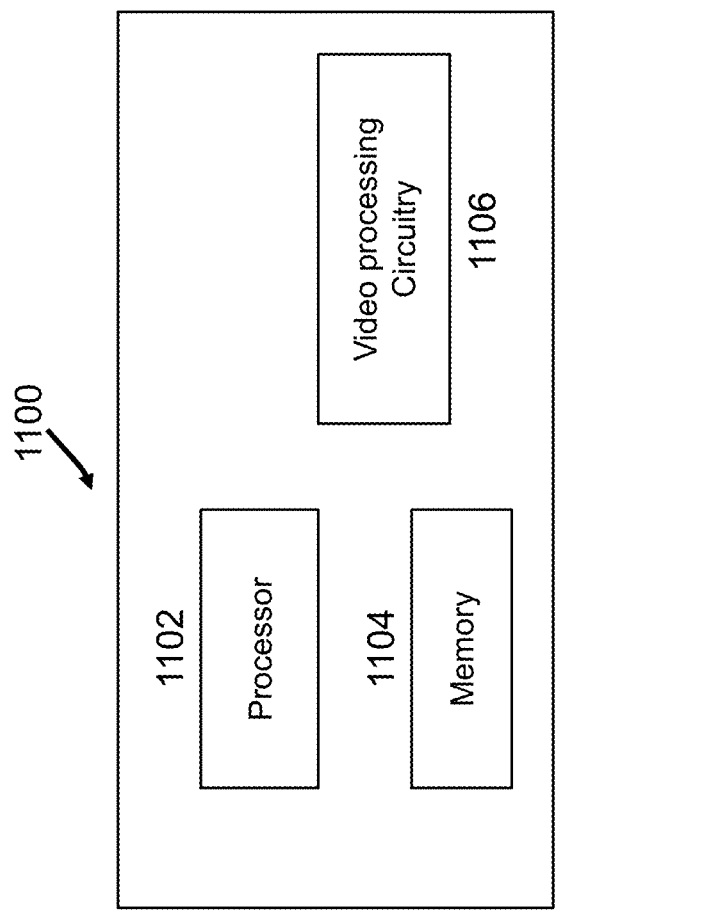
FIG. 11 is a block diagram of an example of a video processing apparatus.

14. In one embodiment, whether and how to use UQT may depend on the position of the current block. For example, whether and how to use UQT may depend on the whether the current block crosses the picture/tile/tile group border or not.
    a. In one example, vertical UQT is not allowed if the current block crosses the picture/tile/tile group bottom border.
    b. In one example, horizontal UQT is not allowed if the current block crosses the picture/tile/tile group bottom border.
    c. In one example, vertical UQT is not allowed if the current block crosses the picture/tile/tile group right border.
    d. In one example, horizontal UQT is not allowed if the current block crosses the picture/tile/tile group right border.
    e. In one example, if a child block split by UQT is totally out of the picture/tile/tile group, the child block may be omitted in the encoding/decoding process.
    f. In one example, if a child block split by UQT is partially out of the picture/tile/tile group, the following may apply
        (a) The part out of the picture may be omitted in the encoding/decoding process.
        (b) The part inside the picture may be further split.
        (c) The part inside the picture may be coded as a CU.
            1. Whether the part inside the picture is coded as a CU may depend on the width (w) and height (h) of the part.
                a. In one example, the part inside the picture may be coded as a CU if $w=2^{nw}$, $h=2^{nh}$, where nw and nh are integers.
    g. In one example, if any child block split by UQT is partially/fully out of the picture/tile/tile group, UQT is disallowed.
    h. In one example, when UQT or certain UQT patterns is disallowed, the signalling of indication of the usage of the patterns is also skipped.
15. In one example, only UQTa-H, UQTb-H, UQTc-V and UQTd-V as shown in FIG. 11 can be used. For example, a=c=2 and b=d=4.
    a. In one example, one bin possibly with one or more contexts is signaled to indicate whether a block is split or not, when the block can be non-split, and at least one of QT, BT-H, BT-V, TT-H, TT-V, UQTa-H, UQTb-H, UQTc-V and UQTd-V is applicable in this block.
    b. In one example, one bin possibly with one or more contexts is signaled to indicate whether a block is split with QT or other splits, when the block is split, and it can be QT split, and at least one of BT-H, BT-V, TT-H, TT-V, UQTa-H, UQTb-H, UQTc-V and UQTd-V is applicable in this block.
    c. In one example, one bin possibly with one or more contexts is signaled to indicate whether a block is split with vertical or horizontal split, when the block is split other than QT, at least one of BT-H, TT-H, UQTa-H, UQTb-H is applicable in this block, and at least one of BT-V, TT-V, UQTc-V and UQTd-V is applicable in this block.
    d. In one example, one bin possibly with one or more contexts is signaled to indicate whether a block is split with UQT or not,
        (a) when the block is horizontal split other than QT, and at least one of BT-H, TT-H are available, and at least one of UQTa-H, UQTb-H is applicable in this block.
        (b) when the block is vertical split other than QT, and at least one of BT-V, TT-V are available, and at least one of UQTc-V, UQTd-V is applicable in this block.
    e. In one example, one bin possibly with one or more contexts is signaled to indicate whether a block is split with,
        (a) UQTa-H or UQTb-H, when the block is horizontal split with UQT and both UQTa-H, UQTb-H is applicable in this block.
        (b) UQTc-V or UQTd-V, when the block is vertical split with UQT and both UQTc-V, UQTd-V is applicable in this block.
    f. In one example, one or multiple child block of UQTa-H is not allowed to be further split with TT-H. For example, the child block with height equal to H/2 is not allowed to be further split with TT-H.
    g. In one example, one or multiple child block of UQTb-H is not allowed to be further split with TT-H. For example, the child block with height equal to H/2 is not allowed to be further split with TT-H.
    h. In one example, one or multiple child block of UQTc-V is not allowed to be further split with TT-V. For example, the child block with width equal to W/2 is not allowed to be further split with TT-V.
    i. In one example, one or multiple child block of UQTd-V is not allowed to be further split with TT-V. For example, the child block with width equal to W/2 is not allowed to be further split with TT-V.
    j. In one example, one or multiple child block of UQTa-H is not allowed to be further split with BT-H.
    k. In one example, one or multiple child block of UQTb-H is not allowed to be further split with BT-H.
    l. In one example, one or multiple child block of UQTc-V is not allowed to be further split with BT-V.
    m. In one example, one or multiple child block of UQTd-V is not allowed to be further split with BT-V.
    n. In one example, one or multiple child block of UQTa-H is not allowed to be further split with UQT-H.
    o. In one example, one or multiple child block of UQTb-H is not allowed to be further split with UQT-H.
    p. In one example, one or multiple child block of UQTc-V is not allowed to be further split with UQT-V.
    q. In one example, one or multiple child block of UQTd-V is not allowed to be further split with UQT-V.
    r. In one example, one or multiple child block of UQTa-H is not allowed to be further split.
    s. In one example, one or multiple child block of UQTb-H is not allowed to be further split.
    t. In one example, one or multiple child block of UQTc-V is not allowed to be further split.
    u. In one example, one or multiple child block of UQTd-V is not allowed to be further split.
    v. In one example, one of UQTa-H and UQTb-H is not allowed to be further split.
    w. In one example, one of UQTa-H and UQTb-H is not allowed to be further horizontal split.
    x. In one example, one of UQTc-V and UQTd-V is not allowed to be further split.

y. In one example, one of UQTc-V and UQTd-V is not allowed to be further vertical split.
z. In one example, one or multiple child block of UQTa-H is not allowed to be further split with EQT-H.
aa. In one example, one or multiple child block of UQTb-H is not allowed to be further split with EQT-H.
bb. In one example, one or multiple child block of UQTc-V is not allowed to be further split with EQT-H.
cc. In one example, one or multiple child block of UQTd-V is not allowed to be further split with EQT-H.
dd. In one example, one or multiple child block of UQTa-H is not allowed to be further split with EQT-V.
ee. In one example, one or multiple child block of UQTb-H is not allowed to be further split with EQT-V.
ff. In one example, one or multiple child block of UQTc-V is not allowed to be further split with EQT-V.
gg. In one example, one or multiple child block of UQTd-V is not allowed to be further split with EQT-V.
hh. The term "child block of UQT" may refer to a block split from a parent block with UQT, or it may refer to a block, whose parent block or any ancestor block (e.g. the parent block of the parent block) is split from an ancestor block with UQT.

16. In one example, only UQTa-H and UQTc-V as shown in FIG. 11 can be used. For example, a=2. In another example, a=c=4.
    a. In one example, one bin possibly with one or more contexts is signaled to indicate whether a block is split or not, when the block can be non-split, and at least one of QT, BT-H, BT-V, TT-H, TT-V, UQTa-H and UQTc-V is applicable in this block.
    b. In one example, one bin possibly with one or more contexts is signaled to indicate whether a block is split with QT or other splits, when the block is split, and it can be QT split, and at least one of BT-H, BT-V, TT-H, TT-V, UQTa-H and UQTc-V is applicable in this block.
    c. In one example, one bin possibly with one or more contexts is signaled to indicate whether a block is split with vertical or horizontal split, when the block is split other than QT, at least one of BT-H, TT-H and UQTa-H is applicable in this block, and at least one of BT-V, TT-V and UQTc-V is applicable in this block.
    d. In one example, one bin possibly with one or more contexts is signaled to indicate whether a block is split with UQT or not,
        (a) when the block is horizontal split other than QT, and at least one of BT-H, TT-H are available, and UQTa-H is applicable in this block.
        (b) when the block is vertical split other than QT, and at least one of BT-V, TT-V are available, and UQTc-V is applicable in this block.
    e. In one example, one or multiple child block of UQTa-H is not allowed to be further split with TT-H. For example, the child block with height equal to H/2 is not allowed to be further split with TT-H.
    f. In one example, one or multiple child block of UQTc-V is not allowed to be further split with TT-V. For example, the child block with width equal to W/2 is not allowed to be further split with TT-V.
    g. In one example, one or multiple child block of UQTa-H is not allowed to be further split with BT-H.
    h. In one example, one or multiple child block of UQTc-V is not allowed to be further split with BT-V.
    i. In one example, one or multiple child block of UQTa-H is not allowed to be further split with UQT-H.
    j. In one example, one or multiple child block of UQTc-V is not allowed to be further split with UQT-V.

17. Indications of splitting types (including EQT/BT/UQT) may be signaled after the indications of splitting or non-splitting, and/or the indications of QT.
    a. In one example, a flag may be signaled to indicate whether the block is split with a first set of UQT and BT or with a second set of UQT and EQT, wherein the UQT patterns in the first and second set are different.
        (a) Alternatively, furthermore, one flag may be signaled to indicate whether a certain kind of UQTs is applied or a certain kind of BTs is applied on a block.
            1. For example, one flag may be signaled to indicate whether UQT2-V/UQT2-H defined in bullet 1 is applied, or BT-V/BT-H is applied on a block.
        (b) Alternatively, furthermore, one flag may be signaled to indicate whether a certain kind of UQTs is applied or a certain kind of EQTs is applied on a block.
            1. For example, one flag may be signaled to indicate whether UQT4-V/UQT4-H defined in bullet 1 is applied, or EQT-V/EQT-H is applied on a block.
            2. For example, one flag may be signaled to indicate whether UQT2-V/UQT2-H defined in bullet 1 is applied, or EQT-V/EQT-H is applied on a block.
        (c) Alternatively, furthermore, the splitting direction may be further signalled (e.g., horizontal split or vertical split).
        (d) The above bullets may be utilized for coding blocks in I slices/pictures.
    b. In one example, a flag may be signaled to indicate whether the block is split with BT or with a second set of UQT and EQT.
        (a) Alternatively, furthermore, if the block is not split from BT, another flag may be further signaled to indicate the usage of UQT or EQT.
            1. Alternatively, furthermore, the splitting direction (e.g., horizontal split or vertical split) may be further signaled.
        (b) Alternatively, furthermore, another flag may be further signaled to indicate the splitting direction (e.g., horizontal split or vertical split).
            1. Alternatively, furthermore, the splitting pattern (e.g., EQT or UQT) may be further signaled.
        (c) The above bullets may be utilized for coding blocks in P/B slices/pictures.
    c. Alternatively, furthermore, the signaling of above-mentioned flags may be skipped when current block is not split or split according to QT.

(a) Alternatively, only when the current block needs to be further split and/or not split according to QT, the above-mentioned flags may be further signaled.
18. In one example, whether and/or how to apply UQT split for a slice/picture may depend on the slice/picture type.
   a. In one example, M kinds of UQTs can be applied on a P-slice/P-picture or a B-slice/B-picture, and N kinds of UQTs can be applied on an I-slice/I-picture.
      (a) In one example, M is smaller than N. For example, M is equal to 2 and N is equal to 4.
      (b) In one example, M is equal to N, however, the allowed UQTs may be different.
      (c) For example, UQT2-V/UQT2-H/UQT4-V/UQT4-H defined in bullet 1 can be applied on an I-slice/I-picture.
      (d) For example, UQT2-V/UQT2-H defined in bullet 1 can be applied on a P-slice/P-picture or a B-slice/B-picture.
19. Interpretation of the signaled representation of UQT split may depend on the slice/picture type.
   a. In one example, the signaled representation of UQT split in an I-slice/I-picture may be different to that in a P-slice/P-picture or a B-slice/B-picture.
   b. In one example, bullet 17.a and bullet 18.a.(c) may be applied on an I-slice/I-picture.
   c. In one example, bullet 17.b and 18.a.(d) may be applied on a P-slice/P-picture or a B-slice/B-picture.
20. In one example, whether and/or how to apply UQT split for a slice/picture may depend on the temporal layer of the slice/picture.
   a. In one example, UQT is not applied if the temporal layer is larger than a threshold, such as 2.
   b. In one example, M kinds of UQTs can be applied on a picture/slice with temporal layer larger than T and N kinds of UQTs can be applied on a picture/slice with temporal layer smaller than or equal to T, wherein M is smaller than N. For example, T is equal to 2, M is equal to 2 and N is equal to 4.
21. In one example, whether and/or how to apply UQT split for a slice/picture may depend on the whether the slice/picture can be referred by other slices/pictures.
   a. In one example, UQT is not applied on a slice/picture if it is not a reference picture for other slices/pictures.
22. If one kind of UQT is not allowed, such as in cases disclosed in bullet 17-21, the indication for it is not signaled.
   a. In one example, If no kind of UQT is allowed, such as in cases disclosed in bullet 17-21, the indication for UQT is not signaled.
23. How to signal the partitioning method may depend on the picture/slice type.
   a. In one example, the flag to indicate whether UQT is applied is signaled before the flag to indicate whether BT/EQT is applied in an I picture/slice, while the flag to indicate whether UQT is applied is signaled after the flag to indicate whether BT/EQT is applied in non-I picture/slice (e.g. a P/B picture/slice).
   b. Alternatively, the flag to indicate whether UQT is applied is signaled after the flag to indicate whether BT/EQT is applied in an I picture/slice, while the flag to indicate whether UQT is applied is signaled before the flag to indicate whether BT/EQT is applied in a non-I picture/slice (e.g. a P/B picture/slice).
24. In one example, a flag is signaled to indicate the partitioning direction of more than one partitioning methods, including UQT. For example, a flag is signaled to indicate whether vertical or horizontal partitioning is applied for UQT, EQT and BT.
25. In one example, the flag to indicate whether UQT is applied (denoted as UQT_flag) may be coded by arithmetic coding with context model(s).
   a. In one example, the context model selection may depend on the picture/slice type (such as I-picture or P/B-picture).
   b. In one example, a context model is used if the current picture is I-picture. Otherwise (not I-picture), a context model is selected from several candidate context models.
   c. In one example, the context model selection may depend on the existence of one or multiple neighboring blocks.
   d. In one example, the context model selection may depend on dimensions of one or multiple neighboring blocks.
   e. In the above bullets, the neighbouring blocks may include a left neighboring block and/or a above neighbouring block.
   f. In one example, the context may depend on dimensions of the current block.

5. Embodiments 5.1 an Embodiment of UQT Based on AVS-3.0

Figure 17:
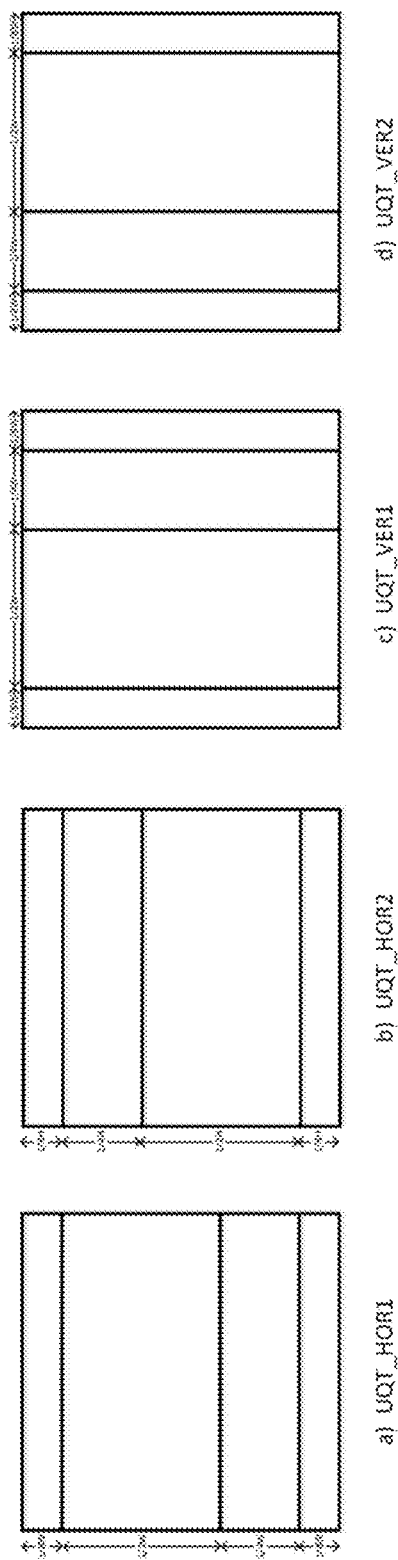
FIG. 17 shows an example of the proposed extended quad-tree partitions.

UQT partitioning is proposed wherein a parent CU is split into four CUs asymmetrically. a parent block is split into four sub-blocks with a 1:4:2:1 or a 1:2:4:1 ratio. As shown in FIG. 17, there are 4 splitting types for the UQT partition. With the horizontal UQT, a W×H parent CU is divided into two W×H/8 CUs, one W×H/4 CU and one W×H/2 CU as shown in FIGS. 17 (A) and 17 (B). Homoplastically, a W×H parent CU is divided into two W/8×H CUs, one W/4×H CU and one W/2×H CU with the vertical UQT as shown in FIGS. 17 (C) and 17 (D).

Figure 18:
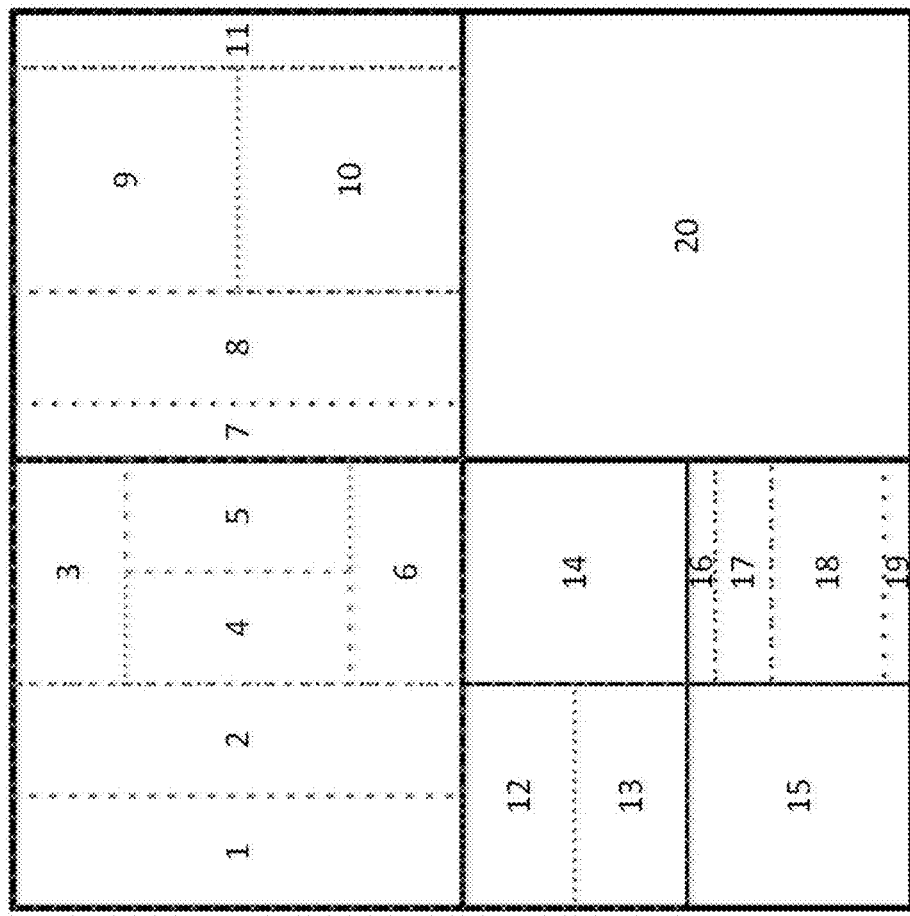
FIG. 18 shows an example of an LCU partition example with QT+BT+EQT+UQT partitioning.

Different from QT partitioning which cannot be used after BT and EQT partitioning, UQT partitioning can be used after BT and EQT partitioning. UQT can be applied to a direction if the length of the block along the direction is 32 to 64. An example is shown in FIG. 18.

Figure 19:
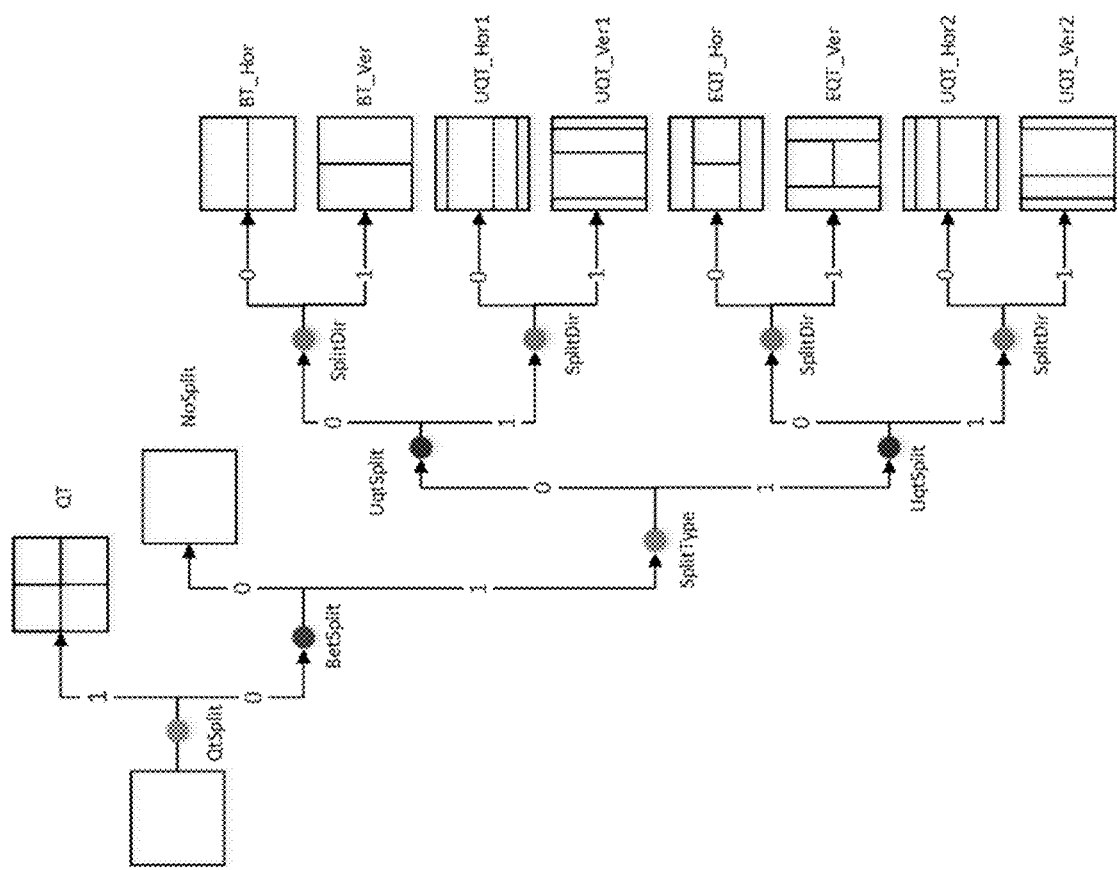
FIG. 19 shows an example of tree type coding structure for I slices.
Figure 20:
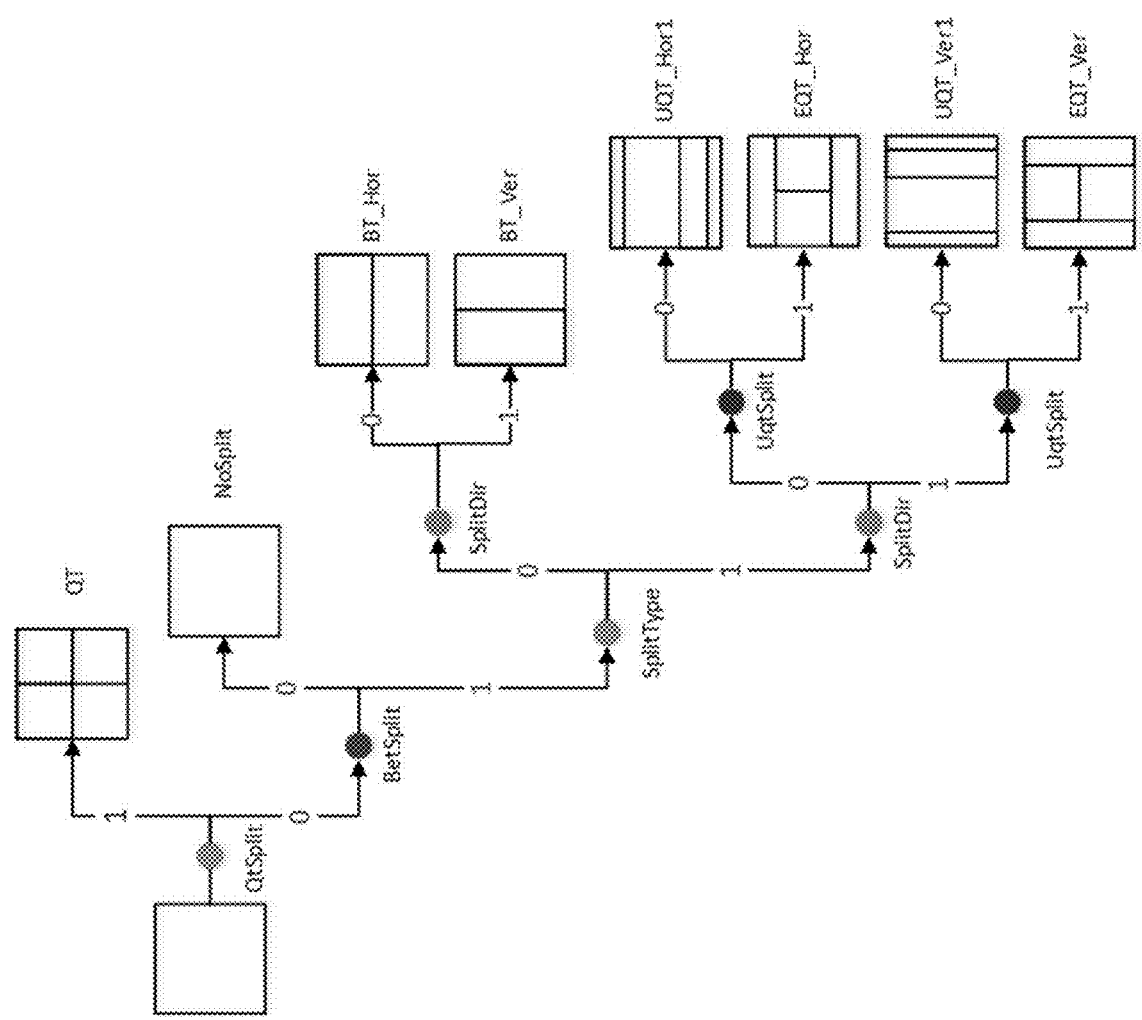
FIG. 20 shows an example of tree type coding structure for B/P slices.

Similar to BT and EQT partitioning, UQT partitioning is valid after QT/BT/EQT partitioning while its sub-blocks are forbidden to split with QT partition. For B/P slices, the horizontal UQT partitioning can only be applied when the height of current block is 64 and the vertical UQT partitioning can only be applied when the width of current block is 64. Furthermore, only UQT partitioning with 1:2:4:1 ratio is allowed in B/P slices. Besides, UQT partitioning is not allowed in the B/P frames not referenced by other frames. One bit is used to signal whether the splitting mode is UQT or not. For I slices, the tree type coding structure is illustrated in FIG. 19 and the tree type coding structure for B/P slices is illustrated in FIG. 20.

An Embodiment of UQT Based on AVS-3.0-Phase 2

---

```
coding_unit_tree(x0, y0, split, width, height, qt, mode,
parent_split, uqt_sub_block,) {
    isBoundary = ((x0+width) > PicWidthInLuma) ||
    ((y0+height) > PicHeightInLuma)
    rightBoundary = ((x0+width) > PicWidthInLuma) &&
    ((y0+height) <= PicHeightInLuma)
```

```
bottomBoundary = ( (x0 + width) <= PicWidthInLuma ) &&
( (y0 + height) > PicHeightInLuma)
allowNoSplit = 0
allowSplitQt = 0
allowSplitBtVer = 0
allowSplitBtHor = 0
allowSplitEqtVer = 0
allowSplitEqtHor = 0
allowSplitUqtVer1 = 0
allowSplitUqtHor1 = 0
allowSplitUqtVer2 = 0
allowSplitUqtHor2 = 0
if ( isBoundary) {
    allowNoSplit = 0
    if ((PictureType == 0) && (width > 64) &&
(height > 64)) {
        allowSplitQt = 1
        allowNoSplit = 1
    }
    else if ((width == 64 && height > 64) || (height == 64
&& width > 64)) {
        allowSplitBtHor = 1
        allowSplitBtVer = 1
    }
    else if (! rightBoundary && ! bottomBoundary) {
        allowSplitQt = 1
    }
    else if (rightBoundary) {
        allowSplitBtVer = 1
    }
    else if (bottomBoundary) {
        allowSplitBtHor = 1
    }
}
else {
    if (((width == 64) && (height > 64)) || ((height == 64)
&& (width > 64))) {
        allowSplitBtHor = 1
        allowSplitBtVer = 1
        allowNoSplit = 1
    }
    else if (split >= MaxSplitTimes) {
        allowNoSplit = 1
    }
    else if ((PictureType == 0) && (width == 128) &&
(height == 128)) {
        allowSplitQt = 1
        allowNoSplit = 1
    }
    else {
        if ((width <= height * MaxPartRatio) && (height <=
width * MaxPartRatio))
            allowNoSplit = 1
        if ((width > MinQtSize) && qt)
            allowSplitQt = 1
        if ((width <= MaxBtSize) && (height <=
MaxBtSize) && (width > MinBtSize) && (height <
MaxPartRatio*width))
            allowSplitBtVer = 1
        if ((width <= MaxBtSize) && (height <=
MaxBtSize) && (height > MinBtSize) && (width <
MaxPartRatio*height))
            allowSplitBtHor = 1
        if ((width <= MaxEqtSize) && (height <=
MaxEqtSize) && (height >= MinEqtSize*2) && (width >=
MinEqtSize*4) && (height*4 <= MaxPartRatio*width))
            allowSplitEqtVer = 1
        if ( (width <= MaxEqtSize) && (height <=
MaxEqtSize) && (width >= MinEqtSize*2) && (height >=
MinEqtSize*4) && (width *4 <= MaxPartRatio*height) )
            allowSplitEqtHor = 1
        if (!uqt_disable_flag){
            if(PictureType == 0){
                if (height == 64 || (height == 32 &&
width != 64)){
                    allowSplitUqtHor1 = 1
                    allowSplitUqtHor2 = 1
                }
                if (weight == 64 || (width == 32 &&
height != 64)){
                    allowSplitUqtVer1 = 1
                    allowSplitUqtVer2 = 1
                }
            }
            else if (!uqt_sub_block){
                if (height == 64){
                    allowSplitUqtHor1 = 1
                }
                if (weight == 64){
                    allowSplitUqtVer1 = 1
                }
            }
            if (uqt_sub_block && (parent_split ==
'SPLIT_UQT_VER1' || parent_split ==
'SPLIT_UQT_HOR1')){
                allowSplitEqtVer = 0
                allowSplitEqtHor = 0
            }
        }
    }
}
allowSplitBt = allowSplitBtVer || allowSplitBtHor
allowSplitEqt = allowSplitEqtVer || allowSplitEqtHor
allowSplitFirstUqt = allowSplitUqtVer1 || allowSplitUqtHor1
allowSplitSecondUqt = allowSplitUqtVer2 ||
allowSplitUqtHor2
allowSplitUqt = allowSplitFirstUqt || allowSplitSecondUqt
if (allowSplitQt && (allowNoSplit || allowSplitBt ||
allowSplitEqt)) {
    qt_split_flag                                    ae(v)
}
else {
    QtSplitFlag = allowSplitQt
}
if (! QtSplitFlag) {
    if (allowNoSplit && (allowSplitBt || allowSplitEqt)) {
        beut_split_flag                              ae(v)
    }
    else {
        BeutSplitFlag = ! allowNoSplit
    }
    if (BeutSplitFlag) {
        if (PictureType == 0){
            if (allowSplitUqt && (allowSplitBt ||
            allowSplitEqt))
                uqt_split_flag                       ae(v)
            if ((UqtSplitFlag && allowSplitFirsrtUqt &&
allowSplitSecondUqt) || (!UqtSplitFlag && allowSplitBt &&
allowSplitEqt))
                beut_split_type_flag                 ae(v)
            if ((UqtSplitFlag && !BeutSplitTypeFlag &&
allowSplitUqtHor1 && allowSplitUqtVer1) || (UqtSplitFlag &&
BeutSplitTypeFlag && allowSplitUqtHor2 &&
allowSplitUqtVer2) || (!UqtSplitFlag && !BeutSplitTypeFlag
&& allowSplitBtHor && allowSplitBtVer) || (!UqtSplitFlag
&& BeutSplitTypeFlag && allowSplitEqtHor &&
allowSplitEqtVer))
                beut_split_dir_flag                  ae(v)
        }
        else {
            if (allowSplitBt && (allowSplitEqt ||
            allowSplitFirstUqt))
                beut_split_type_flag                 ae(v)
            if ((BeutSplitTypeFlag && allowSplitEqt &&
allowSplitFirstUqt) || (!BeutSplitTypeFlag && allowSplitEqtHor
&& allowSplitEqtVer))
                uqt_split_flag                       ae(v)
            if ((BeutSplitTypeFlag && UqtSplitFlag &&
allowSplitUqtHor1 && allowSplitUqtVer1) || (BeutSplitTypeFlag
&& !UqtSplitFlag && allowSplitEqtHor && allowSplitEqtVer) ||
(!BeutSplitTypeFlag && allowSplitBtHor && allowSplitBtVer))
                beut_split_dir_flag                  ae(v)
        }
```

```
            if (allowSplitBt && allowSplitEqt)
                bet_split_type_flag                       ae(v)
            if ((!BeutSplitTypeFlag && allowSplitBtHor
            && allowSplitBtVer) || (BeutSplitTypeFlag &&
  allowSplitEqtHor && allowSplitEqtVer))
                bet_split_dir_flag                        ae(v)
        }
    }
    if ((PictureType != 0) && ((((BeutSplitFlag && !
BeutSplitTypeFlag) || QtSplitFlag) && (width * height == 64)) ||
(BeutSplitTypeFlag && (width * height == 128)))) {
        root_cu_mode                                      ae(v)
        modeChild = root_cu_mode ? 'PRED_Intra_Only' :
'PRED_Inter_Only'
    }
    else {
        modeChild = mode
    }
    if (ChildSizeOccur4) {
        if (Component == 0) {
            LumaWidth = width
            LumaHeight = height
            Component = 1
        }
    }
    if (parent_split == 'SPLIT_UQT_VER1' || parent_split ==
'SPLIT_UQT_VER2' || parent_split ==
'SPLIT_UQT_HOR1' || parent_split ==
'SPLIT_UQT_HOR2'){
        uqt_sub_block_child = 1
    }
    else {
        uqt_sub_block_child = uqt_sub_block
    }
    if (BlockSplitMode == 'SPLIT_QT') {
        QtWidth = width / 2
        QtHeight = height / 2
        x1 = x0 + QtWidth
        y1 = y0 + QtHeight
        coding_unit_tree(x0, y0, split+1, QtWidth, QtHeight, 1,
modeChild, BlockSplitMode, uqt_sub_block_child)
            if (x1 < PicWidthInLuma)
                coding_unit_tree(x1, y0, split+1, QtWidth,
QtHeight, 1, modeChild, BlockSplitMode, uqt_sub_block_child)
            if (y1 < PicHeightInLuma)
                coding_unit_tree(x0, y1, split+1, QtWidth,
QtHeight, 1, modeChild, BlockSplitMode, uqt_sub_block_child)
            if ((x1 < PicWidthInLuma) && (y1 <
PicHeightInLuma))
                coding_unit_tree(x1, y1, split+1, QtWidth,
QtHeight, 1, modeChild, BlockSplitMode, uqt_sub_block_child)
            if ((LumaWidth == width) && (LumaHeight == height)
            && ChildSizeOccur4) {
                coding_unit(x0, y0, width, height,
                'PRED_No_Constraint', 'COMPONENT_Chroma')
                Component = 0
            }
        }
    }
    else if (BlockSplitMode == 'SPLIT_BT_VER') {
        x1 = x0 + width / 2
        coding_unit_tree(x0, y0, split+1, width/2, height, 0,
modeChild, BlockSplitMode, uqt_sub_block_child)
            if (x1 < PicWidthInLuma)
                coding_unit_tree(x1, y0, split+1, width/2, height,
0, modeChild, BlockSplitMode, uqt_sub_block_child)
            if ((LumaWidth == width) && (LumaHeight == height)
            && ChildSizeOccur4) {
                coding_unit (x0, y0, width, height,
                'PRED_No_Constraint', 'COMPONENT_Chroma')
                Component = 0
            }
        }
    }
    else if (BlockSplitMode == 'SPLIT_BT_HOR') {
        y1 = y0 + height / 2
        coding_unit_tree(x0, y0, split+1, width, height/2, 0,
modeChild, BlockSplitMode, uqt_sub_block_child)
            if (y1 < PicHeightInLuma)
                coding_unit_tree(x0, y1, split+1, width, height/2,
0, modeChild, BlockSplitMode, uqt_sub_block_child)
            if ((LumaWidth == width) && (LumaHeight = height)
            && ChildSizeOccur4) {
                coding_unit(x0, y0, width, height,
                'PRED_No_Constraint', 'COMPONENT_Chroma')
                Component = 0
            }
        }
    }
    else if (BlockSplitMode == 'SPLIT_EQT_VER') {
        x1 = x0 + width / 4
        x2 = x0 + (3 * width / 4)
        y1 = y0 + height / 2
        coding_unit_tree(x0, y0, split+1, width/4, height, 0,
modeChild, BlockSplitMode, uqt_sub_block_child)
            coding_unit_tree(x1, y0, split+1, width/2, height/2, 0,
modeChild, BlockSplitMode, uqt_sub_block_child)
            coding_unit_tree(x1, y1, split+1, width/2, height/2, 0,
modeChild, BlockSplitMode, uqt_sub_block_child)
            coding_unit_tree(x2, y0, split+ 1, width/4, height, 0,
modeChild, BlockSplitMode, uqt_sub_block_child)
            if ((LumaWidth == width) && (LumaHeight == height)
            && ChildSizeOccur4) {
                coding_unit(x0, y0, width, height,
                'PRED_No_Constraint', 'COMPONENT_Chroma')
                Component = 0
            }
        }
    }
    else if (BlockSplitMode == 'SPLIT_EQT_HOR') {
        x1 = x0 + width / 2
        y1 = y0 + height / 4
        y2 = y0 + (3 * height / 4)
        coding_unit_tree(x0, y0, split+1, width, height/4, 0,
modeChild, BlockSplitMode, uqt_sub_block_child)
            coding_unit_tree(x0, y1, split+1, width/2, height/2, 0,
modeChild, BlockSplitMode, uqt_sub_block_child)
            coding_unit_tree(x1, y1, split+1, width/2, height/2, 0,
modeChild, BlockSplitMode, uqt_sub_block_child)
            coding_unit_tree(x0, y2, split+1, width, height/4, 0,
modeChild, BlockSplitMode, uqt_sub_block_child)
            if ((LumaWidth == width) && (LumaHeight = height)
            && ChildSizeOccur4) {
                coding_unit(x0, y0, width, height,
                'PRED_No_Constraint', 'COMPONENT_Chroma')
                Component = 0
            }
        }
    }
    else if (BlockSplitMode == 'SPLIT_UQT_HOR1' ||
BlockSplitMode == 'SPLIT_UQT_HOR2' ||
BlockSplitMode == 'SPLIT_UQT_VER1' ||
BlockSplitMode == 'SPLIT_UQT_VER2') {
        uqt_idx = BlockSplitMode == 'SPLIT_UQT_HOR1' ? 0 :
(BlockSplitMode == 'SPLIT_UQT_HOR2' ? 1 :
(BlockSplitMode == 'SPLIT_UQT_VER1' ? 2 : 3))
        x_tab[4][4] = {[0, 0, 0, 0], [0, 0, 0, 0], [0, 1/8, 1/2, 1/4],
[0, 1/8, 1/4, 1/2]}
        y_tab[4][4] = {[0, 1/8, 1/2, 1/4], [0, 1/8, 1/4, 1/2] ,
[0, 0, 0, 0], [0, 0, 0, 0]}
        w_tab[4][4] = {[0, 0, 0, 0], [0, 0, 0, 0], [1/8, 1/2, 1/4, 1/8],
[1/8, 1/4, 1/2, 1/8]}
        h_tab[4][4] = {[1/8, 1/2, 1/4, 1/8], [1/8, 1/4, 1/2, 1/8],
[0, 0, 0, 0], [0, 0, 0, 0] }
        coding_unit_tree(x0+x_tab[uqt_idx][0],
y0+y_tab[uqt_idx][0], split+1, width*w_tab[uqt_idx][0],
height*h_tab[uqt_idx][0], 0, modeChild, BlockSplitMode,
uqt_sub_block_child)
            coding_unit_tree(x0+x_tab[uqt_idx][1],
y0+y_tab[uqt_idx][1], split+1, width*w_tab[uqt_idx][1],
height*h_tab[uqt_idx][1], 0, modeChild, BlockSplitMode,
uqt_sub_block_child)
            coding_unit_tree(x0+x_tab[uqt_idx][2],
y0+y_tab[uqt_idx][2], split+1, width*w_tab[uqt_idx][2],
height*h_tab[uqt_idx][2], 0, modeChild, BlockSplitMode,
uqt_sub_block_child)
            coding_unit_tree(x0+x_tab[uqt_idx][3],
y0+y_tab[uqt_idx][3], split+1, width*w_tab[uqt_idx][3],
height*h_tab[uqt_idx][3], 0, modeChild, BlockSplitMode,
uqt_sub_block_child)
```

```
        if ((LumaWidth == width) && (LumaHeight = height)
        && ChildSizeOccur4) {
            coding_unit(x0, y0, width, height,
            'PRED_No_Constraint', 'COMPONENT_Chroma')
            Component = 0
        }
    }
    else {
        if (Component == 0) {
            coding_unit(x0, y0, width, height, mode,
            'COMPONENT_LUMACHROMA')
        }
        else if (Component == 1) {
            coding_unit(x0, y0, width, height, mode,
            'COMPONENT_LUMA')
        }
    }
}
```

5.3 An Embodiment of Context Derivation

A variable ctxIdxInc is defined to indicate the context model for uqt_split_flag.

Block A represents a left neighbouring block with dimensions Wa*Ha.

Block B represents an above neighbouring block with dimensions Wb*Hb.

Block E represents the current block with dimensions We*He.

ctxIdxInc is derived as below:
  If the current block is I-picture, ctxIdxInc is set equal to 0.
  Otherwise, ctxIdxInc is derived as below:
    If (Block A exists and Ha<He) and (Block B exists and Wb<We), then ctxIdxInc is set equal to 2.
    Otherwise, If (Block A exists and Ha<He) or (Block B exists and Wb<We), then ctxIdxInc is set equal to 1.
Then ctxIdxInc is further revised as below:
  If We*He>1024, ctxIdxInc is unchanged;
  Otherwise, if We*He>256, ctxIdxInc is increased by 3;
  Otherwise, ctxIdxInc is increased by 6.

FIG. 11 is a block diagram of a video processing apparatus 1100. The apparatus 1100 may be used to implement one or more of the methods described herein. The apparatus 1100 may be embodied in a smartphone, tablet, computer, Internet of Things (IoT) receiver, and so on. The apparatus 1100 may include one or more processors 1102, one or more memories 1104 and video processing hardware 1106. The processor(s) 1102 may be configured to implement one or more methods described in the present document. The memory (memories) 1104 may be used for storing data and code used for implementing the methods and techniques described herein. The video processing hardware 1106 may be used to implement, in hardware circuitry, some techniques described in the present document.

Figure 13:
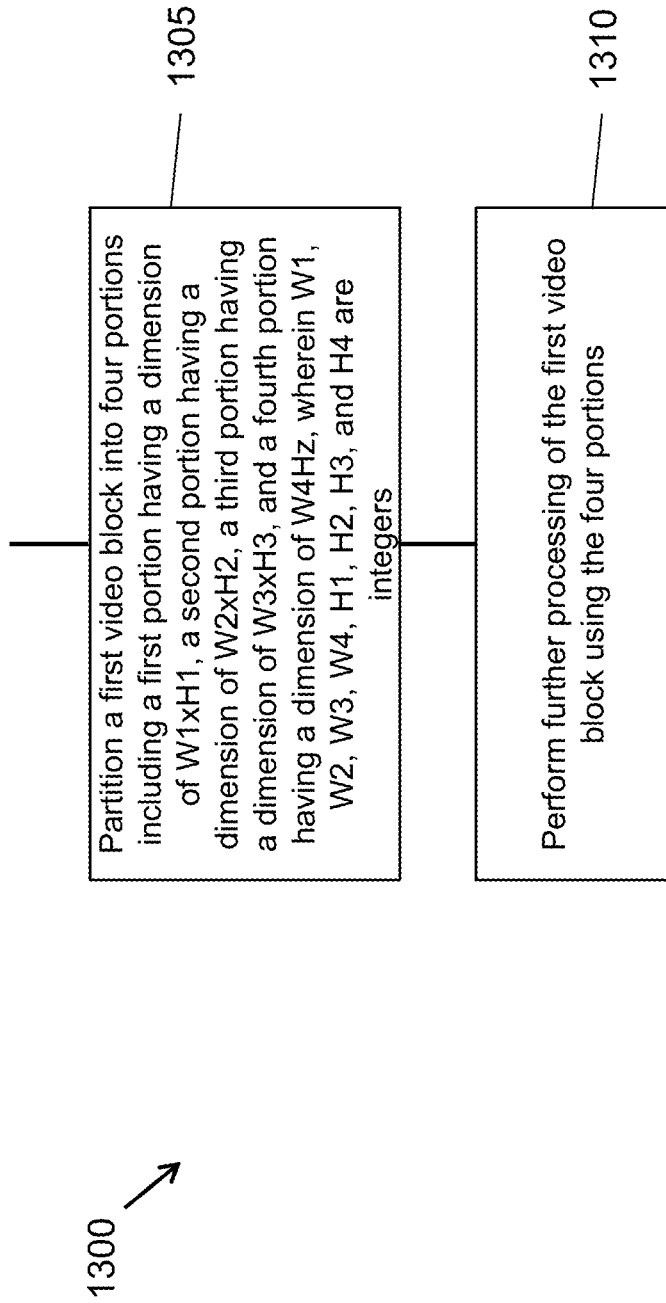
FIG. 13 is a flowchart for an example of a video processing method.

FIG. 13 is a flowchart for a method 1300 of processing a video. The method 1300 includes partitioning (1305) a first video block into four portions including into a first portion having a dimension of W1×H1, a second portion having a dimension of W2×H2, a third portion having a dimension of W3×H3, and a fourth portion having a dimension of W4 Hz, wherein W1, W2, W3, W4, H1, H2, H3, and H4 are integers, and performing (1310) further processing of the first video block using the four portions.

Figure 14:
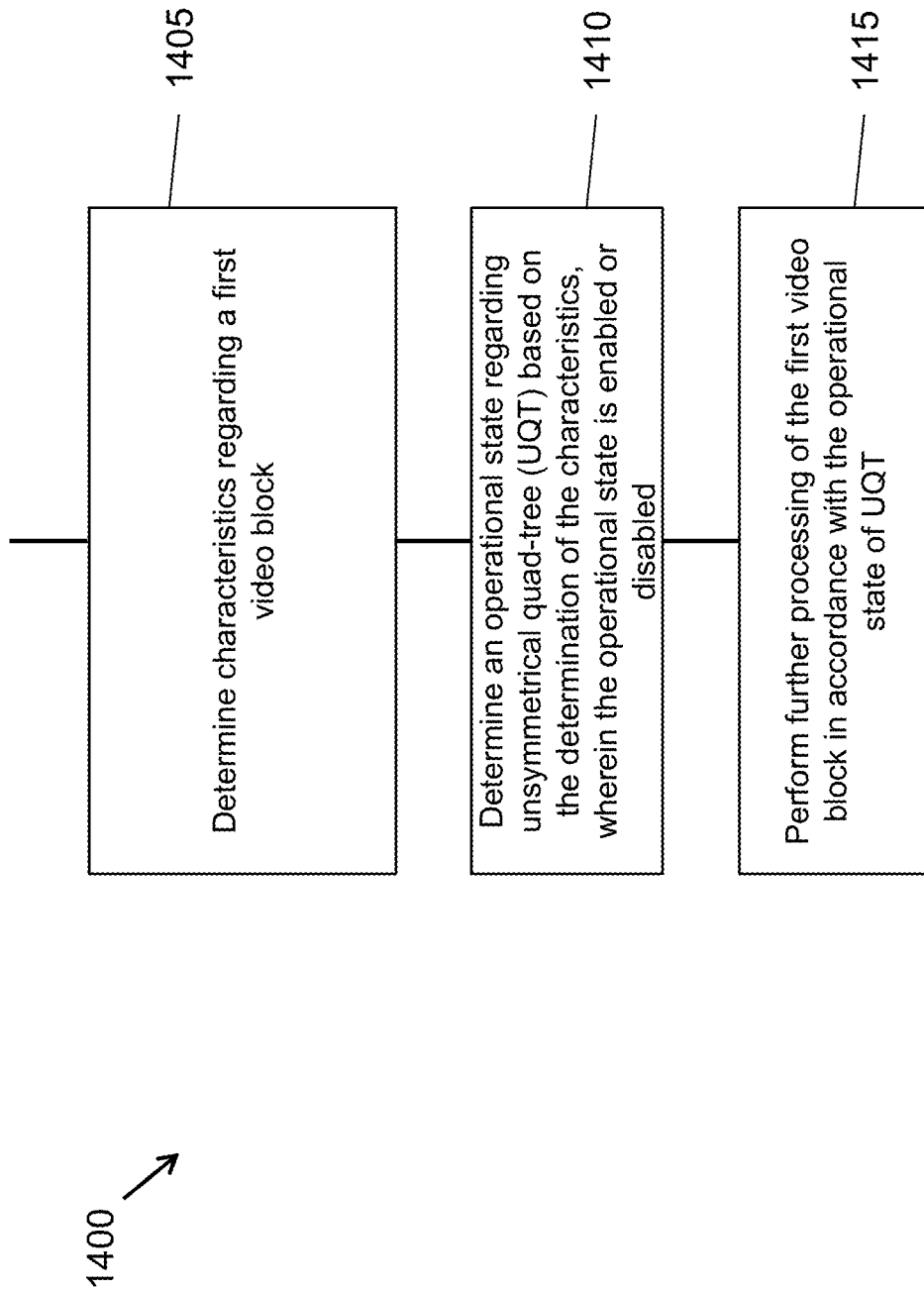
FIG. 14 is a flowchart for an example of a video processing method.

FIG. 14 is a flowchart for a method 1400 of processing a video. The method 1400 includes determining (1405) characteristics regarding a first video block, determining (1410) an operational state regarding unsymmetrical quad-tree (UQT) based on the determination of the characteristics, wherein the operational state is enabled or disabled, and performing (1415) further processing of the first video block in accordance with the operational state of UQT.

Figure 15:
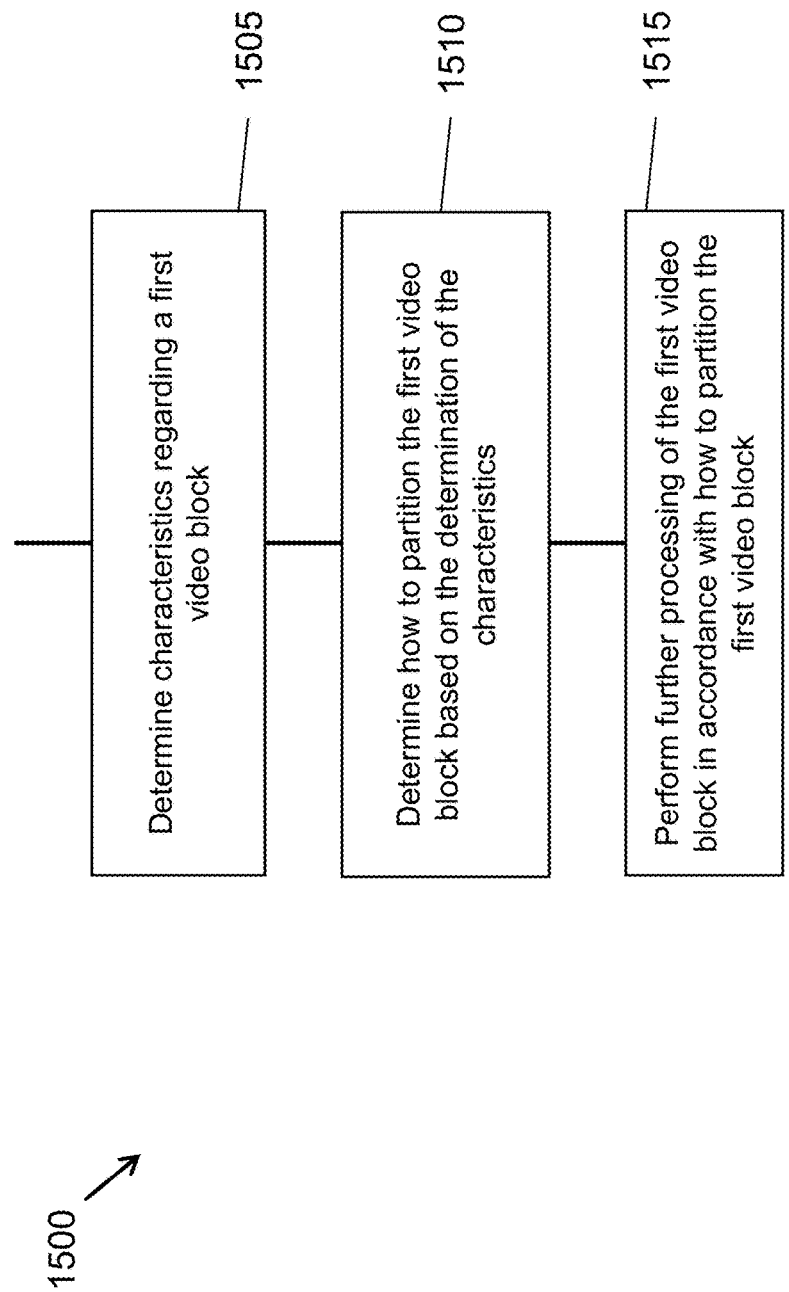
FIG. 15 is a flowchart for an example of a video processing method.

FIG. 15 is a flowchart for a method 1500 of processing a video. The method 1500 includes determining (1505) characteristics regarding a first video block, determining (1510) how to partition the first video block based on the determination of the characteristics, and performing (1515) further processing of the first video block in accordance with how to partition the first video block.

With reference to methods 1300, 1400, and 1500, some examples of enhanced coding tree structures for encoding and their use are described in Section 4 of the present document.

With reference to methods 1300, 1400, and 1500, a video block may be encoded in the video bitstream in which bit efficiency may be achieved by using a bitstream generation rule related to enhanced coding tree structures.

The methods can include wherein the dimension of first portion is different than the dimension of one or more of the second portion, the third portion, and the fourth portion.

The methods can include wherein the dimension of the first portion and the dimension of the second portion are equal, the dimension of the third portion and the dimension of the fourth portion are not equal, and the dimension of the third portion and the dimension of the fourth portion are not equal to the dimension of the first portion and the dimension of the second portion.

The methods can include wherein W1, W2, W3, W4, H1, H2, H3, and H4 are in a form of a power of 2.

The methods can include wherein H1, H2, H3, and H4 are the same.

The methods can include wherein W1, W2, W3, and W4 are the same.

The methods can include wherein the first video block is a portion of a second video block that is partitioned using quad tree (QT), binary tree (BT), triple tree (TT), or unsymmetrical quad-tree (UQT).

The methods can include wherein the partitioning is in accordance with UQT, and a maximum or minimum block size for UQT or a maximum depth for UQT is signaled in a sequence parameter set (SPS), a view parameter set (VPS), a picture parameter set (PPS), an APS, a sequence header, a picture header, a slice header, a tile group header, a tile, a coding tree unit (CTU) row, or a region.

The methods can include wherein the partitioning is in accordance with UQT, and a maximum or minimum block size for UQT or a maximum depth for UQT is based on a profile, a level, or a tier of a standard.

The methods can include wherein the partitioning is in accordance with UQT, and a maximum or minimum block size for UQT or a maximum depth for UQT is the same as QT.

The methods can include wherein the partitioning is in accordance with UQT, and the first portion is further partitioned in accordance with QT, BT, TT, or UQT.

The methods can include wherein the partitioning is in accordance with UQT, and the split depth of the first, second, third, and fourth portions are based on a split depth of the first video block.

The methods can include wherein the characteristics includes information regarding how luma and chroma coding trees are separated.

The methods can include wherein the characteristics includes a determination that luma and chrome coding trees are separated, and the operational state is enabled.

The methods can include wherein the operational state is signaled from an encoder to a decoder.

The methods can include wherein the operational state is signaled in a sequence parameter set (SPS), a view parameter set (VPS), a picture parameter set (PPS), a picture header, a slice header, a tile group header, or a tile header.

The methods can include wherein a type of UQT to be applied is signaled in a sequence parameter set (SPS), a view parameter set (VPS), a picture parameter set (PPS), a picture header, a slice header, a tile group header, or a tile header.

The methods can include wherein the operational state is signaled in the first video block.

The methods can include wherein a type of UQT to be applied is signaled in the first video block.

The methods can include wherein the first video block signals an index of partition type indicating that UQT, QT, or no partitioning is to be performed.

The methods can include wherein the first video block signals an index of partition type indicating that BT, or TT, or UQT are to be performed.

The methods can include receiving a signal indicating a direction related to partitioning; and receiving information indicative of a splitting pattern indicating QT, TT, or UQT.

The methods can include wherein the characteristics include valid types of splitting.

The methods can include wherein the determination regarding how to partition the first video block includes signaling BT, TT, or UQT having all vertical splits or all horizontal splits.

The methods can include wherein one of BT, TT, or UQT is a valid technique for how to partition the first video block, and the valid technique is not signaled using a binary code.

The methods can include wherein two or more of BT, TT, or UQT is a valid technique for how to partition the first video block, and a flag indicates one of the valid techniques to determine how to partition the first video block.

The methods can include wherein UQT is not valid, and a flag indicating whether UQT is used is not signaled and inferred to be false.

The methods can include wherein determining how to partition the first video block is also based on a bit of a bin string coded by arithmetic coding with contexts.

The methods can include wherein partial bins of the bin string are coded with contexts and other bins are coded with bypass mode without contexts.

The methods can include wherein bins of the bin string are coded with contexts.

The methods can include wherein bins of the bin string are coded with bypass mode.

The methods can include wherein the context is based on a position or index of the bin, a partitioning of neighboring blocks, a current partition depth of the first video block, a partition depth of neighboring blocks, coding modes of neighboring blocks, a width or height of neighboring blocks, a width or height of the first video block, a slice type, a picture type, a tile group type, a color component, or statistics results of partition types from previously coded video blocks.

The methods can include wherein UQT is not allowed based on a width or height of the first video block being determined to satisfy a condition related to the width or the height.

The methods can include wherein UQT is allowed based on a width or height of the first video block being determined to satisfy a condition related to the width or the height.

The methods can include wherein UQT is not allowed based on a depth of the first video block being determined to satisfy a condition related to the depth.

The methods can include wherein the depth is QT depth, BT depth, TT depth, UQT depth, or MTT depth.

The methods can include wherein UQT is allowed based on a depth of the first video block being determined to satisfy a condition related to the depth.

The methods can include wherein the depth is QT depth, BT depth, TT depth, UQT depth, or MTT depth.

The methods can include wherein one or both of an operational state or operational characteristics of using UQT is based on a position of the first video block.

The methods can include wherein the operational state is disabled based on the position indicating that the first video block crosses a bottom border of a picture, a tile, or a tile group.

The methods can include wherein vertical UQT is disabled based on the position indicating that the first video block crosses a bottom border of a picture, a tile, or a tile group.

The methods can include wherein horizontal UQT is disabled based on the position indicating that the first video block crosses a bottom border of a picture, a tile, or a tile group.

The methods can include wherein vertical UQT is disabled based on the position indicating that the first video block crosses a right border of a picture, a tile, or a tile group.

The methods can include wherein horizontal UQT is disabled based on the position indicating that the first video block crosses a right border of a picture, a tile, or a tile group.

Also disclosed is another video for processing video. The method can include determining to use, based on a width or a height of the first video block satisfying one or more conditions related to the width or the height, partitioning of the first video block; and performing further processing of the first video block in accordance with the determining.

The method can include wherein the one or more conditions are associated with a position of the first video block relative to crossing a bottom border of a picture, a tile, or a tile group.

The method can include wherein the partitioning of the first video block is based on a bit of a bin string coded according to one or more contexts.

The method can include wherein the one or more contexts indicate whether the first video block is split or not, when the first block can be non-split, and at least one of QT, BT-H, BT-V, TT-H, TT-V, UQTa-H, UQTb-H, UQTc-V and UQTd-V partitioning types applicable to the first video block.

The method can include wherein the one or more contexts indicate whether the first video block is QT split or not, when the first block can be split, and at least one of BT-H, BT-V, TT-H, TT-V, UQTa-H, UQTb-H, UQTc-V and UQTd-V partitioning types applicable to the first video block.

The method can include wherein the one or more contexts indicate whether the first video block is split with vertical or horizontal split, when the first block can be split, and at least one of BT-H, TT-H, UQTa-H, UQTb-H partitioning types applicable to the first video block.

It will be appreciated that the disclosed techniques may be embodied in video encoders or decoders to improve compression efficiency using enhanced coding tree structures.

The following listing of solutions further defines various embodiments listed in the previous sections, e.g., items 23 to 25.

A method of video processing, comprising: determining, for a conversion between a video block and a coded representation of the video block, a partitioning method used for partitioning the video block, wherein the partitioning method is signaled in the coded representation using a signaling scheme that depends on a slice or a picture containing the video block; and performing the conversion based on the determining.

The above method, wherein a first flag is included in the coded representation indicating whether unsymmetrical quad tree splitting is used and a second flag is included in the coded representation indicating whether binary tree or enhanced quad tree is used.

The above method, wherein the first flag occurs in the coded representation before the second flag.

The above methods, wherein the first flag occurs in the coded representation after the second flag.

The above methods, wherein a field in the coded representation signals a partitioning direction.

The above methods, wherein the conversion includes generating pixels of the video block from the coded representation.

The above methods, wherein the conversion includes generating the coded representation from the video block.

Figure 21:
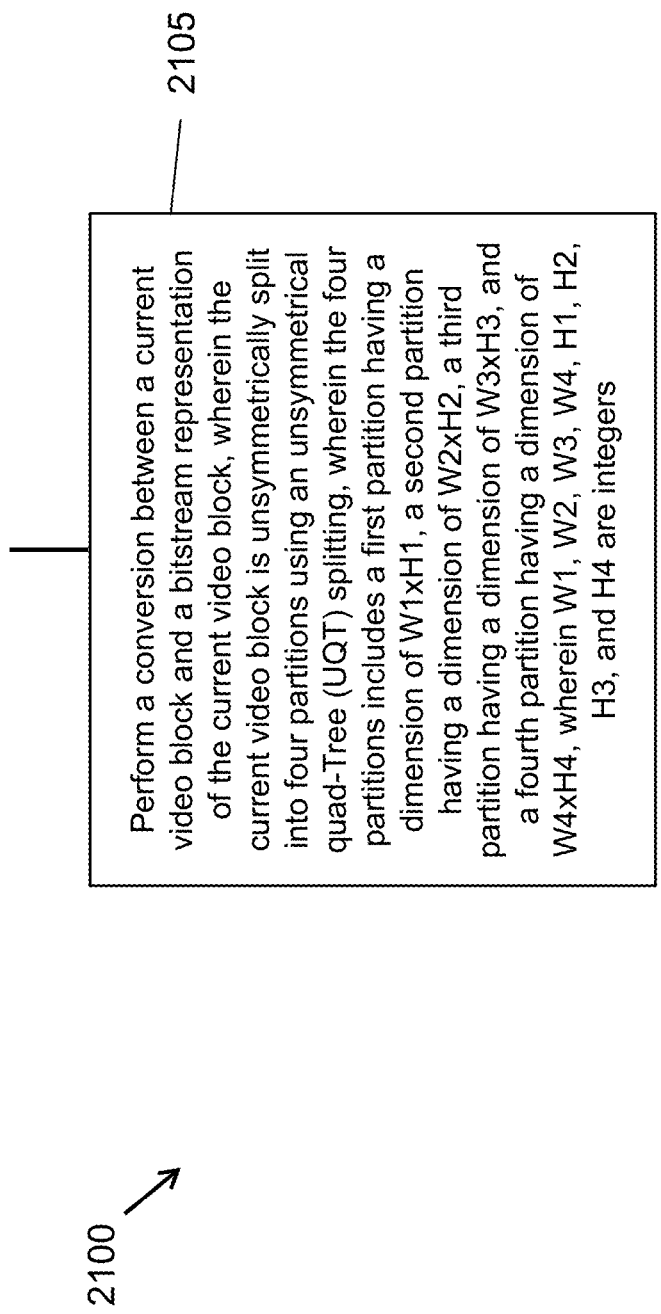
FIG. 21 is a flowchart for an example of a video processing method.

FIG. 21 is a flowchart for a method 2100 of processing a video. The method 2100 includes performing (2105) a conversion between a current video block and a bitstream representation of the current video block, wherein the current video block is unsymmetrically split into four partitions using an unsymmetrical quad-Tree (UQT) splitting, wherein the four partitions includes a first partition having a dimension of W1×H1, a second partition having a dimension of W2×H2, a third partition having a dimension of W3×H3, and a fourth partition having a dimension of W4×H4, wherein W1, W2, W3, W4, H1, H2, H3, and H4 are integers.

Figure 22:
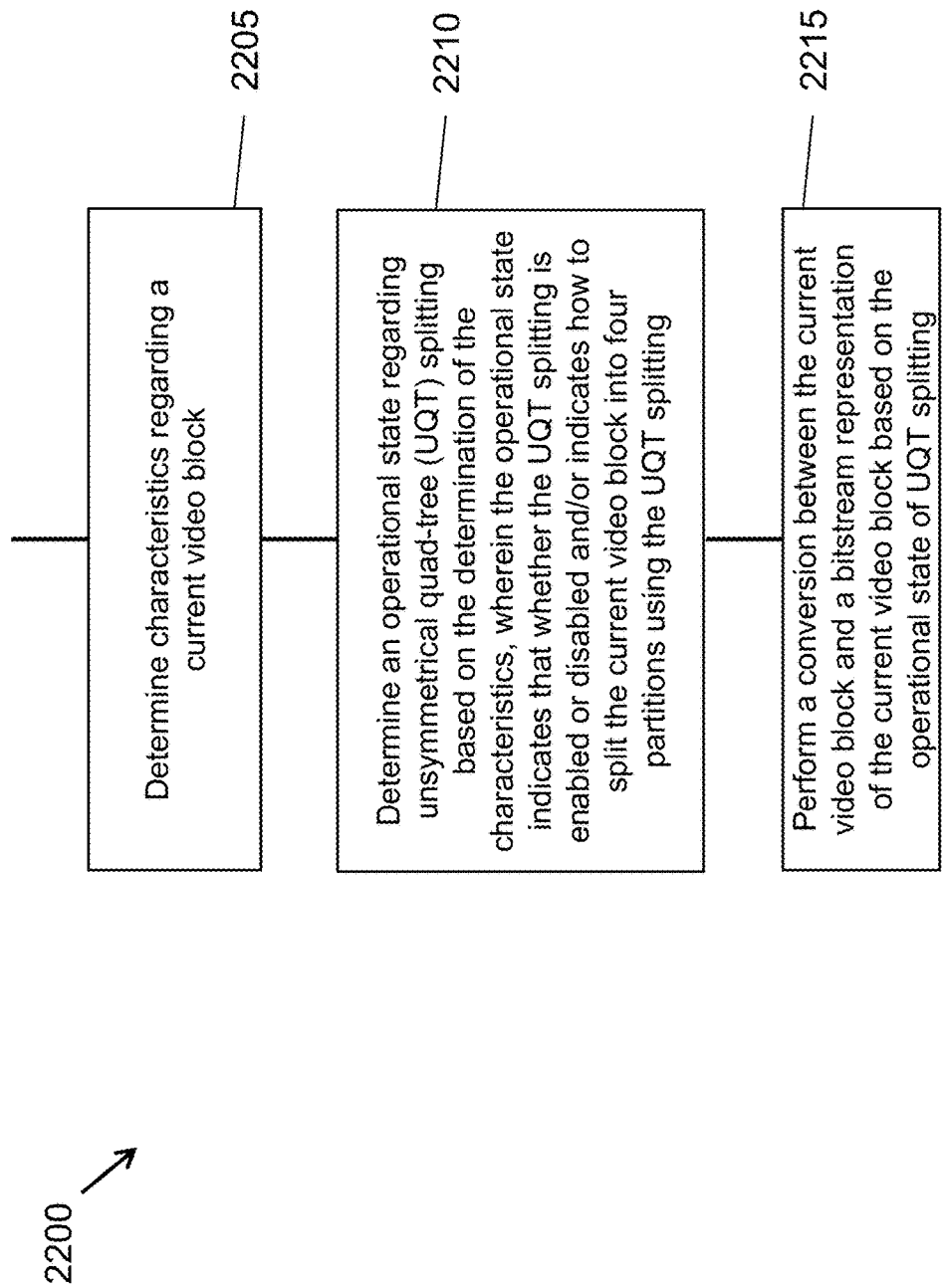
FIG. 22 is a flowchart for an example of a video processing method.

FIG. 22 is a flowchart for a method 2200 of processing a video. The method 2200 includes determining (2205) characteristics regarding a current video block; determining (2210) an operational state regarding unsymmetrical quad-tree (UQT) splitting based on the determination of the characteristics, wherein the operational state indicates that whether the UQT splitting is enabled or disabled and/or indicates how to split the current video block into four partitions using the UQT splitting; and performing (2215) a conversion between the current video block and a bitstream representation of the current video block based on the operational state of UQT splitting.

Figure 23:
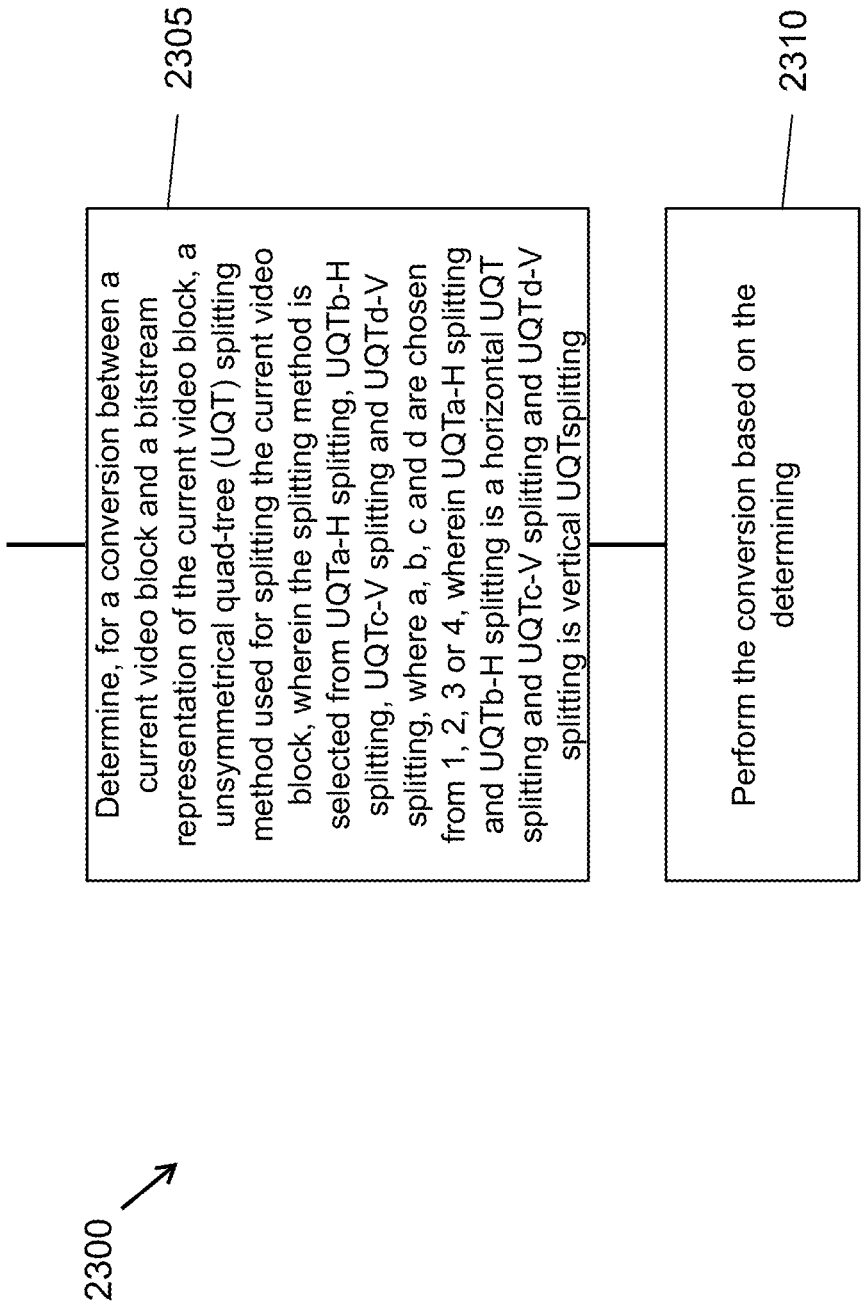
FIG. 23 is a flowchart for an example of a video processing method.

FIG. 23 is a flowchart for a method 2300 of processing a video. The method 2300 includes determining (2305), for a conversion between a current video block and a bitstream representation of the current video block, a unsymmetrical quad-tree (UQT) splitting method used for splitting the current video block, wherein the splitting method is selected from UQTa-H splitting, UQTb-H splitting, UQTc-V splitting and UQTd-V splitting, where a, b, c and d are chosen from 1, 2, 3 or 4, wherein UQTa-H splitting and UQTb-H splitting is a horizontal UQT splitting and UQTc-V splitting and UQTd-V splitting is vertical UQTsplitting; and performing (2310) the conversion based on the determining.

Figure 24:
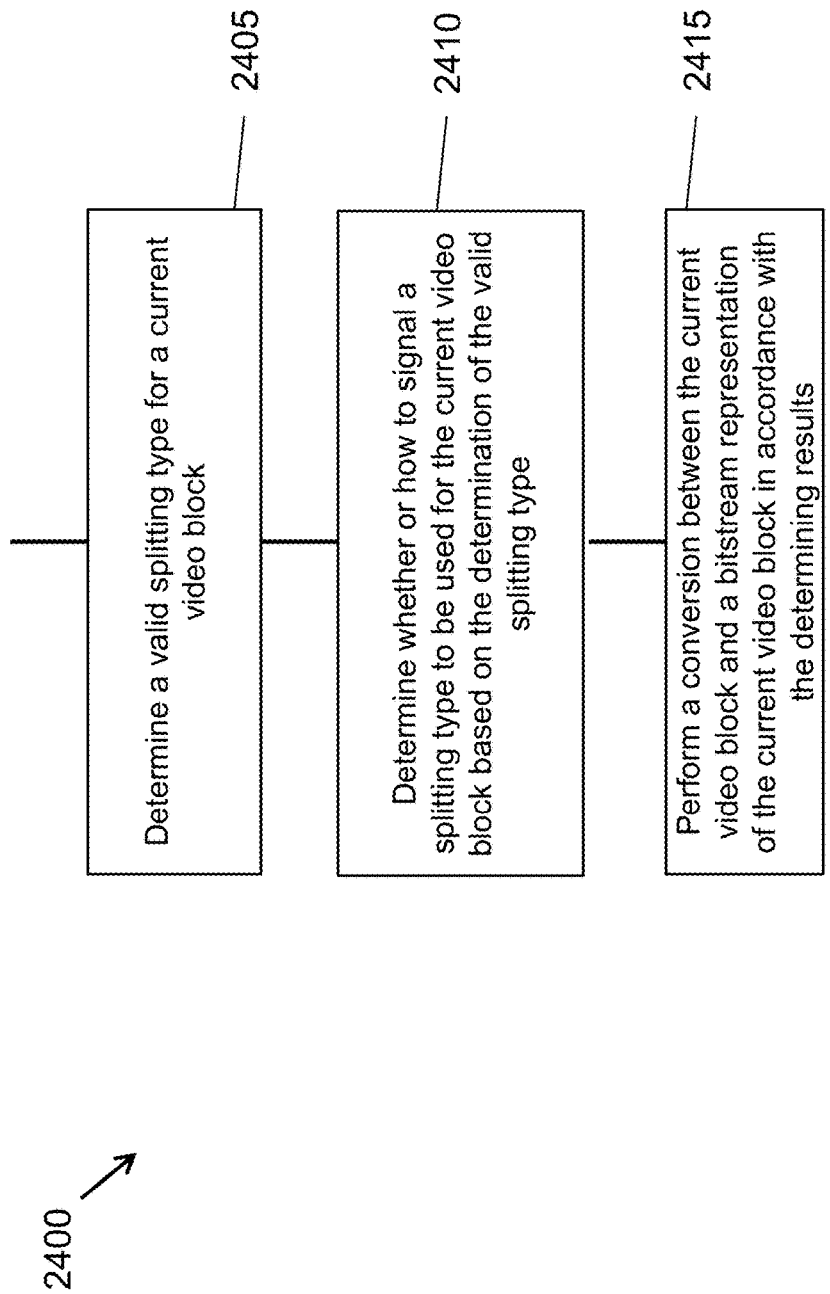
FIG. 24 is a flowchart for an example of a video processing method.

FIG. 24 is a flowchart for a method 2400 of processing a video. The method 2400 includes determining (2405) a valid splitting type for a current video block; determining (2410) whether or how to signal a splitting type to be used for the current video block based on the determination of the valid splitting type; and performing (2415) a conversion between the current video block and a bitstream representation of the current video block in accordance with the determining results.

Figure 25:
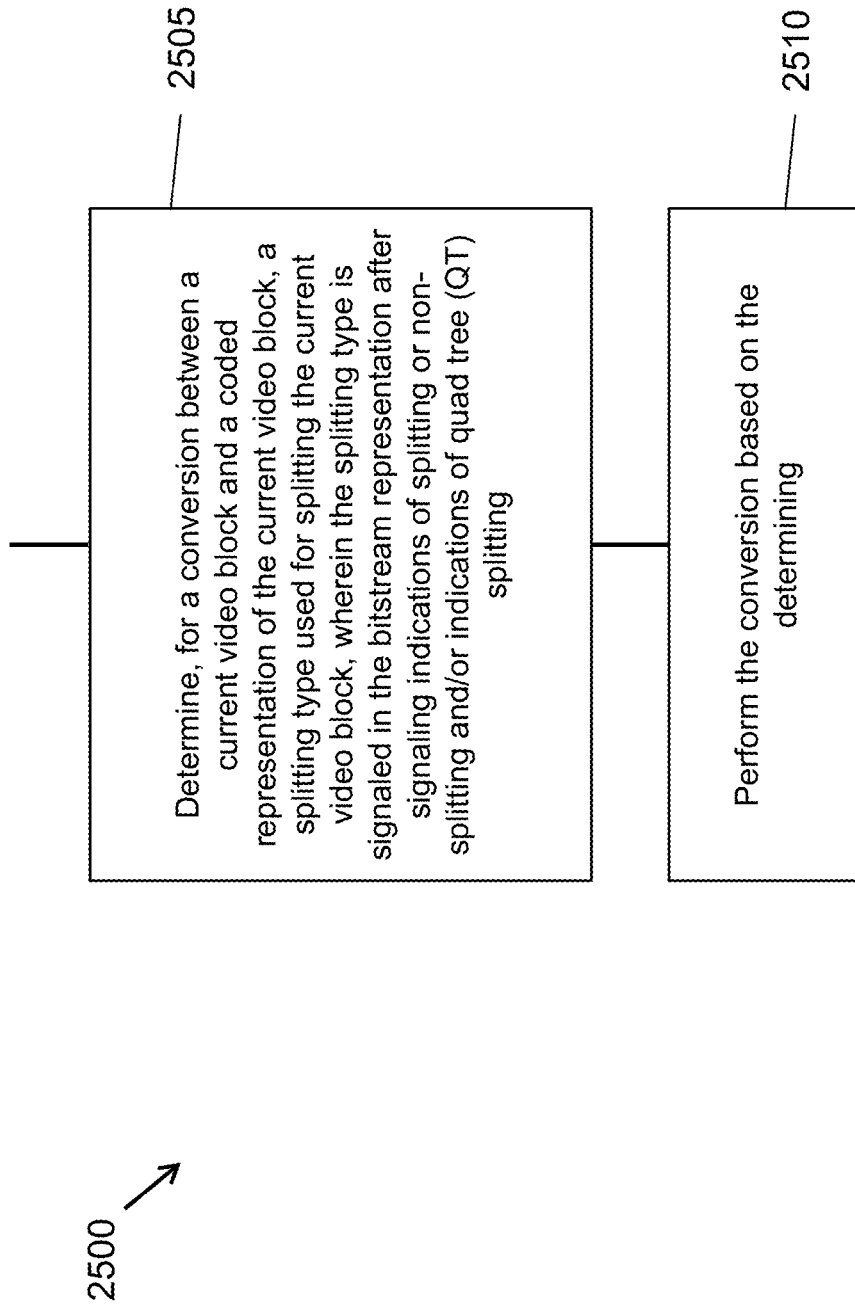
FIG. 25 is a flowchart for an example of a video processing method.

FIG. 25 is a flowchart for a method 2500 of processing a video. The method 2500 includes determining (2505), for a conversion between a current video block and a coded representation of the current video block, a splitting type used for splitting the current video block, wherein the splitting type is signaled in the bitstream representation after signaling indications of splitting or non-splitting and/or indications of quad tree (QT) splitting; and performing (2510) the conversion based on the determining.

Figure 26:
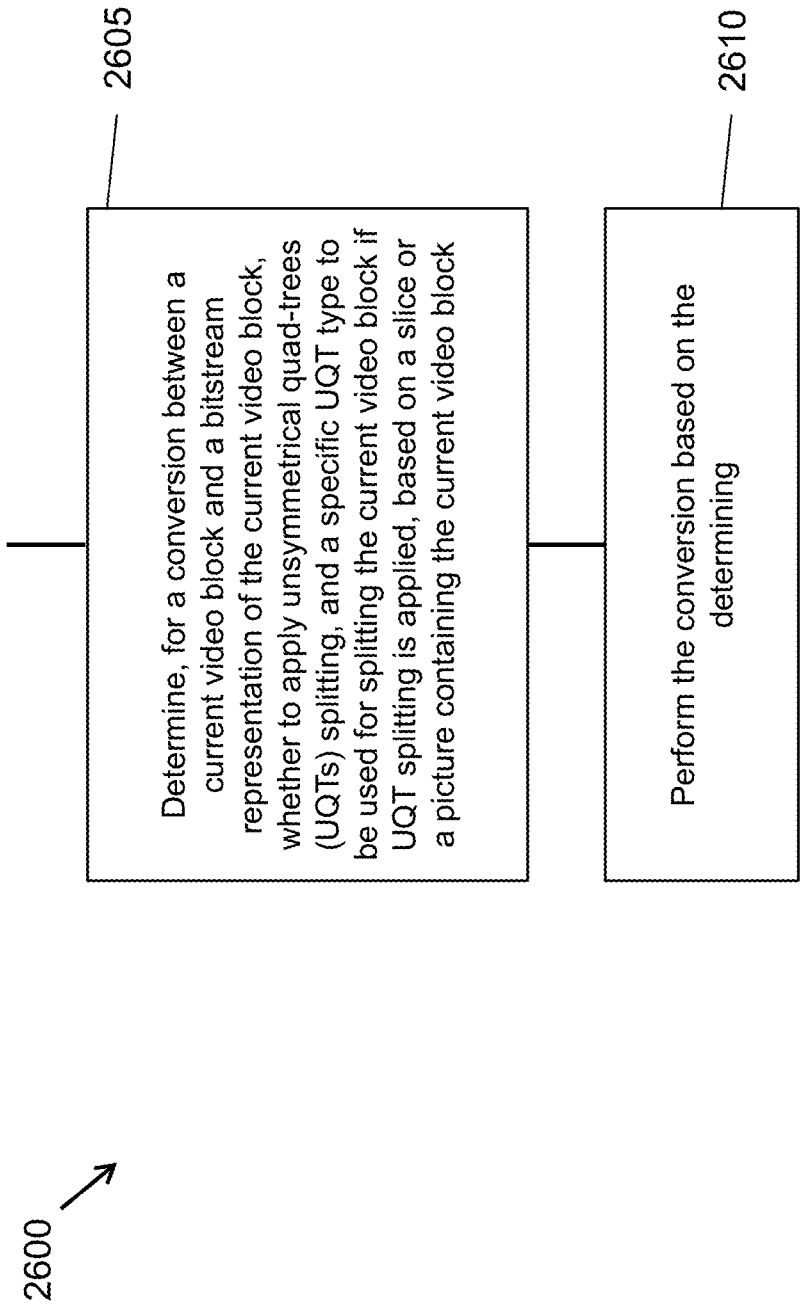
FIG. 26 is a flowchart for an example of a video processing method.

FIG. 26 is a flowchart for a method 2600 of processing a video. The method 2600 includes determining (2605), for a conversion between a current video block and a bitstream representation of the current video block, whether to apply unsymmetrical quad-trees (UQTs) splitting, and a specific UQT type to be used for splitting the current video block if UQT splitting is applied, based on a slice or a picture containing the current video block; and performing (2610) the conversion based on the determining.

Figure 27:
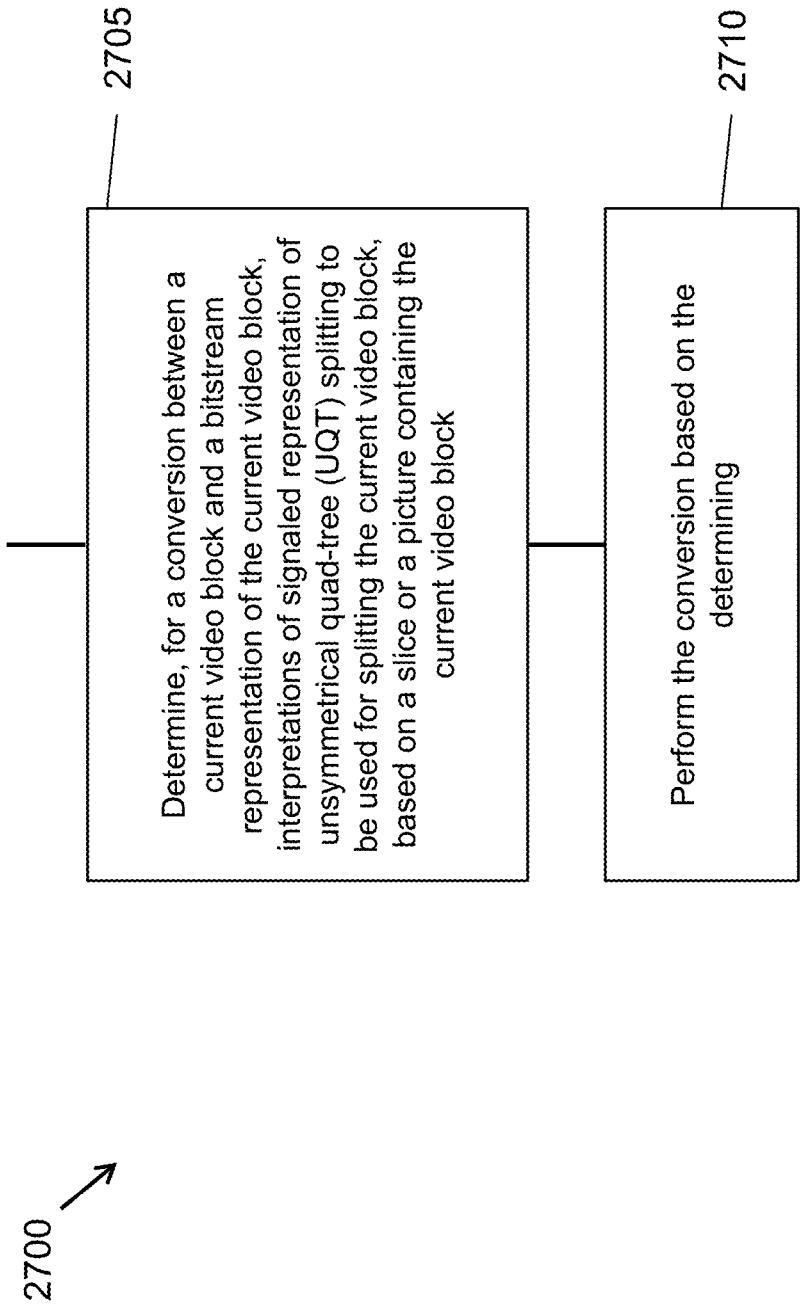
FIG. 27 is a flowchart for an example of a video processing method.

FIG. 27 is a flowchart for a method 2700 of processing a video. The method 2700 includes determining (2705), for a conversion between a current video block and a bitstream representation of the current video block, interpretations of signaled representation of unsymmetrical quad-tree (UQT) splitting to be used for splitting the current video block, based on a slice or a picture containing the current video block; and performing (2710) the conversion based on the determining.

The following examples are provided in the present disclosure.

1. A method for processing video, further comprising: determining a valid splitting type for a current video block; determining whether or how to signal a splitting type to be used for the current video block based on the determination of the valid splitting type; and performing a conversion between the current video block and a bitstream representation of the current video block in accordance with the determining results.

2. The method of example 1, wherein candidates of the splitting type to be signaled includes binary tree (BT) splitting, triple tree (TT) splitting or unsymmetrical quad-trees (UQTs) splitting, and the candidates are all vertical splitting or horizontal splitting depending on previously signaled or derived information during the conversion.

3. The method of example 2, wherein invalid splitting types are not signaled from an encoder to a decoder, and wherein there is no codeword to represent the invalid splitting types.

4. The method of any of examples 1-3, further comprising: if there is only one splitting type among BT splitting, TT splitting and UQT splitting is valid, refraining from signaling any binarized code to indicate the splitting type used for the current video block.

5. The method of any of examples 1-3, further comprising: if there are only two splitting types among BTsplitting, TTsplitting and UQTsplitting are valid, signaling a flag to indicate which one of the two valid splitting types is used.

6. The method of any of examples 1-5, wherein a code to indicate a splitting type to be used is binarized as a truncated unary code.

7. The method of example 6, wherein a maximum value of the truncated unary code is N−1, where N is an integer and represents a number of valid splitting types.

8. The method of example 6, wherein there is no codeword to represent an invalid splitting type, and wherein the invalid splitting type is skipped when building a codeword table.

9. The method of any of examples 1-8, further comprising: if no UQTsplitting is valid, refraining from signaling a flag indicating whether UQTsplitting is used, and the flag being inferred to be false.

10. The method of example 9, wherein binarized codewords used to represent BT splitting and TT splitting are X and Y, respectively, where X represents 0 or 1, Y represents 0 or 1 and Y is different from X.

11. The method of any of examples 1-8, further comprising: if only one kind of UQT splitting is valid and UQT splitting is signaled to be used, refraining from signaling further information to indicate which kind of UQT splitting is used.

12. The method of any of examples 1-8, further comprising: if only two kinds of UQT splitting are valid and UQT splitting is signaled to be used, signaling a flag to indicate which kind of UQT splitting is used.

13. The method of any of examples 1-8, further comprising: if only three kinds of UQT splitting are valid and UQT splitting is signaled to be used, signaling a message to indicate which kind of UQT splitting is used.

14. The method of example 13, wherein binarized codewords used to represent the three kinds of UQT splitting are X, YX, YY, respectively, where X represents 0 or 1, Y represents 0 or 1 and Y is different from X.

15. The method of example 1, wherein preset binarized codewords and/or signaling method are used regardless of valid splitting types in the current video block, and wherein an invalid splitting type is refrained to be chosen in a conformance bit-stream.

16. The method of example 2, wherein determining the splitting type used for the current video block is based on bins of a bin string coded by arithmetic coding.

17. The method of example 16, wherein partial bins of the bin string are coded with contexts and other bins are coded with bypass mode without contexts.

18. The method of example 16, wherein all bins of the bin string are coded with contexts.

19. The method of example 16, wherein all bins of the bin string are coded with bypass mode.

20. The method of any of examples 16-18, wherein one or multiple contexts are utilized for a bin coded with contexts.

21. The method of example 20, wherein the context is based on and least one of: a position or index of the bin, splitting of neighboring blocks of the current video block, a current split depth of the current video block, a split depth of neighboring blocks, coding modes of neighboring blocks, a width or height of neighboring blocks, a width or height of the current video block, a slice type, a picture type, a tile group type, a color component, or statistics results of splitting types from previously coded video blocks.

22. A method for processing video, comprising: determining, for a conversion between a current video block and a coded representation of the current video block, a splitting type used for splitting the current video block, wherein the splitting type is signaled in the bitstream representation after signaling indications of splitting or non-splitting and/or indications of quad tree (QT) splitting; and performing the conversion based on the determining.

23. The method of example 22, wherein the splitting type is selected from extended quad-tree (EQT) splitting, binary tree (BT) splitting and unsymmetrical quad-trees (UQT) splitting.

24. The method of example 23, wherein in UQT splitting in which the current video block is split into four partitions including a first partition having a dimension of W1×H1, a second partition having a dimension of W2×H2, a third partition having a dimension of W3×H3, and a fourth partition having a dimension of W4×H4, wherein W1, W2, W3, W4, H1, H2, H3, and H4 are integers, when H1, H2, H3, and H4 are equal to each other, and H1=H2=H3=H4=H, H being a power-of-two number, the splitting being a vertical splitting, wherein when W1=W/8, W2=W/2, W3=W/8, W4=W/4, W being a power-of-two number, the splitting type is named as UQT1-V; when W1=W/8, W2=W/2, W3=W/4, W4=W/8, the splitting type is named as UQT2-V; when W1=W/4, W2=W/8, W3=W/2, W4=W/8, the splitting type is named as UQT3-V; and when W1=W/8, W2=W/4, W3=W/2, W4=W/8, the splitting type is named as UQT4-V; when W1, W2, W3, and W4 are equal to each other, W1=W2=W3=W4=W, W being a power-of-two number, the splitting being a horizontal split, and wherein when H1=H/8, H2=H/2, H3=H/8, H4=H/4, H being a power-of-two number, the splitting type is named as UQT1-H; when H1=H/8, H2=H/2, H3=H/4, H4=H/8, the splitting type is named as UQT2-H; when H1=H/4, H2=H/8, H3=H/2, H4=H/8, the splitting type is named as UQT3-H; and when H1=H/8, H2=H/4, H3=H/2, H4=H/8, the splitting type is named as UQT4-H.

25. The method of any of examples 22-24, wherein a first flag is signaled to indicate whether the current video block is split with a first set of UQT splitting and BT splitting or with a second set of UQT splitting and EQT splitting, wherein the UQT splitting type in the first and second set are different.

26. The method of example 25, wherein if the first flag indicates that the current video block is split with the first set, a second flag is further signaled to indicate whether a certain kind of UQT splitting is applied or a certain kind of BT splitting is applied on the current video block.

27. The method of example 26, wherein the second flag is signaled to indicate whether UQT2-V/UQT2-H splitting is applied, or BT-V/BT-H splitting is applied on the current video block.

28. The method of example 25, wherein if the first flag indicates that the current video block is split with the second set, a second flag is further signaled to indicate whether a certain kind of UQT splitting is applied or a certain kind of EQT splitting is applied on the current video block.

29. The method of example 28, wherein the second flag is signaled to indicate whether UQT4-V/UQT4-H splitting is applied, or EQT-V/EQT-H splitting is applied on the current video block.

30. The method of example 28, wherein the second flag is signaled to indicate whether UQT2-V/UQT2-H splitting is applied, or EQT-V/EQT-H splitting is applied on the current video block.

31. The method of any of examples 22-30, wherein a splitting direction is further signalled, the splitting direction being selected from horizontal splitting or vertical splitting.

32. The method of any of examples 22-31, wherein the method is utilized for coding video blocks in I slices or I pictures.

33. The method of any of examples 22-24, wherein a first flag is signaled to indicate whether the current video block is split with BT splitting or with a second set of UQT splitting and EQT splitting.

34. The method of example 33, wherein if the first flag indicates that the current video block is not split with BT splitting, a second flag is further signaled to indicate whether UQT splitting is applied or EQT splitting is applied on the current video block.

35. The method of example 34, wherein a splitting direction is further signalled, the splitting direction being selected from horizontal splitting or vertical splitting.

36. The method of example 34, wherein a third flag to indicate a splitting direction is further signaled, the splitting direction being selected from horizontal splitting or vertical splitting.

37. The method of example 36, wherein a splitting pattern is further signaled, the splitting pattern being selected from EQT splitting and UQT splitting.

38. The method of any of examples 33-37, wherein the method is utilized for coding video blocks in P slices/pictures or B slices/pictures.

39. The method of any of examples 25-38, further comprising skipping signaling of the flags when the current video block is non-split or split with QT splitting.

40. The method of any of examples 25-38, wherein only when the current block needs to be further split and/or not split according to QT splitting, the flags are further signaled.

41. A method of video processing, comprising: determining, for a conversion between a current video block and a bitstream representation of the current video block, whether to apply unsymmetrical quad-trees (UQTs) splitting, and a specific UQT type to be used for splitting the current video block if UQT splitting is applied, based on a slice or a picture containing the current video block; and performing the conversion based on the determining.

42. The method of example 41, wherein when the slice or picture containing the current video block is a P-slice/P-picture or B-slice/B-picture, M kinds of UQT splitting are applied; and when the slice or picture containing the current video block is an I-slice/I-picture, N kinds of UQT splitting are applied, where M and N are integers.

43. The method of example 42, wherein M is smaller than N.

44. The method of example 43, wherein M is equal to 2 and N is equal to 4.

45. The method of example 42, wherein M is equal to N, and the UQT splitting to be applied are different for the P-slice/P-picture or B-slice/B-picture and the I-slice/I-picture.

46. The method of any of examples 40-44, wherein in UQT splitting in which the current video block is split into four partitions including a first partition having a dimension of W1×H1, a second partition having a dimension of W2×H2, a third partition having a dimension of W3×H3, and a fourth partition having a dimension of W4×H4, wherein W1, W2, W3, W4, H1, H2, H3, and H4 are integers, when H1, H2, H3, and H4 are equal to each other, and H1=H2=H3=H4=H, H being a power-of-two number, the splitting being a vertical splitting, wherein when W1=W/8, W2=W/2, W3=W/8, W4=W/4, W being a power-of-two number, the splitting type is named as UQT1-V splitting; when W1=W/8, W2=W/2, W3=W/4, W4=W/8, the splitting type is named as UQT2-V splitting; when W1=W/4, W2=W/8, W3=W/2, W4=W/8, the splitting type is named as UQT3-V splitting; and when W1=W/8, W2=W/4, W3=W/2, W4=W/8, the splitting type is named as UQT4-V splitting; when W1, W2, W3, and W4 are equal to each other, W1=W2=W3=W4=W, W being a power-of-two number, the splitting being a horizontal split, and wherein when H1=H/8, H2=H/2, H3=H/8, H4=H/4, H being a power-of-two number, the splitting type is named as UQT1-H splitting; when H1=H/8, H2=H/2, H3=H/4, H4=H/8, the splitting type is named as UQT2-H splitting; when H1=H/4, H2=H/8, H3=H/2, H4=H/8, the splitting type is named as UQT3-H splitting; and when H1=H/8, H2=H/4, H3=H/2, H4=H/8, the splitting type is named as UQT4-H splitting.

47. The method of any of examples 40-46, wherein UQT2-V splitting, UQT2-H splitting, UQT4-V splitting, or UQT4-H splitting is applied on the I-slice/I-picture.

48. The method of any of examples 40-46, wherein UQT2-V splitting and UQT2-H splitting are applied on the P-slice/P-picture or the B-slice/B-picture.

49. A method of video processing, comprising: determining, for a conversion between a current video block and a bitstream representation of the current video block, interpretations of signaled representation of unsymmetrical quad-tree (UQT) splitting to be used for splitting the current video block, based on a slice or a picture containing the current video block; and performing the conversion based on the determining.

50. The method of example 49, wherein the signaled presentation of UQT splitting in an I-slice/I-picture is different to that in a P-slice/P-picture or a B-slice/B-picture.

51. The method of example 49 or example 50, wherein in UQT splitting in which the current video block is split into four partitions including a first partition having a dimension of W1×H1, a second partition having a dimension of W2×H2, a third partition having a dimension of W3×H3, and a fourth partition having a dimension of W4×H4, wherein W1, W2, W3, W4, H1, H2, H3, and H4 are integers, when H1, H2, H3, and H4 are equal to each other, and H1=H2=H3=H4=H, H being a power-of-two number, the splitting being a vertical split, wherein when W1=W/8, W2=W/2, W3=W/8, W4=W/4, W being a power-of-two number, the splitting type is named as UQT1-V splitting; when W1=W/8, W2=W/2, W3=W/4, W4=W/8, the splitting type is named as UQT2-V splitting; when W1=W/4, W2=W/8, W3=W/2, W4=W/8, the splitting type is named as UQT3-V splitting; and when W1=W/8, W2=W/4, W3=W/2, W4=W/8, the splitting type is named as UQT4-V splitting; when W1, W2, W3, and W4 are equal to each other, W1=W2=W3=W4=W, W being a power-of-two number, the splitting being a horizontal split, and wherein when H1=H/8, H2=H/2, H3=H/8, H4=H/4, H being a power-of-two number, the splitting type is named as UQT1-H splitting; when H1=H/8, H2=H/2, H3=H/4, H4=H/8, the splitting type is named as UQT2-H splitting; when H1=H/4, H2=H/8, H3=H/2, H4=H/8, the splitting type is named as UQT3-H splitting; and when H1=H/8, H2=H/4, H3=H/2, H4=H/8, the splitting type is named as UQT4-H splitting.

52. The method of example 51, wherein for the I-slice/I-picture, a flag is signaled to indicate whether UQT2-V/UQT2-H splitting is applied, or BT-V/BT-H splitting is applied.

53. The method of example 51, wherein for the I-slice/I-picture, a flag is signaled to indicate whether UQT4-V/UQT4-H splitting is applied, or EQT-V/EQT-H splitting is applied.

54. The method of example 51, wherein for the I-slice/I-picture, a flag is signaled to indicate whether UQT2-V/UQT2-H splitting is applied, or EQT-V/EQT-H splitting is applied.

55. The method of example 51, wherein for the I-slice/I-picture, a flag is signaled to indicate whether UQT2-V splitting, UQT2-H splitting, UQT4-V splitting, or UQT4-H splitting is applied.

56. The method of any of examples 52-55, wherein a splitting direction is further signalled, the splitting direction being selected from horizontal splitting or vertical splitting.

57. The method of example 51, wherein for the P-slice/P-picture or the B-slice/B-picture, a flag is signaled to indicate whether BT or a second set of UQT splitting and EQT splitting is applied.

58. The method of example 57, wherein if the flag indicates that the current video block is not split with BT splitting, a second flag is further signaled to indicate whether UQT splitting is applied or EQT splitting is applied on P-slice/P-picture or the B-slice/B-picture.

59. The method of example 57 or example 58, wherein a splitting direction is further signaled, the splitting direction being selected from horizontal splitting or vertical splitting.

60. The method of example 57 or example 58, wherein a third flag to indicate a splitting direction is further signaled, the splitting direction being selected from horizontal splitting or vertical splitting.

61. The method of example 60, wherein a splitting type is further signaled, the splitting type being selected from EQT splitting and UQT splitting.

62. The method of example 51, wherein for the P-slice/P-picture or the B-slice/B-picture, a flag is signaled to indicate UQT2-V splitting and UQT2-H splitting to be applied on the P-slice/P-picture or the B-slice/B-picture.

63. The method of any of examples 50-62, wherein whether and/or how to apply UQT splitting for a slice/picture are determined based on a temporal layer of the slice/picture.

64. The method of example 63, wherein it is determined that UQT splitting is not applied if the temporal layer of the slice/picture is larger than a threshold.

65. The method of example 64, wherein the threshold is 2.

66. The method of example 63, wherein there are M kinds of UQT splitting allowed to be applied on a picture/slice with temporal layer larger than T and N kinds of UQT splitting allowed to be applied on a picture/slice with temporal layer smaller than or equal to T, wherein T, M and N are integers and M is smaller than N.

67. The method of example 66, wherein T is equal to 2, M is equal to 2, and N is equal to 4.

68. The method of any of examples 50-62, wherein whether and/or how to apply UQT splitting for a slice/picture are determined based on whether the slice/picture can be a reference picture for other slices/pictures.

69. The method of example 68, wherein UQT splitting is not applied on a slice/picture if it is not a reference picture for other slices/pictures.

70. The method of any of examples 49-69, wherein if one kind of UQT splitting is not allowed, refraining from signaling any indication for the one kind of UQT splitting.

71. The method of example 70, wherein if no kind of UQT splitting is allowed, refraining from signaling any indication for UQT splitting.

72. The method of any of examples 50-71, wherein how to signal the splitting type depends on a picture/slice type containing the current video block.

73. The method of example 72, wherein a UQT flag to indicate whether UQT splitting is applied is signaled before a BT/EQT flag to indicate whether BT/EQT splitting is applied in an I picture/slice, and the UQT flag to indicate whether UQT splitting is applied is signaled after the BT/EQT flag to indicate whether BT/EQT splitting is applied in a P picture/slice or B picture/slice.

74. The method of example 72, wherein a UQT flag to indicate whether UQT splitting is applied is signaled after a BT/EQT flag to indicate whether BT/EQT splitting is applied in an I picture/slice, and the UQT flag to indicate whether UQT splitting is applied is signaled before the BT/EQT flag to indicate whether BT/EQT splitting is applied in a P picture/slice or B picture/slice.

75. The method of any of examples 50-74, wherein a flag is signaled to indicate the splitting direction of more than one splitting types including UQT splitting.

76. The method of example 75, wherein the flag is signaled to indicate whether vertical or horizontal splitting is applied for UQT splitting, EQT splitting and BT splitting.

77. The method of example 73 or example 74, wherein the UQT flag to indicate whether UQT splitting is applied is coded by arithmetic coding with context models.

78. The method of example 77, wherein the context model is selected based on the picture/slice type, wherein the picture/slice type includes I picture/slice and P/B picture/slice.

79. The method of example 77, wherein one context model is used if the current picture is I-picture, and a context model is selected from candidate context models if the current picture is P/B picture/slice.

80. The method of example 79, wherein the context model is selected based on whether there is one or multiple neighboring blocks.

81. The method of example 80, wherein the context model is selected based on dimensions of one or multiple neighboring blocks.

82. The method of example 79 or example 80, wherein the one or multiple neighbouring blocks include a left neighboring block and/or an above neighbouring block.

83. The method of any of examples 77-80, wherein the context model depends on dimensions of the current block.

84. The method of examples 1-83, wherein W and H represent the width and height of the current video block, respectively.

85. The method of any of examples 1-84, wherein the conversion includes generating pixels of the current video block from the bitstream representation.

86. The method of any of examples 1-84, wherein the conversion includes generating the bitstream representation from the current video block.

87. A video decoding apparatus comprising a processor configured to implement a method recited in one or more of examples 1 to 84.

88. A video encoding apparatus comprising a processor configured to implement a method recited in one or more of examples 1 to 84.

89. A computer program product having computer code stored thereon, the code, when executed by a processor, causes the processor to implement a method recited in any of examples 1 to 84.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method of processing video data, further comprising:
    determining a valid splitting type for a current video block from candidates of splitting types;
    determining whether or how to signal a splitting type to be used for the current video block based on a determination of the valid splitting type; and
    performing a conversion between the current video block and a bitstream of the current video block in accordance with results of the determining,
    wherein the candidates of the splitting types at least include unsymmetrical quad-trees (UQTs) splitting, and
    wherein, in the unsymmetrical quad-Trees (UQTs) splitting, the current video block is unsymmetrically split into four partitions, and at least one of the four partitions has a block size different from block sizes of other partitions of the four partitions,
    wherein, when only one kind of UQT splitting is valid and UQT splitting is signaled to be used, refraining from signaling further information to indicate which kind of UQT splitting is used,
    wherein, when only two kinds of UQT splitting are valid and UQT splitting is signaled to be used, signaling a flag to indicate which kind of UQT splitting is used, and
    wherein, when only three kinds of UQT splitting are valid and UQT splitting is signaled to be used, signaling a message to indicate which kind of UQT splitting is used.

2. The method of claim 1, wherein candidates of the splitting types to be signaled include binary tree (BT) splitting, triple tree (TT) splitting or unsymmetrical quad-trees (UQTs) splitting, and the candidates are all vertical splitting or horizontal splitting depending on previously signaled or derived information during the conversion.

3. The method of claim 2, wherein determining the splitting type used for the current video block is based on bins of a bin string coded by arithmetic coding.

4. The method of claim 3, wherein partial bins of the bin string are coded with contexts and other bins are coded with bypass mode without contexts; or
    wherein all bins of the bin string are coded with contexts; or
    wherein all bins of the bin string are coded with bypass mode, and
    wherein one or multiple contexts are utilized for a bin coded with contexts, and wherein a context of the contexts is based on at least one of: a position or index of the bin, splitting of neighboring blocks of the current video block, a current split depth of the current video block, a split depth of neighboring blocks, coding modes of neighboring blocks, a width or height of neighboring blocks, a width or height of the current video block, a slice type, a picture type, a tile group type, a color component, or statistics results of splitting types from previously coded video blocks.

5. The method of claim 1,
wherein, when there is only one splitting type among BT splitting, TT splitting, and UQT splitting that is valid, refraining from signaling any binarized code to indicate the splitting type used for the current video block; and
wherein, when there are only two splitting types among BT splitting, TT splitting, and UQT splitting that are valid, signaling a flag to indicate which one of two valid splitting types is used, wherein a code to indicate the splitting type to be used is binarized as a truncated unary code, and wherein a maximum value of the truncated unary code is N−1, where N is an integer and represents a number of valid splitting types.

6. The method of claim 1, wherein there is no codeword to represent an invalid splitting type in the bitstream, and wherein the invalid splitting type is skipped when building a codeword table.

7. The method of claim 1, wherein indications of candidates of splitting types are signaled in the bitstream after signaling at least one of indications of splitting or non-splitting and indications of quad tree (QT) splitting, wherein the candidates of splitting types include: extended quad-tree (EQT) splitting, binary tree (BT) splitting and unsymmetrical quad-trees (UQT) splitting.

8. The method of claim 7, wherein in UQT splitting in which the current video block is split into four partitions including a first partition having a dimension of W1×H1, a second partition having a dimension of W2×H2, a third partition having a dimension of W3×H3, and a fourth partition having a dimension of W4×H4, wherein W1, W2, W3, W4, H1, H2, H3, and H4 are integers.

9. The method of claim 8, wherein a first flag is signaled to indicate whether the current video block is split with a first set comprising UQT splitting and BT splitting or a second set comprising UQT splitting and EQT splitting, wherein a UQT splitting type in the first set and the second set are different, and
wherein, when the first flag indicates that the current video block is split with the first set, a second flag is further signaled to indicate whether a certain kind of UQT splitting is applied or a certain kind of BT splitting is applied on the current video block, and wherein the second flag is signaled to indicate whether UQT2-V/UQT2-H splitting is applied, or BT-V/BT-H splitting is applied on the current video block.

10. The method of claim 1, further comprising:
determining, for a conversion between a current video block and a bitstream of the current video block, interpretations of a signaled representation of unsymmetrical quad-tree (UQT) splitting to be used for splitting the current video block, based on a slice or a picture containing the current video block, wherein the signaled representation of UQT splitting in an I-slice/I-picture is different to that in a P-slice/P-picture or a B-slice/B-picture.

11. The method of claim 1, wherein how to signal the splitting type depends on a picture/slice type containing the current video block.

12. The method of claim 11, wherein a UQT flag to indicate whether UQT splitting is applied is signaled before a BT/EQT flag to indicate whether BT/EQT splitting is applied in an I picture/slice, and the UQT flag to indicate whether UQT splitting is applied is signaled after the BT/EQT flag to indicate whether BT/EQT splitting is applied in a P picture/slice or B picture/slice; or alternatively,
wherein a UQT flag to indicate whether UQT splitting is applied is signaled after a BT/EQT flag to indicate whether BT/EQT splitting is applied in an I picture/slice, and the UQT flag to indicate whether UQT splitting is applied is signaled before the BT/EQT flag to indicate whether BT/EQT splitting is applied in a P picture/slice or B picture/slice.

13. The method of claim 12, wherein the UQT flag to indicate whether UQT splitting is applied is coded by arithmetic coding with one or more context models.

14. The method of claim 13, wherein the one or more context models are selected based on the picture/slice type, wherein the picture/slice type includes I picture/slice and P/B picture/slice; or
wherein the one or more context models are selected based on whether there is one or multiple neighboring blocks; or
wherein the one or more context models are selected based on dimensions of one or multiple neighboring blocks.

15. The method of claim 1, wherein a flag is signaled to indicate a splitting direction of more than one splitting types including UQT splitting, and wherein the flag is signaled to indicate whether vertical or horizontal splitting is applied for UQT splitting, EQT splitting and BT splitting.

16. The method of claim 1, wherein the conversion includes encoding the current video block into the bitstream.

17. The method of claim 1, wherein the conversion includes decoding the current video block from the bitstream.

18. An apparatus for processing video data comprising a processor and a non-transitory memory with instructions thereon, wherein the instructions upon execution by the processor, cause the processor to:
determine a valid splitting type for a current video block from candidates of splitting types;
determine whether or how to signal a splitting type to be used for the current video block based on a determination of the valid splitting type; and
perform a conversion between the current video block and a bitstream of the current video block in accordance with results of the determining,
wherein the candidates of the splitting types at least include unsymmetrical quad-trees (UQTs) splitting, and
wherein in the unsymmetrical quad-Trees (UQTs) splitting, the current video block is unsymmetrically split into four partitions, and at least one of the four partitions has a block size different from block sizes of other partitions of the four partitions,
wherein, when only one kind of UQT splitting is valid and UQT splitting is signaled to be used, refraining from signaling further information to indicate which kind of UQT splitting is used, wherein, when only two kinds of UQT splitting are valid and UQT splitting is signaled to be used, signaling a flag to indicate which kind of UQT splitting is used, and wherein, when only three kinds of UQT splitting are valid and UQT splitting is signaled to be used, signaling a message to indicate which kind of UQT splitting is used.

19. A method of storing a bitstream of a video, comprising:

determining a valid splitting type for a current video block from candidates of splitting types;

determining whether or how to signal a splitting type to be used for the current video block based on a determination of the valid splitting type;

generating the bitstream in accordance with results of the determining; and storing the bitstream in a non-transitory computer-readable recording medium, wherein the candidates of the splitting types at least include unsymmetrical quad-trees (UQTs) splitting, and wherein in the unsymmetrical quad-Trees (UQTs) splitting, the current video block is unsymmetrically split into four partitions, and at least one of the four partitions has a block size different from block sizes of other partitions of the four partitions, wherein, when only one kind of UQT splitting is valid and UQT splitting is signaled to be used, refraining from signaling further information to indicate which kind of UQT splitting is used, wherein, when only two kinds of UQT splitting are valid and UQT splitting is signaled to be used, signaling a flag to indicate which kind of UQT splitting is used, and wherein, when only three kinds of UQT splitting are valid and UQT splitting is signaled to be used, signaling a message to indicate which kind of UQT splitting is used.

* * * * *